United States Patent [19]
Pearce

[11] Patent Number: 5,749,111
[45] Date of Patent: May 12, 1998

[54] GELATINOUS CUSHIONS WITH BUCKLING COLUMNS

[75] Inventor: Tony M. Pearce, Alpine, Utah

[73] Assignee: TekSource, LC, Draper, Utah

[21] Appl. No.: 601,374

[22] Filed: Feb. 14, 1996

[51] Int. Cl.⁶ .......................... A47C 27/00; A47C 27/14
[52] U.S. Cl. ..................... 5/652; 5/652.1; 5/653; 5/654; 5/740; 5/948; 5/953; 5/706; 5/909; 428/137; 428/138
[58] Field of Search ........................ 5/655.5, 654, 653, 5/740, 706, 420, 690, 953, 948, 909, 652.1, 652, 724; 428/137, 138, 131

[56] References Cited

U.S. PATENT DOCUMENTS

| | | |
|---|---|---|
| 1,228,783 | 6/1917 | Kerivan . |
| 2,491,557 | 12/1949 | Goolsbee . |
| 2,655,369 | 10/1953 | Musilli .......................... 267/1 |
| 2,672,183 | 3/1954 | Forsyth . |
| 2,814,053 | 11/1957 | Sevcik . |
| 3,407,406 | 10/1968 | Werner et al. ..................... 2/3 |
| 3,459,179 | 8/1969 | Olesen ......................... 128/60 |
| 3,462,778 | 8/1969 | Whitney . |
| 3,518,786 | 7/1970 | Holtvoigt ....................... 46/24 |
| 3,529,368 | 9/1970 | Canfield ...................... 36/2.5 |
| 3,552,044 | 1/1971 | Wiele ............................ 36/71 |
| 3,605,145 | 9/1971 | Graebe . |
| 3,748,669 | 7/1973 | Warner . |
| 3,748,779 | 7/1973 | Cherk et al. ................... 46/115 |
| 3,893,198 | 7/1975 | Blair . |
| 3,968,530 | 7/1976 | Dyson . |
| 3,986,213 | 10/1976 | Lynch ............................ 3/36 |
| 4,038,762 | 8/1977 | Swan, Jr. ....................... 36/89 |
| 4,083,127 | 4/1978 | Hanson ......................... 36/93 |
| 4,144,658 | 3/1979 | Swan, Jr. ...................... 36/117 |
| 4,163,297 | 8/1979 | Neumark . |
| 4,229,546 | 10/1980 | Swan, Jr. ...................... 521/55 |
| 4,243,754 | 1/1981 | Swan, Jr. ...................... 521/55 |
| 4,252,910 | 2/1981 | Schaefer ...................... 521/122 |
| 4,255,202 | 3/1981 | Swan, Jr. ..................... 106/122 |
| 4,256,304 | 3/1981 | Smith et al. .................... 273/60 |
| 4,292,701 | 10/1981 | Woychick ....................... 5/422 |
| 4,335,476 | 6/1982 | Watkin ......................... 5/740 |
| 4,369,284 | 1/1983 | Chen ........................... 524/476 |
| 4,467,053 | 8/1984 | Markle ......................... 521/128 |
| 4,472,847 | 9/1984 | Gammons et al. . |
| 4,483,029 | 11/1984 | Paul . |
| 4,485,505 | 12/1984 | Paul . |
| 4,498,205 | 2/1985 | Hino . |
| 4,572,174 | 2/1986 | Ellender et al. ................ 128/149 |
| 4,588,229 | 5/1986 | Jay ............................ 297/459 |
| 4,618,213 | 10/1986 | Chen .......................... 350/96.34 |
| 4,628,557 | 12/1986 | Murphy . |
| 4,660,238 | 4/1987 | Jay . |
| 4,686,724 | 8/1987 | Broford ........................ 5/724 |
| 4,698,864 | 10/1987 | Graebe . |
| 4,247,963 | 2/1981 | Reddi . |

(List continued on next page.)

FOREIGN PATENT DOCUMENTS 1261475  1/1972  United Kingdom .

*Primary Examiner*—Alexander Grosz
*Attorney, Agent, or Firm*—Daniel P. McCarthy

[57] ABSTRACT

A cushion that includes a cushioning element. The cushioning element has a number of substantially parallel elongate columns formed in a gelatinous cushioning media. The columns are configured so that when a force is applied to the cushioning element in a direction that is generally parallel to the longitudinal axes of the columns, the cushioning element will yield by a combination of compressability of the cushioning media and bucklability of the walls of the columns. In particular, the walls of columns which are located beneath a protruberance on an object being cushioned tend to buckle, permitting the cushioning element to conform to the shape of the cushioned object while evenly distributing a supporting force across the contact area of the cushioned object and avoiding pressure peaks. The preferred cushioning media is a gelatinous elastomer or gelatinous viscoelastomer. Various configurations of cushioning elements, including sidewall supports, are disclosed.

120 Claims, 13 Drawing Sheets

U.S. PATENT DOCUMENTS

| | | | |
|---|---|---|---|
| 4,709,431 | 12/1987 | Shaktman . | |
| 4,713,854 | 12/1987 | Graebe . | |
| 4,726,624 | 2/1988 | Jay | 297/459 |
| 4,728,551 | 3/1988 | Jay | 428/76 |
| 4,737,998 | 4/1988 | Johnson, Sr. . | |
| 4,744,564 | 5/1988 | Yamada | 273/232 |
| 4,761,843 | 8/1988 | Jay . | |
| 4,842,330 | 6/1989 | Jay | 297/4 |
| 4,945,588 | 8/1990 | Cassidy et al. . | |
| 4,952,190 | 8/1990 | Tarnoff et al. | 446/267 |
| 4,952,439 | 8/1990 | Hanson | 428/72 |
| 4,953,913 | 9/1990 | Graebe | 297/459 |
| 4,959,059 | 9/1990 | Eilender et al. | 604/358 |
| 5,010,608 | 4/1991 | Barnett et al. . | |
| 5,015,313 | 5/1991 | Drew et al. | 156/87 |
| 5,018,790 | 5/1991 | Jay | 297/458 |
| 5,020,176 | 6/1991 | Dotson . | |
| 5,052,068 | 10/1991 | Graebe . | |
| 5,058,291 | 10/1991 | Hanson | 36/117 |
| 5,074,620 | 12/1991 | Jay et al. | 297/337 |
| 5,079,786 | 1/1992 | Rojas . | |
| 5,079,787 | 1/1992 | Pollman . | |
| 5,093,138 | 3/1992 | Drew et al. | 426/68 |
| 5,100,712 | 3/1992 | Drew et al. | 428/68 |
| 5,103,518 | 4/1992 | Gilroy et al. . | |
| 5,111,544 | 5/1992 | Graebe . | |
| 5,147,685 | 9/1992 | Hanson | 428/189 |
| 5,163,196 | 11/1992 | Graebe et al. | 5/654 |
| 5,190,504 | 3/1993 | Scatterday | 482/49 |
| 5,201,780 | 4/1993 | Dinsmoor, III et al. . | |
| 5,204,154 | 4/1993 | Drew et al. | 428/68 |
| 5,255,404 | 10/1993 | Dinsmoor, III et al. . | |
| 5,262,468 | 11/1993 | Chen | 524/476 |
| 5,330,249 | 7/1994 | Weber et al. | 297/214 |
| 5,334,646 | 8/1994 | Chen | 524/474 |
| 5,334,696 | 8/1994 | Olson et al. | 528/322 |
| 5,335,907 | 8/1994 | Spector | 273/58 |
| 5,336,708 | 8/1994 | Chen | 524/474 |
| 5,369,828 | 12/1994 | Graebe | 5/654 |
| 5,421,874 | 6/1995 | Pearce | 106/122 |

GELATINOUS CUSHIONS WITH BUCKLING COLUMNS

BACKGROUND OF THE INVENTION

Field of the Invention

This invention relates to the field of cushions. More particularly, this invention relates to a cushion made of gelatinous elastomer or gelatinous viscoelastomer which has hollow columns that compress to provide cushioning and which buckle to relieve pressure peaks.

The Background Art

In the prior art, there have been numerous attempts to provide a cushion which achieves comfort by eliminating peak pressure areas and by evenly distributing the cushioning force over a broad surface area. The relevant prior art which the inventor is aware of is categorized and summarized below.

1. Foam Cushions

Foam cushions typically include open cell polyurethane foam because of its low cost and light weight. The open cells are in effect air bubbles within the polyurethane which can be compressed and from which air can escape when a force, such as the weight of a cushioned object, is placed on the foam. Alternatively, foam cushions may use closed cell foam, in which the cells contain air or another gas, but the cells are closed so that the air or gas cannot escape even when a compressive force is applied to the foam. Closed cell cushions tend to resist deformation more than similarly constructed open cell cushions. In function, foam cushions behave much the same as a spring, permitting the cushioned object to sink into the foam and to be supported by rebound pressure; the more the cushioned object sinks into the foam, the higher the rebound pressure. When the cushioned object is removed, the foam has a tendency to return to its original shape, a characteristic referred to as "shape memory." A significant problem with foam cushions is that protruding portions of the object being cushioned are placed under the highest pressure due to the foam's spring-like behavior, resulting in pressure on the cushioned object not being equalized. Closed cell foam cushions created even worse pressure peaks than open cell foam cushions due to their inability to permit gas to escape from their cells when the cushion is called on to support an object.

Examples of cushions that include foam are included in the following documents: U.S. Pat. No. 4,713,854 issued in the name of Graebe on Dec. 22, 1987; U.S. Pat. No. 4,709,431 issued in the name of Shaktman on Dec. 1, 1987; U.S. Pat. No. 4,628,557 issued in the name of Murphy on Dec. 16, 1986; U.S. Pat. No. 4,467,053 issued in the name of Markle on Aug. 21, 1984; U.S. Pat. No. 3,518,786 issued in the name of Holtvoigt on Jul. 7, 1970; and U.S. Pat. No. 5,335,907 issued in the name of Spector on Aug. 9, 1994, each of which is hereby incorporated in its entirety for the material disclosed therein. The following patents include both foam and a gel or fluid (see discussion of gels below): U.S. Pat. No. 4,952,539 issued in the name of Hanson on Aug. 29, 1990; U.S. Pat. No. 5,147,685 issued in the name of Hanson on Sep. 15, 1992; U.S. Pat. No. 5,058,291 issued in the name of Hanson on Oct. 22, 1991; U.S. Pat. No. 5,255,404 issued in the name of Dinsmoor, III et al. on Oct. 26, 1993; U.S. Pat. No. 5,201,780 issued in the name of Dinsmoor, III et al. on Apr. 13, 1993; U.S. Pat. No. 4,842,330 issued in the name of Jay on Jun. 27, 1989; and U.S. Pat. No. 4,726,624 issued in the name of Jay on Feb. 23, 1988, each of which is hereby incorporated in its entirety for the material disclosed therein.

2. Fluid Cushions

Some in the prior art have attempted to design a comfortable cushion using some type of a flowable fluid (such as liquid, air, gas, emulsion, lubricated objects or particles, etc.) within one or more fluid-tight bladders. When an object is placed on the fluid cushion, or when an object resting on the cushion is re-positioned, the fluid flows within the bladder and the bladder correspondingly deforms to conform to the shape of the object being cushioned. This results in a cushion which tends to equally distribute a cushioning pressure across the entire contact surface of the object being cushioned, and maximizes the percentage of the surface area of the object which is under pressure. Correspondingly, this also eliminates or reduces pressure peaks on the cushioned object.

Prior art fluid cushions have a number of problems, however. First, when the object being cushioned is shifted or repositioned on the fluid cushion, instability may result. Second, depending upon the type of fluid used, the cushion may have a high thermal mass and a high rate of thermal transfer, resulting in a cushion which is cold to the touch and which tends to draw heat out of the object being cushioned. This can result in discomfort when the object being cushioned is a human being. Third, fluid cushions are typically very costly to manufacture. Fourth, due to the necessity of maintaining a fluid-tight bladder, fluid cushions may be unreliable due to the possibility of bladder puncture. Fifth, if a fluid cushion is not of sufficient thickness, the object being cushioned may displace enough of the cushioning fluid to bottom out against a base on which the fluid bladder is resting, resulting in little or no cushioning effect. Sixth, fluid cushions have little shape memory, so they do not return to their original shape when the cushioned object is removed. Consequently, fluid cushions do not have an aesthetically pleasing appearance and are typically not considered appropriate for furniture. Seventh, fluid cushions typically do not permit good air circulation between the cushioned object and the cushion, resulting in moisture building up between the cushioned object and the bladder (e.g. perspiration from a human body). And eighth, many (but not all) prior art fluid cushions tended to be very heavy. Fluid cushions which use the composite mixture disclosed in U.S. Pat. No. 5,421,874 tend to be lightweight, however.

Examples of fluid cushions include the following: United Kingdom Patent No. 1,261,475 which was published on Jan. 26, 1972; U.S. Pat. No. 5,369,828 issued in the name of Graebe on Dec. 6, 1994; U.S. Pat. No. 5,103,518 issued in the name of Gilroy et al. on Apr. 14, 1992; U.S. Pat. No. 4,945,588 issued in the name of Cassidy et al. on Aug. 7, 1990; U.S. Pat. No. 4,737,998 issued in the name of Johnson, Sr. on Apr. 19, 1988; U.S. Pat. No. 4,485,505 issued in the name of Paul on Dec. 4, 1984; U.S. Pat. No. 4,292,701 issued in the name of Woychick on Oct. 6, 1981; U.S. Pat. No. 3,462,778 issued in the name of Whitney on Aug. 26, 1969; U.S. Pat. No. 2,672,183 issued in the name of Forsyth on Mar. 16, 1954; U.S. Pat. No. 2,814,053 issued in the name of Sevcik on Nov. 26, 1957; U.S. Pat. No. 2,491,557 issued in the name of Goolsbee on Dec. 20, 1949; U.S. Pat. No. 5,100,712 issued in the name of Drew et al. on Mar. 31, 1992; U.S. Pat. No. 5,255,404 issued in the name of Dinsmoor, III et al. on Oct. 26, 1994; U.S. Pat. No. 5,204,154 issued in the name of Drew et al. on Apr. 20, 1993; U.S. Pat. No. 5,201,780 issued in the name of Dinsmoor, III et al. on Apr. 13, 1993; U.S. Pat. No. 5,147,685 issued in the name of Hanson on Sep. 15, 1992; U.S.

Pat. No. 5,058,291 issued in the name of Hanson on Oct. 22, 1991; U.S. Pat. No. 5,020,176 issued in the name of Dotson on Jun. 4, 1991; U.S. Pat. No. 5,018,790 issued in the name of Jay on May 28, 1991; U.S. Pat. No. 5,093,138 issued in the name of Drew et al. on Mar. 3, 1992; U.S. Pat. No. 4,842,330 issued in the name of Jay on Jun. 27, 1989; U.S. Pat. No. 4,761,843 issued in the name of Jay on Aug. 9, 1988; U.S. Pat. No. 4,728,551 issued in the name of Jay on Mar. 1, 1988; U.S. Pat. No. 4,726,624 issued in the name of Jay on Feb. 23, 1988; U.S. Pat. No. 4,660,238 issued in the name of Jay on Apr. 28, 1987; U.S. Pat. No. 4,588,229 issued in the name of Jay on May 13, 1986; U.S. Pat. No. 4,483,029 issued in the name of Paul on Nov. 20, 1984; U.S. Pat. No. 4,255,202 issued in the name of Swan, Jr. on Mar. 10, 1981; U.S. Pat. No. 4,247,963 issued in the name of Reddi on Feb. 3, 1981; U.S. Pat. No. 4,243,754 issued in the name of Swan, Jr. on Jan. 6, 1981; U.S. Pat. No. 4,229,546 issued in the name of Swan, Jr. on Oct. 21, 1980; U.S. Pat. No. 4,144,658 issued in the name of Swan, Jr. on Mar. 20, 1979; U.S. Pat. No. 4,083,127 issued in the name of Hanson on Apr. 11, 1978; U.S. Pat. No. 4,038,762 issued in the name of Swan, Jr. on Aug. 2, 1977; U.S. Pat. No. 3,968,213 issued in the name of Lynch on Oct. 19, 1976; and U.S. Pat. No. 3,748,669 issued in the name of Warner on Jul. 31, 1973, each of which is hereby incorporated by reference in its entirety for the material disclosed therein.

3. Gel Cushions

Another design which those in the prior art attempted to employ to create an effective cushion included the use of gelatinous materials ("gels"). Gelatinous materials are soft elastic or viscoelastic materials which easily deform but return to their original shape after the deforming force is removed. The prior art gel cushions had one or more of the following problems. First, gel cushions had a high thermal mass and a high coefficient of thermal transfer, making them cold to the touch and causing them to drain heat out of a cushioned object. Second, gel cushions tended to be costly to manufacture. Third, gel cushions had limited compressibility and therefore did not permit the cushioned object to sink deep into the gel. As a result, only a small surface area of the cushioned object is cushioned by a prior art gel cushion, resulting in a greater supporting force being applied on that small surface area than would be applied if a greater surface area of the cushioned object were to contact the gel cushion for support. This is because in order for the cushioned object to sink into prior art gel cushions, the cushions, which tended to be relatively incompressible, must expand in directions generally normal to the direction of the intended sinking, a behavior which cannot be accommodated in most cushioning applications.

Notwithstanding their problems in the prior art, gel cushions have some attractive features. For example, a gel cushion permits a near-hydrostatic pressure distribution across the surface area of the cushioned object if the cushioned object is allowed to sink into the gel and the overall dimensions of the cushion are not restricted so that such sinking in would be prevented. Also, gel cushions have the aesthetic advantage, through their shape memory, of being capable of returning to their original shape after the cushioned object is removed.

Documents which disclose gel cushions include: U.S. Pat. No. 5,456,072 issued in the name of Stern on Oct. 10, 1995; U.S. Pat. No. 5,362,834 issued in the name of Schapel et al. on Nov. 8, 1994; U.S. Pat. No. 5,334,646 issued in the name of Chen on Aug. 2, 1994; U.S. Pat. No. 5,191,752 issued in the name of Murphy on Mar. 9, 1993; and U.S. Pat. No. 4,913,755 issued in the name of Grim on Apr. 3, 1990, each of which is hereby incorporated by reference in its entirety.

4. Thermoplastic Film Honeycomb Cushions

Another type of cushion in the prior art is made from multiple perforated sheets of pliable thermoplastic film which are intermittently welded together and then expanded into a pliable plastic honeycomb. Honeycomb cushions may have problems such as a high cost of manufacture and an inability to equalize supporting pressure in order to avoid pressure peaks on the most protruding parts of the object being cushioned. This is because of the relatively rigid nature of the thermoplastic and thermoplastic elastomer films used in the honeycomb cushion construction. Honeycomb cushions also carry the risk that the cushioned object will bottom out through the cushion. This is because the films are thin and relatively rigid, so collapsed cells within the cushion offer no real cushioning effect.

The advantages of honeycomb cushions include their light weight. Most of the cushion consists of voids within the cells of the honeycomb, the voids being filled with air, resulting in a lightweight cushion. Another advantage is that honeycomb cushions provide good air circulation between the cushioned object and the cushion due to the perforations in the cell walls of the honeycomb and/or in the facing sheets above and below the honeycomb cells.

Examples of honeycomb or multilayer film cushions are as follows: U.S. Pat. No. 5,445,861 issued in the name of Newton et al. on Aug. 29, 1995; U.S. Pat. No. 5,444,881 issued in the name of Landi et al. on Aug. 29, 1995; U.S. Pat. No. 5,289,878 issued in the name of Landi on Mar. 1, 1994; U.S. Pat. No. 5,203,607 issued in the name of Landi on Apr. 20, 1993; U.S. Pat. No. 5,180,619 issued in the name of Landi et al. on Jan. 19, 1993; U.S. Pat. No. 5,015,313 issued in the name of Drew et al. on May 14, 1991; U.S. Pat. No. 5,010,608 issued in the name of Barnett et al. on Apr. 30, 1991; U.S. Pat. No. 4,959,059 issued in the name of Eilender et al. on Sep. 25, 1990; and U.S. Pat. No. 4,485,568 issued in the name of Landi et al. on Dec. 4, 1984, each of which is hereby incorporated by reference in its entirety.

5. Mattressing

In the prior art there has been work in the field of mattressing, which is considered to be related background against which the invention was made. For references with disclosure relevant to mattressing, the reader is directed to United Kingdom Patent No. 1,261,475 which was published on Jan. 26, 1972; U.S. Pat. No. 5,369,828 issued in the name of Graebe on Dec. 6, 1994; U.S. Pat. No. 5,103,518 issued in the name of Gilroy et al. on Apr. 14, 1992; U.S. Pat. No. 4,945,588 issued in the name of Cassidy et al. on Aug. 7, 1990; U.S. Pat. No. 4,737,998 issued in the name of Johnson, Sr. on Apr. 19, 1988; U.S. Pat. No. 4,485,505 issued in the name of Paul on Dec. 4, 1984; U.S. Pat. No: 4,292,701 issued in the name of Woychick on Oct. 6, 1981; U.S. Pat. No. 3,462,778 issued in the name of Whitney on Aug. 26, 1969; U.S. Pat. No. 2,672,183 issued in the name of Forsyth on Mar. 16, 1954; U.S. Pat. No. 2,814,053 issued in the name of Sevcik on Nov. 26, 1957; and U.S. Pat. No. 2,491,557 issued in the name of Goolsbee on Dec. 20, 1949, each of which is hereby incorporated by reference.

The reader will find that the prior art thus had numerous shortcomings which are addressed by the invented cushion, as outlined below.

SUMMARY OF THE INVENTION

It is an object of the invention to provide a cushion that distributes supporting pressure on an object being cushioned in a manner that is generally even and without pressure peaks. It is a feature of the invention that the cushion has a low surface tension and permits a cushioned object to sink deeply into it. This action is due to compressibility of the cushion. It is also a feature of the invented cushion that some of the columns present in the invented cushion tend to buckle under the weight of the object being cushioned. This buckling is especially useful in accommodating protrusions from the object being cushioned into the cushion. The ability to accomodate protrusions through buckling of the cushion columns eliminates pressure peaks. It is a consequent advantage of the invention that the invented cushion is comfortable and does not tend to constrict blood flow in the tissue of a human being on the cushion, thus being suitable for medical applications and other applications where the object being cushioned may be immobile for long periods of time, such as in automobile seats, furniture, mattresses, and other applications.

It is an object of the invention to provide a cushion that eliminates pressure peaks on an object being cushioned. It is a feature of the invention, as mentioned above, that the invented cushion includes columns which buckle under protuberances on a cushioned object. As a result, the cushioned object is not exposed to pressure peaks.

It is an object of the invention to maximize the surface area of the cushioned object that is in contact with the cushion by permitting the cushioned object to sink deeply into the cushion, without the prior art problem that exterior surfaces of the cushion that are not in the plane in contact with the cushioned object must expand. It is a feature of the invented cushion that the cushion is compressible and that the cushion includes columns within it that can buckle under the weight of the cushioned object. The bottom of the cushion and its outside periphery, not including the surface of the cushion in contact with the cushioned object, may, if desired, be restrained, but the compressibility and bucklability of the cushion will still permit the cushioned object to sink into the cushion. It is an advantage of the invention that a gel cushion is provided which can have a constrained periphery but which will still permit a cushioned object to sink deeply into it.

It is an object of the invention to provide a cushion that eliminates the head pressure found in some fluid cushions. In fluid cushions, the flowable media may be drawn by gravity so that it exerts pressure on some portions of the cushioned object as the cushioning media attempts to flow in response to the gravitational force. This pressure is referred to as "head pressure." Head pressure can cause discomfort and tissue damage to a human using the cushion. The gel of which the invented cushion is made does not flow so it does not develop head pressure.

It an object of the invention to provide a cushion which is inexpensive to manufacture compared to prior art cushions. It is a feature of the invention that the invented cushion may be very quickly and cheaply injection molded or cast from suitable low cost gel materials. It is an advantage of the invention that a cushion which incorporates the features of the invention may be produced for substantially less cost than prior art cushions with comparable performance characteristics.

It is an object of the invention to provide a cushion that is stable as the center of gravity of the cushioned object is shifted. It is a feature of the invention that a cushioned object may sink deeply into the cushion. It is also a feature of the invention that the gel of the invented cushion does not allow flow of the cushioning media as in fluid cushions. It is also a feature of the invented cushion that it is adapted to accomodate the sinking in of an object but tends to be relatively rigid in a horizontal direction and thus resist horizontal displacing forces. Consequently, an object being cushioned by the invented cushion can be shifted on the cushion without a tendency of the cushion to move unpredictably underneath the cushioned object. As a result, the invented cushion displays a high degree of stability.

It is an object of the invention to provide a cushion that will not lose its structural integrity or cushioning effect if punctured. It is a feature of one preferred embodiment of the invention that the gel used to make the cushion is a solid (although a flexible, resilient solid) at ordinary room temperatures (i.e. below 130° Fahrenheit). Thus, even if the cushion is punctured, there is no escape of cushioning media, as would occur if a prior art fluid cushion were punctured. It is thus an advantage of the invention that superior durability is provided in the cushion.

It is an object of the invention to provide a cushion that has shape memory. It is a feature of the invented cushion that a gel is used to make the cushion that tends to return to its original shape after a displacing force (such as the gravitational force exerted on a cushioned object) is removed. It is an advantage of the invention that attractive cushions suitable for devices such as furniture, automobile seats, theatre seats, etc. are provided. Prior art fluid cushions were not desirable for such applications because they tended to retain the shape of the cushioned object after the cushioned object was removed. This was considered unsightly. The invented cushion, in contrast, returns to its orignal, as-new shape after the cushioned object is removed.

It is an object of the invention to provide a cushion which provides a superior amount of air circulation between the cushion and the cushioned object in comparison to the prior art. It is a feature of the invention that hollow columns are provided in one preferred embodiment of the invention through which air may circulate. The surface area of the cushioned object that is in contact with the cushion is therefore in contact only with the circumferential rims of the hollow columns. Thus, most of the surface area of the cushioned object within the perimeter of the outermost points of contact between the cushioned object and the cushion is exposed to air circulation through the hollow columns. It is thus an advantage of this structure that heat buildup between the cushioned object and the cushion is lessened in comparison with the prior art cushions. If the cushioned object is a human being, this structure provides the human being with far greater comfort than prior art cushions because the invented cushion will facilitate rapid evaporation of sweat rather than causing a sweat buildup as in prior art cushions.

It is an object of the invention to provide a cushion that is lightweight. This is an important object for all applications of the invention, but particularly important for medical applications. It is a feature of the invention that the invented cushion includes a number of hollow columns so that the predominant volume of space occupied by the cushion is actually occupied by a gas such as air. Consequently, the total weight of the cushion is low.

It is an object of the invention to provide a cushion that has a low rate of thermal transfer and a low thermal mass. Many prior art cushions, such as fluid cushions, felt cold to the touch and tended to draw heat out of a human being resting on the cushion. This caused discomfort to the human being. The invented cushion occupies a volume of space predominantly with a gas such as air which has a low thermal mass. It is an advantage of the invention that the cushion has a substantially reduced tendency to feel cold to the touch, compared to the prior art, and that the cushion does not tend to draw heat from the object being cushioned. The result is a comfortable cushion.

It is an object of the invention to provide a cushion that will offer cushioning protection to a cushioned object even if the cushioned object has bottomed out within the cushion. A cushioned object is considered to have bottomed out within a cushion if it has sunk into the cushion beyond the point where the normal cushioning mechanism is effective. An alternative way of stating this is that the cushioned object has sunk into the cushion to the extent that a portion of the cushion has been compressed to an extent that is not further compressible. The invented cushion, due to the elastic nature of the gel used, tends to have more give and resiliency than a hard surface, such as a wooden chair, would, even when the cushioned object has bottomed out in the cushion. Thus, the cushion continues to provide some cushioning effect beneath the portion of the cushioned object that has bottomed out. Additionally, the cushion will continue to cushion effectively beneath the portion of the cushioned object that has not bottomed out within the cushion.

It is an object of the invention to provide a cushion that has a great range of compressibility. The invented cushion, in its preferred embodiments, has a substantial depth measurement along its vertical columns. The cushioned object sinks into the cushion some portion of that depth measurement. The preferred cushion has enough depth and compressibility that the cushioned object can be of a very wide range of weights and still receive effective cushioning from the invented cushion.

It is an object of the invention to provide a cushion that achieves near hydrostatic pressure distribution across the contact area of the object being cushioned. The compressibility of the gel columns provides good overall cushioning, and the buckling of columns beneath the most protruding points relieves pressure at the points where it is highest in prior art foam or solid gel cushions.

These and other objects, features and advantages of the invention will become apparent to persons of ordinary skill in the art upon reading the specification in conjunction with the accompanying drawings.

DESCRIPTION OF THE PREFERRED EMBODIMENT

Configuration of the Cushions

Figure 1:
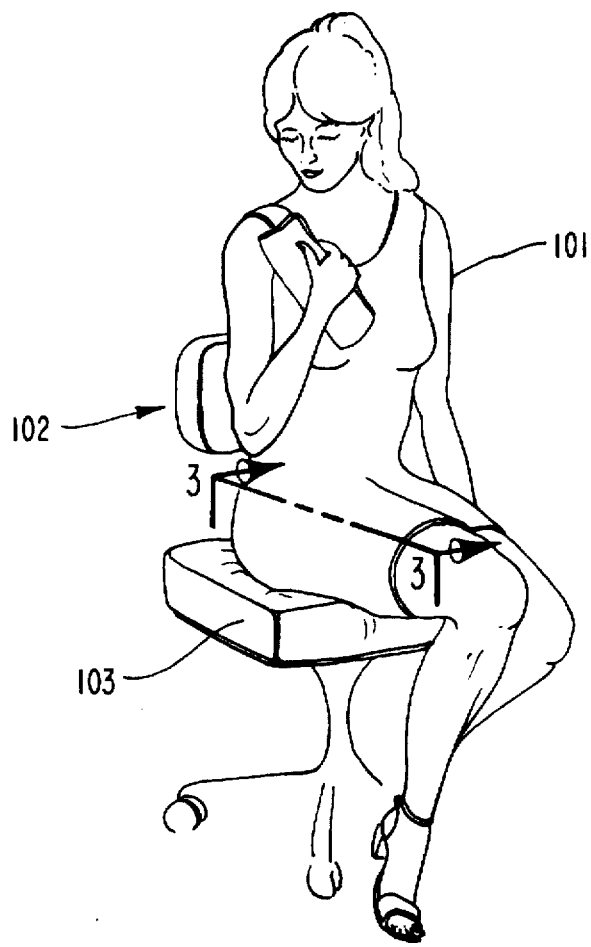
FIG. 1 depicts the invented cushion as part of an office chair.

FIG. 1 depicts a cushioned object 101, in this instance a human being, atop of a piece of furniture 102, in this instance a chair, which includes the invented cushion 103. Although in this embodiment, the invented cushion 103 is depicted as part of an office chair, the invented cushion may be used with many types of products, including furniture such as sofas, love seats, kitchen chairs, mattresses, lawn furniture, automobile seats, theatre seats, padding found beneath carpet, padded walls for isolation rooms, padding for exercise equipment, wheelchair cushions, bed mattresses, and others.

Figure 2:
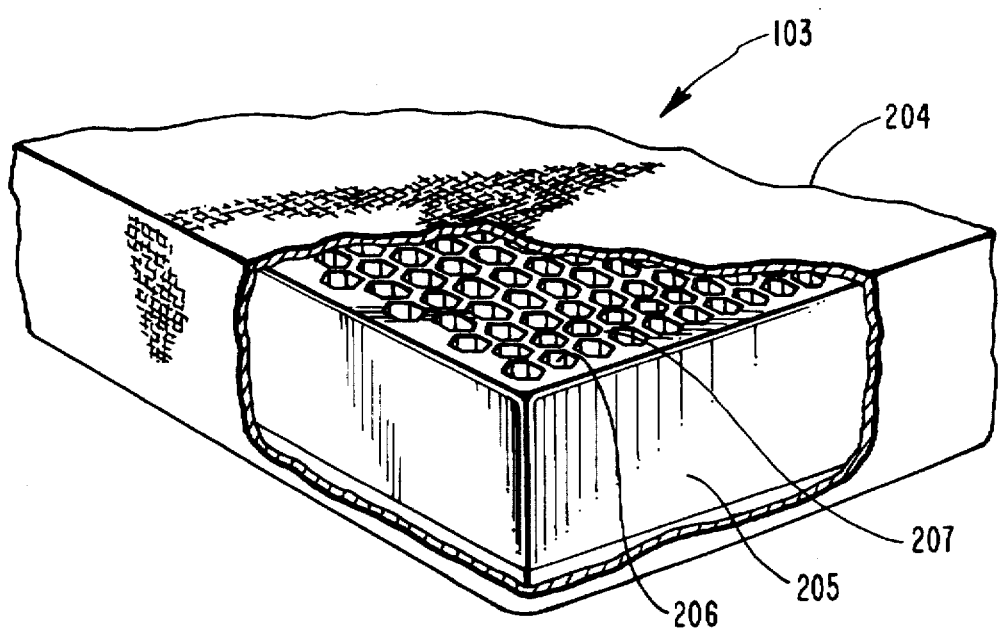
FIG. 2 depicts the invented cushion including its cushioning element and cover.

Referring to FIG. 2, the cushion 103 of FIG. 1 is depicted in greater detail. The cushion 103 includes a cover 204. The preferred cover is a durable and attractive fabric, such as nylon, cotton, fleece, synthetic polyester or another suitable material which is preferably stretchable and elastic and which readily permits the flow of air through it to enhance ventilation of a cushioned object. Within the cover 204, a cushioning element 205 is to be found. As can be seen from the figure, the cushioning element 205 comprises a cushioning media of a desired shape. In the embodiment depicted, the cushioning element 205 includes gel cushioning media formed generally into a rectangle with four sides, a top and a bottom, with the top and bottom being oriented toward the top and bottom of the page, respectively. The cushioning element has within its structure a plurality of hollow columns 206. As depicted, the hollow columns 206 contain only air. The hollow columns 206 are open to the atmosphere and therefore readily permit air circulation through them, through the cover 204 fabric, and to the cushioned object. The columns 206 have column walls 207 which in the embodiment depicted are hexagonal in configuration. It is preferred that the total volume of the cushioning element will be occupied by not more than about 50% gel cushioning media, and that the rest of the volume of the cushioning element will be gas or air. This yields a lightweight cushion with a low overall rate of thermal transfer and a low overall thermal mass. It is not necessary that this percentage be complied with in every instance that the inventive concept is practiced, however.

Figure 3:
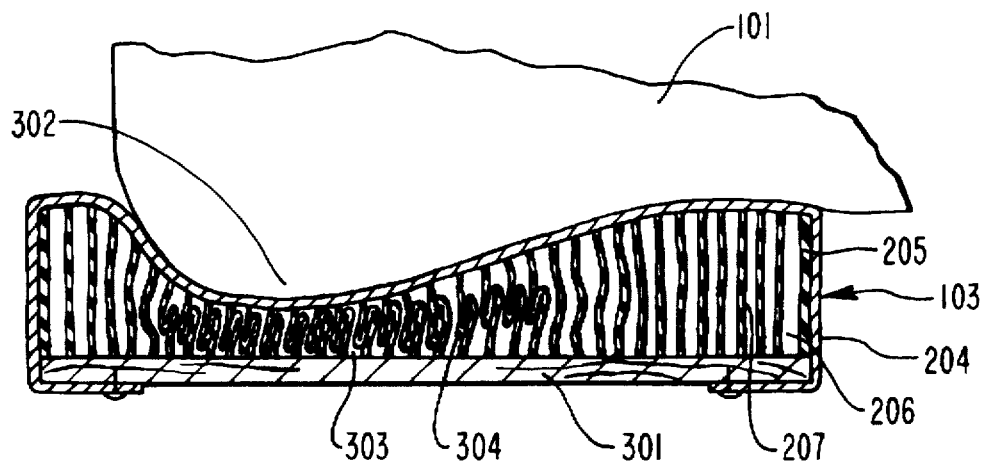
FIG. 3 depicts a cutaway of the invented cushion of FIG. 1 at 3—3.

Referring to FIG. 3, a cushioned object 101 (in this instance a human being) is depicted being cushioned by the invented cushion 103 which includes cushioning element 205 within cover 204. Also visible is a cushion base 301 of a rigid material such as wood, metal, plastic on which the cushioning element 205 rests. The cushioning element 206 includes hollow columns 206 with walls 207. It can be seen that beneath the most protruding portion of the cushioned object, in this instance a hip bone 302, the hollow columns 303 have walls 304 which have partially or completely buckled in order to accomodate the protuberance 302 and avoid creating a high pressure point below the protuberance 302 in response to the compressive force exerted by the cushioned object. Buckled columns offer little resistance to deformation, thus removing pressure from the hip bone area. It can also be seen that in portions of the cushioning element 205 which are not under the protuberance 302, the cushioning media which forms the walls 304 of the hollow columns 303 has compressed but the columns 303 have not buckled, thus loading the cushioned object across the broad surface area of its non-protruding portions. From this figure it can be seen the the cushion is yieldable as a result of the compressability of the cushioning media and the bucklability of the columns (or column walls). The cushion 103 is depicted as having been manufactured using the mold depicted in FIG. 4. It can be seen from this cushion's response to a compressive force exerted by the cushioned object that the cushion and the cushioning element are adapted to have a cushioned object place on top of them.

Figure 5:
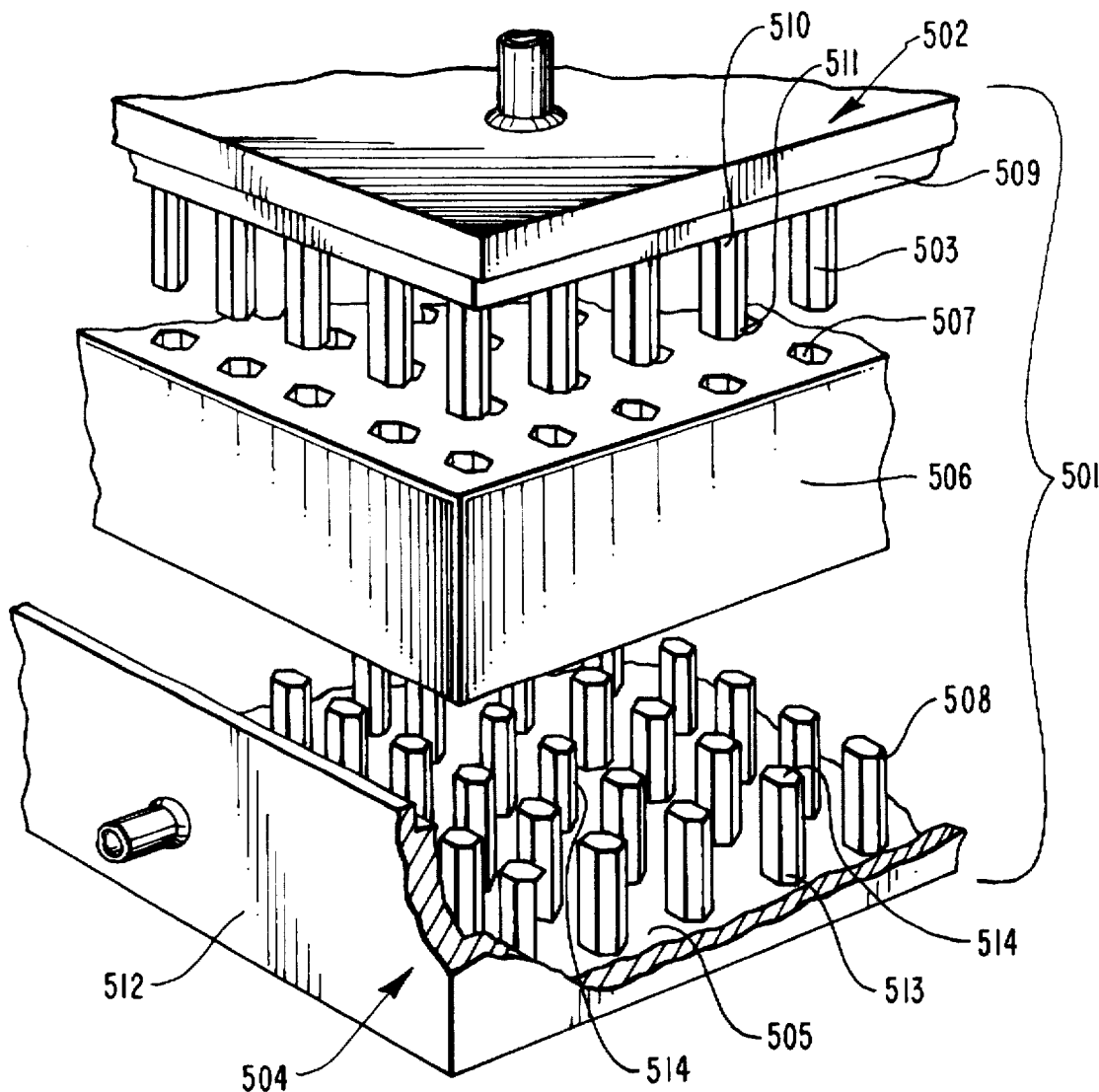
FIG. 5 depicts an alternative mold for manufacturing the invented cushion.
Figure 6:
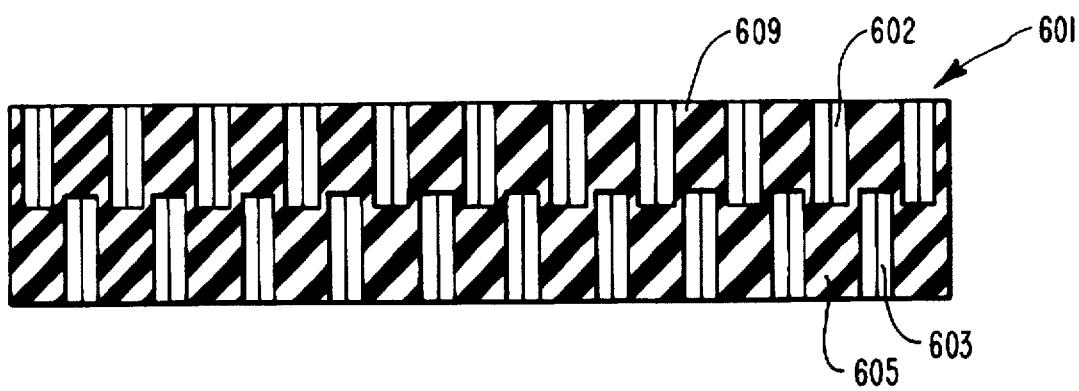
FIG. 6 depicts a cross sectional view of a cushion manufactured using the mold of FIG. 5.

Referring to FIG. 6, a cross section of an alternative embodiment of the invention is depicted. The cushioning element 601 includes cushioning media 609 (which is preferred to be a gel cushioning media) which form walls 605 for columns 602, 603. It can be seen that the columns 602 and 603 are oriented into a group protruding from the top of the cushioning element 601 down into the cushioning media 609 but not reaching the bottom of the cushioning element of which column 602 is a member, and a group protruding from the bottom of the cushioning element 601 into the cushioning element 601 but not reaching the top of the cushioning element 601 of which column 602 is a member. This yields a generally firmer cushion than that shown in some other figures. This cushion would be manufactured by the mold depicted in FIG. 5.

Figure 7:
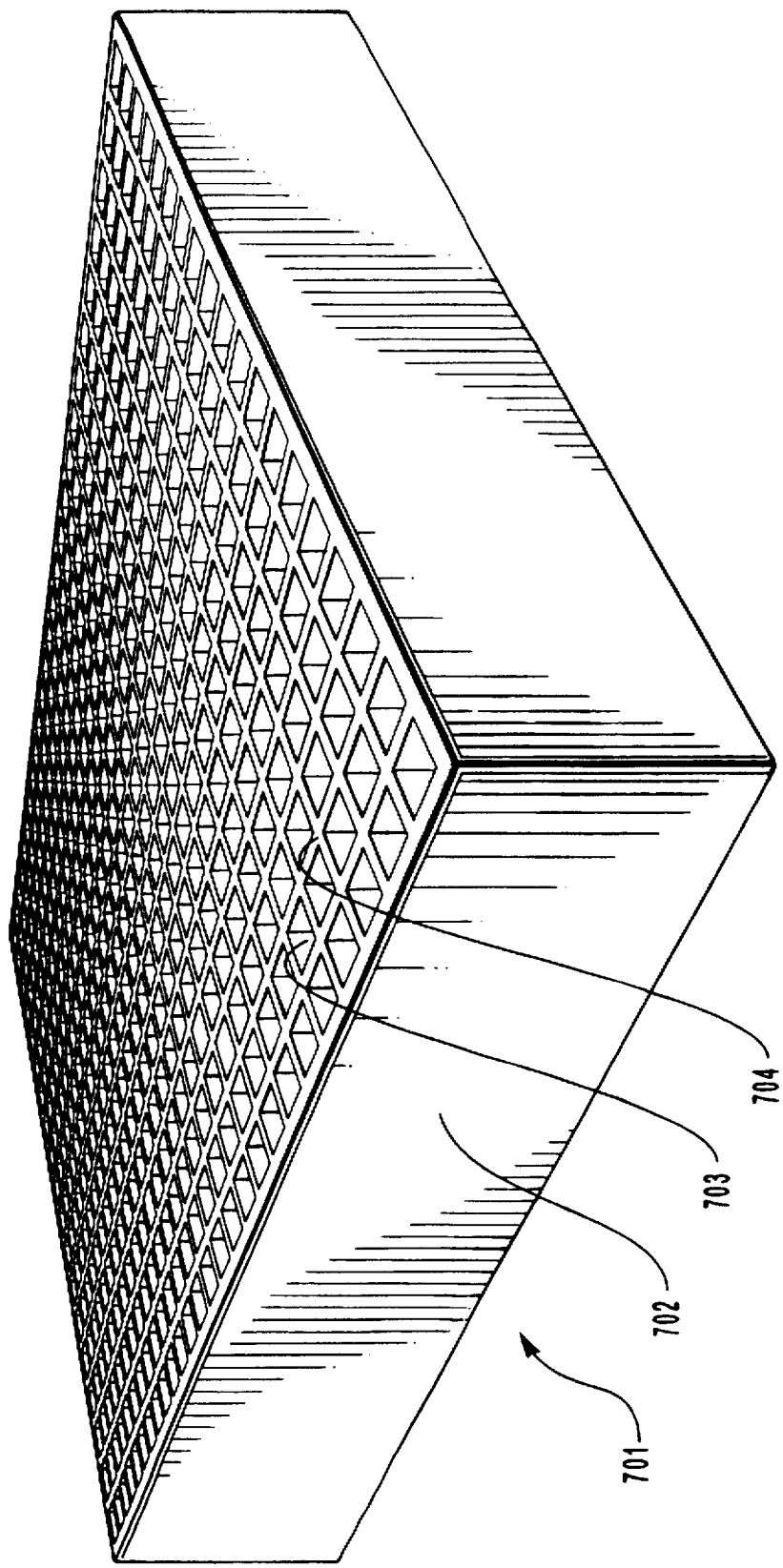
FIG. 7 depicts an isometric view of an alternative embodiment of the invented cushion.

Referring to FIG. 7, an alternative embodiment of a cushioning element 701 is depicted. The cushioning element includes cushioning media 702, columns 703 and column walls 704. The columns depicted in FIG. 7 are square in a cross section taken orthogonal to their longitudinal axis, in contrast to the columns of FIG. 2 which are hexagonal in a cross section taken orthogonal to their longitudinal axis. It is also of note that in FIG. 7, the columns 703 are arranged as an n×m matrix with each row and each column of columns in the matrix being aligned perfectly adjacent to its neighbor, with no offsetting. Examplary sizing and spacing of columns in the invention would include columns which have a cross sectional diameter taken orthogonal to the longitudinal axis of about 0.9 inches and a column wall thickness of about 0.1 inches at the thinnest point on a column wall. Many other dimensions and spacing of columns and column walls may be employed while practicing the inventive concept.

Figure 8:
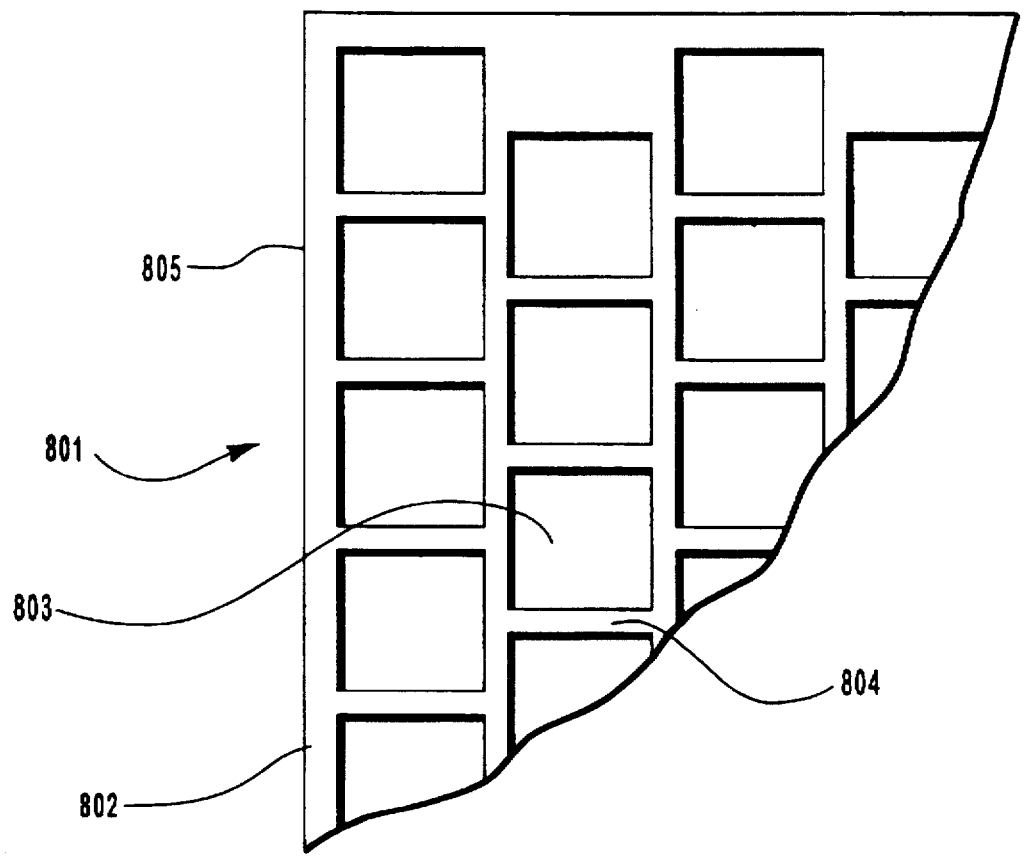
FIG. 8 depicts a top view of an alternative embodiment of the invented cushion.

Referring to FIG. 8, a top view of an alternative cushioning element 801 is depicted. The cushioning element 801 includes cushioning media 802 which forms column walls 804, columns 803 and an exterior cushioning element periphery 805. It can be seen that the columns 803 of FIG. 8 are arranged in offset fashion with respect to some of the columns to which they are adjacent. A myriad of column arrangements is possible from the well-organized arrangements of the columns to a random arrangement. It is preferred that the columns be arranged so that the total volume of gel cushioning media 802 within the volume of space occupied by the cushioning element 801 is minimized. This results in a lightweight cushion. To that end, the columns 803 may be arranged in close proximity to each other in order to minimize the thickness of the column walls 804. This will result in a lighter cushion and a cushion that will yield to a greater extent under a cushioned object of a given weight than a similar cushion with thicker column walls 804.

Figure 9:
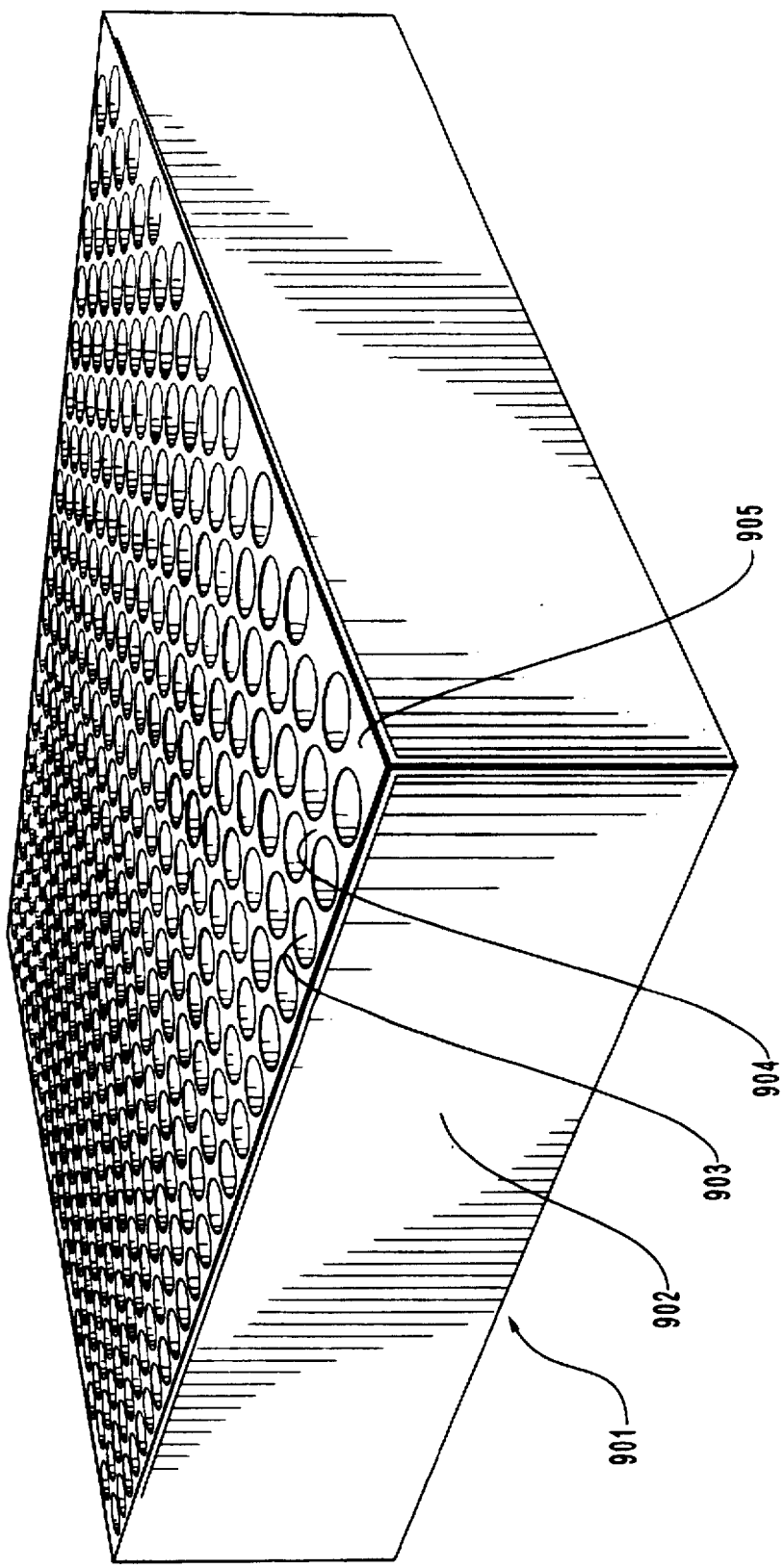
FIG. 9 depicts an isometric view of an alternative embodiment of the invented cushion.
Figure 13:
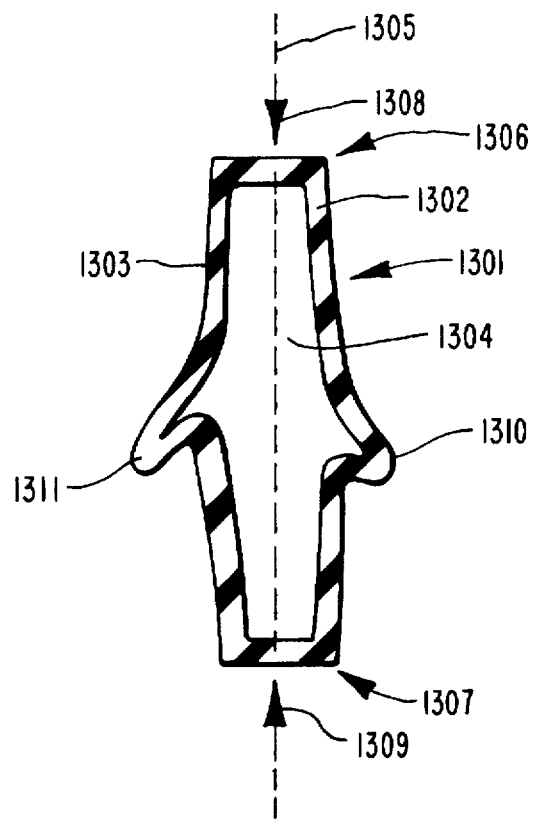
FIG. 13 depicts forces in play as a column buckles.
Figure 14:
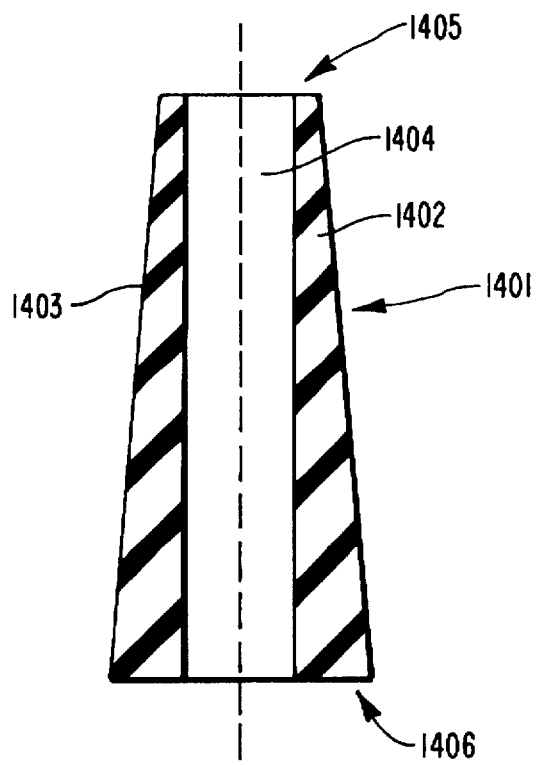
FIG. 14 depicts an alternative structure for a column and its walls.

Referring to FIG. 9, an alternative cushioning element 901 is depicted with cushioning media 902, columns 903, column walls 904 and outer periphery 905 of the cushioning element 901 being shown. The columns 902 depicted are round in a cross section taken orthogonal to their longitudinal axes. The reader should note that it may be desirable to include a container or side walls which will contain the outer periphery 905 of the cushioning element. For example, in FIG. 9, a rectangular box with interior dimensions just slightly larger than the exterior dimensions of the cushioning element 901 could be employed. Or in FIG. 1, the side walls of the cover 204 could be rigid, such as by the use of plastic inserts. The effect of rigid side walls or a rigid container for a cushioning element is that when a cushioned object is placed on the cushioning element, the cushioning media will not be permitted to bulge outward at the cushioning element outer periphery. By preventing such outward bulging, greater cushion stability is achieved and a more direct (i.e. in a direction parallel to the longitudinal axis of a column, which in most of the figures, such as FIG. 3, is assumed to be in the direction of the Earth's gravity but which may not always be so) movement or descent of the cushioned object into the cushion is achieved. A direct movement or descent of a cushioned object into the cushion (i.e. parallel to the longitudinal axes of the columns) is desired because the column walls are configured to absorb weight and cushion the cushioned object, or, if the load under a protuberance gets high enough, by buckling of the columns. If a cushioned object travels a substantial distance sideways in the cushion, the hollow portion of the columns may be eliminated by opposing column walls collapsing to meet each other rather than either substantially compressing the cushioning media or by buckling as depicted in FIGS. 13 and 14. This would not provide the desired cushioning effect as it would result in collapsed columns within the cushion (rather than buckled columns), and the cushion would have little more cushioning effect than a solid block of the cushioning media without the columns.

Figure 10:
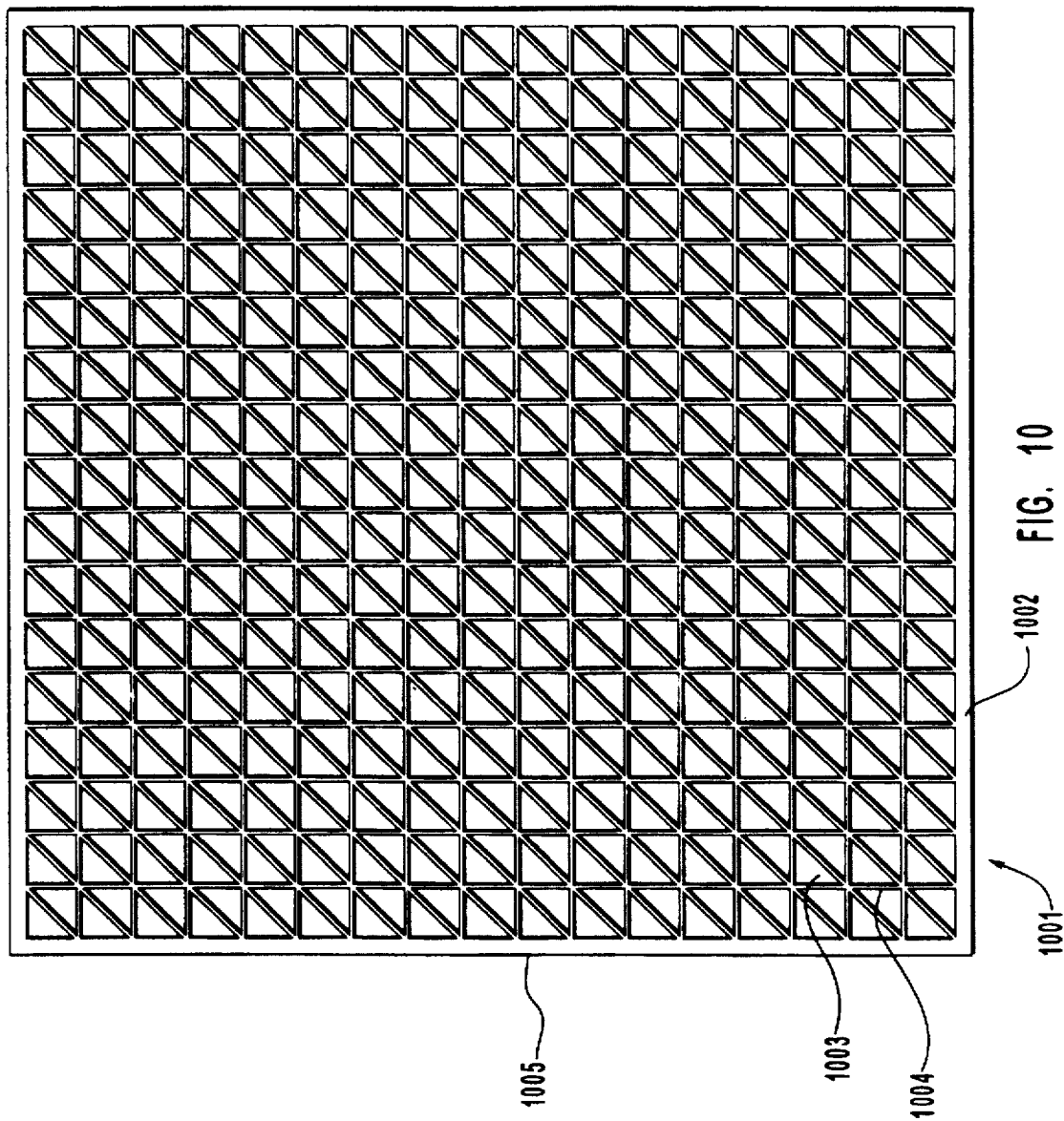
FIG. 10 depicts a top view of an alternative embodiment of the invented cushion.

Referring to FIG. 10, an alternative embodiment of the invented cushion 1001 is depicted. The cushion 1001 includes gel cushioning media 1002 in the form of an outer cushion periphery 1003, and column walls 1004 which form triangular hollow columns 1005. The reader should note that the columns of the various figures are merely illustrative, and in practice, the columns could be triangular, rectangular, square, pentagonal, hexagonal, heptagonal, octagonal, round oval, n-sided or any other shape in a cross section taken orthogonal to the longitudinal axis of a column. The periphy of the cushioning element may also be triangular, rectangular, square, pentagonal, hexagonal, heptagonal, octagonal, round oval, heart shaped, kidney-shaped, elliptical, oval, egg-shaped, n-sided or any other shape.

Figure 11:
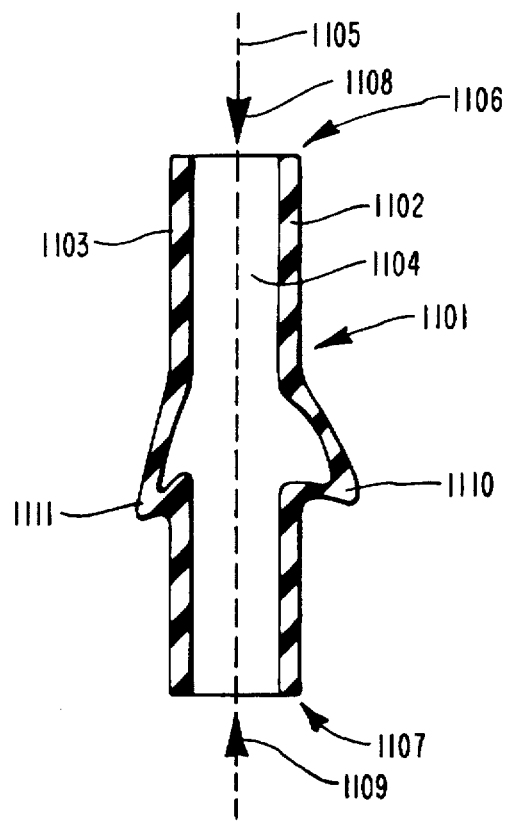
FIG. 11 depicts a cross sectional view of a column of the invention during one mode of buckling.

FIG. 11 depicts a column 1101 of the invention including column walls 1102 and 1103 and column interior 1104. The column 1101 has a longitudinal axis 1105 which is preferred to be oriented in the invented cushion parallel to the direction of the longitudinal axis of a column which should be the direction that the cushioned object sinks into the cushion. Thus, the column top 1106 is at the side of the cushion that contacts the cushioned object, and the column bottom 1107 is at the side of the cushion that typically faces the ground and will rest on some sort of a base. Another way of describing this with respect to the longitudinal axis of each column is that the column top is at one end of the longitudinal axis of a column and the column bottom is at the other end of the longitudinal axis of a column. When an object to be cushioned is placed onto a cushion which contains many such columns 1101, such as is shown in FIG. 3, a depressive force 1108 is applied to the cushion and to the column 1101 by the cushioned object. Because the cushion is expected to rest on some type of supporting surface, such as a base, a reaction force 1109 is provided by the supporting surface. The cushion, including the column 1101, yields under the weight of the cushioned object. This yielding is a result of compression of the cushioning media and, if the load under a protruding portion of the cushioned object is high enough, by buckling or partial buckling of the columns 1101. From the figure, it can be seen that the depicted column 1101 buckles because the flexible cushion walls 1102 and 1103 buckle outward around the circumference of the column, as depicted by cross-sectional points 1110 and 1111. In other words, the column walls buckle radially outward orthogonally from the longitudinal axis of the column. This permits the column 1101 to decrease in total length along its longitudinal axis 1108 and thereby conform to the shape of protuberances on a cushioned object. Since buckled columns carry comparatively little load, this results in a cushion that avoids pressure peaks on the cushioned object.

Figure 12:
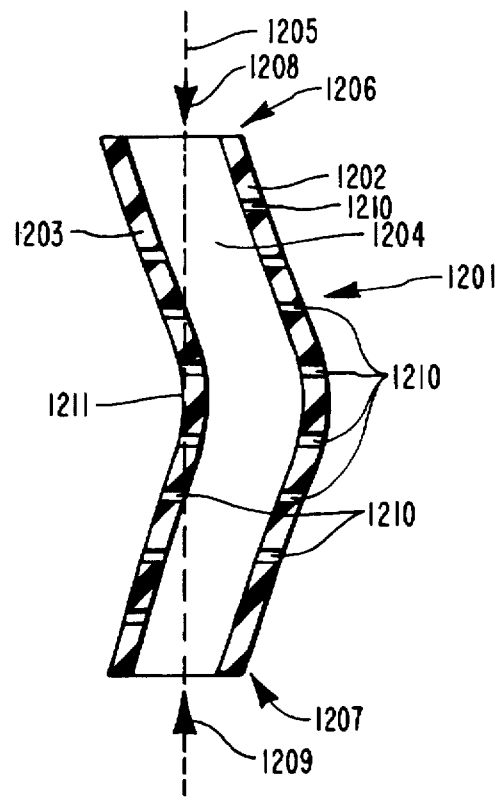
FIG. 12 depicts a cross sectional view of a column of the invention during another mode of buckling.

FIG. 12 depicts a column 1201 of the invention including column walls 1202 and 1203 and column interior 1204. The column 1201 has a longitudinal axis 1205 which is preferred to be oriented in the invented cushion parallel to the direction of movement of a cushioned object sinking into the cushion. Thus, the column top end 1206 is at the side of the cushion that contacts the cushioned object, and the column bottom end 1207 is at the side of the cushion that typically will rest on some sort of a base. When an object to be cushioned is placed against a cushion which contains numerous columns 1201, such as is shown in FIG. 3, a depressive force 1208 is applied to the cushion and to the column 1201 by the cushioned object. Because the cushion is expected to rest on some type of supporting surface, such as a base, a reaction force 1209 is provided by the supporting surface. The cushion, including the column 1201, yields under the weight of the cushioned object. This yielding is a result of compression of the cushioning media and, if the load under a protruding portion of the cushioned object is high enough, by buckling or partial buckling of the columns. From the figure, it can be seen that the depicted column 1201 buckles because the flexible cushion wall 1202 buckles outward from the column center or orthogonal away from the longitudinal axis of the column at point 1210, while cushion wall 1203 buckles inward toward the column center or orthogonal toward the longitudinal axis of the column at points 1211. This buckling action the column 1201 to decrease in total length along its longitudinal axis 1208 and thereby conform to the shape of protuberances on a cushioned object. At point 1210, the column wall 1202 is depicted buckling outward (away from the center of the column) and at point 1211, the column wall 1203 is depicted as buckling inward (toward the center of the column). Alternatively, both points 1210 and 1211 could buckle inward toward the center of the column or both could buckle outward. Since buckled columns carry comparatively little load, this results in a cushion that avoids pressure peaks on the cushioned object. Buckling of a column permits the column to decrease in total length along its longitudinal axis and thereby conform to the shape of protuberances on a cushioned object. This results in a cushion that avoids pressure peaks on the cushioned object. It should be noted by the reader that the columns 1101 and 1201 depicted in FIG. 11 and 12 are hollow columns which have interiors completely open to the atmosphere and which permit air to travel through the columns to enhance ventilation under the cushioned object. It is also of note that the column 1201 of FIG. 12 has column walls 1202 and 1203 that include fenestrations 1210 (which may be holes or apertures in the column walls) that permit the flow of air between adjacent columns, providing an enhanced ventilation effect. The fenestrations or holes 1210 in the column walls could be formed by punching or drilling, or they could be formed during molding of the cushioning element.

FIG. 13 depicts an alternative column 1301 of the invention including column walls 1302 and 1303 and column interior 1304. The column 1301 has a longitudinal axis 1305 which is preferred to be oriented in the invented cushion parallel to the direction in which the cushioned object is expected to sink into the cushion. Thus, the column top end 1306 is at the side of the cushion that contacts the cushioned object, and the column bottom end 1307 is at the side of the cushion that typically faces some sort of a base. When a object to be cushioned is placed onto a cushion which contains column 1301, such as is shown in FIG. 3, a depressive force 1308 is applied to the cushion and to the column 1301 by the cushioned object. Because the cushion is expected to rest on some type of supporting surface, such as a base, a reaction force 1309 is provided by the supporting surface. The cushion, including the column 1301, yields under the weight of the cushioned object. This yielding is a result of compression of the cushioning media and, if the load under a protruding portion of the cushioned object is high enough, by buckling or partial buckling of the columns. From the figure, it can be seen that the depicted column 1301 buckles because the flexible cushion walls 1302 and 1303 buckle outward from the column center or orthogonal away from the longitudinal axis 1305 of the column at points 1311 and 1310. This buckling action allows the column 1301 to decrease in total length along its longitudinal axis 1305 and thereby conform to the shape of protuberances on a cushioned object.

In the embodiment depicted, the column 1301 is a sealed column containing air or an inert gas within its interior 1304. Thus, as the column 1301 decreases in length along its longitudinal axis, the gas within the column interior 1304 tends to support the column top end 1306 and resist the downward movement of the cushioned object. This yields a firmer cushion. Alternatively, open or closed cell (or other) foam or fluid cushioning media could be provided within the interior of the columns or within some of them in order to increase the firmness of the cushion.

FIG. 14 depicts an alternative embodiment of the column of the invention. The column 1401 depicted has column walls 1402 and 1403 and column interior 1404. The column 1401 has an interior 1404 that is open at column top end 1405 and at column bottom end 1406 to permit air to pass through the column 1401. This column has walls 1402 and 1403 which are thicker at their bottom end 1406 than at their top end 1405. This provides a cushion that has a soft cushioning effect when cushioning an object that sinks into the cushion to only a shallow depth, but progressively provides firmer cushioning the deeper the cushioned object sinks. This would permit a cushion to be constructed that accomodates cushioned object of a very wide variety of weight ranges. Alternatively, the column walls could be thicker at the top than at the bottom, the column walls could be stepped, or the column walls could have annular or helical grooves in them to aid in buckling under a cushioned object. Additionally, the column interior could be of a greater interior dimension orthogonal to its longitudinal axis at one end than at the other. Or the columns could be of varying dimension and shape along their longitudinal axes.

Figure 15:
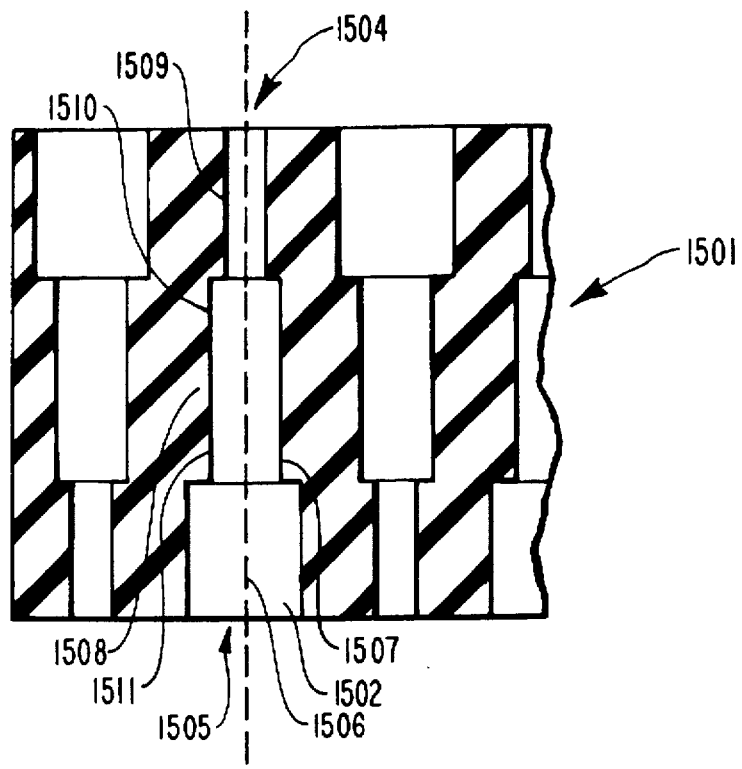
FIG. 15 depicts a cross section of a cushion using alternating stepped columns.

FIG. 15 depicts a cross section of a cushioning element using alternating stepped columns. The cushioning element 1501 has a plurality of columns 1502 each having a longitudinal axis 1503, a column top 1504 and a column bottom 1505. The column top 1504 and column bottom 1505 are open in the embodiment depicted, and the column interior or column passage 1506 is unrestricted to permit air flow through the column 1502. The column 1502 depicted has side walls 1507 and 1508, each of which as three distinct steps 1509, 1510 and 1511. The columns are arranged so that the internal taper of a column due to the step on its walls is opposite to the taper of the next adjacent column. This type of cushioning element could be made using a mold similar to that depicted in FIG. 4.

Figure 16:
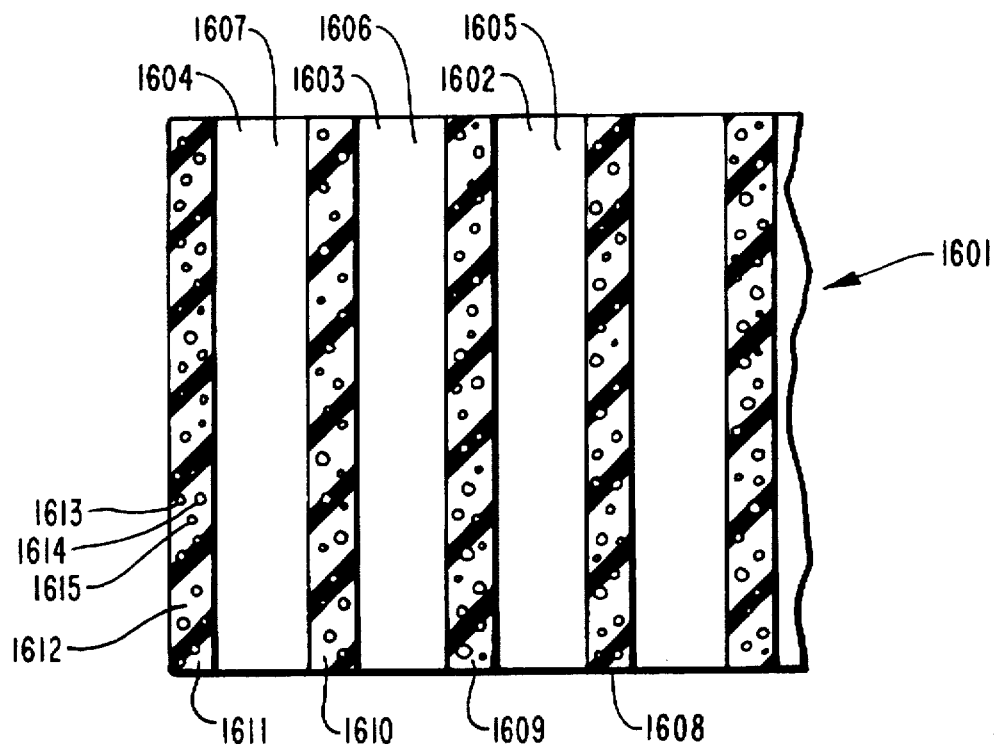
FIG. 16 depicts an alternative embodiment of the invented cushioning element having gas bubbles within the cushioning media.

FIG. 16 depicts an alternative embodiment of a cushioning element 1601. The cushioning element 1601 has a plurality of columns 1602, 1603 and 1604, each having a column interior 1605, 1606 and 1607, and column walls 1608, 1609, 1610 and 1611. The column walls are of course made from cushioning media, such as the preferred soft gel. In the embodiment of the invented cushioning element 1601 depicted, the cushioning media 1612 has trapped within it a plurality of gas bubbles 1613, 1614 and 1615. When the preferred soft gel cushioning media is used, since the gel is not flowable at the temperatures to which the cushion is expected to be exposed during use, the bubbles remain trapped within the cushioning media. The use of bubbles within the cushioning media is to provide a cushion which is lighter weight and softer than might otherwise be available. Bubbles may be introduced into the cushioning media by injecting air or another appropriate gas into the cushioning media before manufacturing the cushioning element, by vigorously stirring the heated, flowable cushioning media before it is formed into the shape of a cushion, or by utilizing a cushioning media of a composition that creates gas or boils at the temperatures to which it is subjected during the manufacture of a cushioning element.

Figure 17:
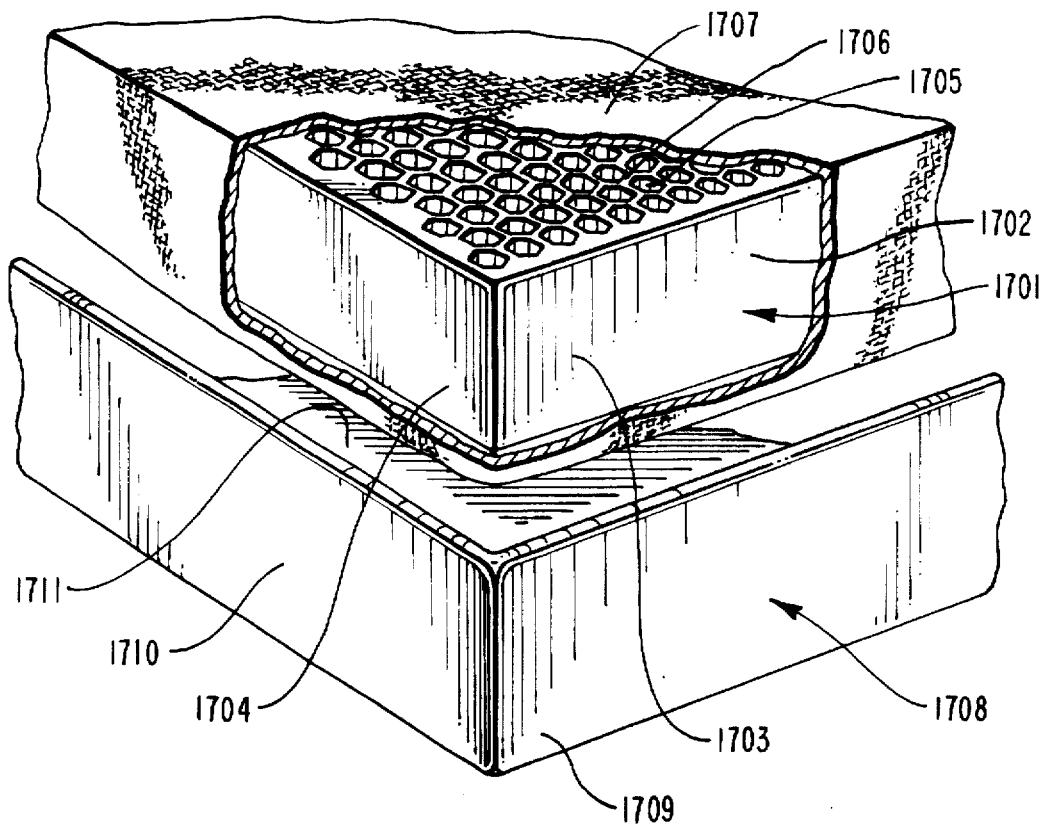
FIG. 17 depicts a cushion of the invention in use with a combination base and container.

FIG. 17 depicts an embodiment of the invented cushioning element which has cushioning media, solid exterior walls 1703 and 1704, a plurality of columns 1705 and column walls 1706 forming the columns. Note that although the figure shows a cushioning element 1701 with solid walls 1703 and 1704, it is possible to make a cushioning element 1701 that has columns on its outer walls. The cushioning element is within an optional cover 1707. A container 1708 with relatively stiff or rigid walls 1709 and 1710 of approximately the same size and shape as the cushioning element walls 1703 and 1704 is shown. The container 1708 has a bottom or base 1711 on which the cushioning element is expected to rest. The container 1708 walls 1709 and 1710 serve to restrict the outward movement of the cushioning element 1701 when a cushioned object is placed on it. When the preferred soft gel is used as a cushioning media, the cushioning element 1701 would tend to be displaced by the object being cushioned were the side walls 1709 and 1710 of the container 1711 not provided. In lieu of a container, any type of appropriate restraining means may be used to prevent side displacement of the cushioning element in response to the deforming force of a cushioned object. For example, individual plastic plates could be placed against the side walls 1703 and 1704 of the cushioning element 1701. Those plates could be held in place with any appropriate holder, such as the cover 1707. As another example, an appropriate strap or girdle could be wrapped around all exterior side walls 1703 and 1704 of the cushioning element 1701. Such a strap or girdle would serve to restrain the cushioning element 1701 against radial outward displacement in response to a cushioned object resting on the cushioning element.

Figure 18:
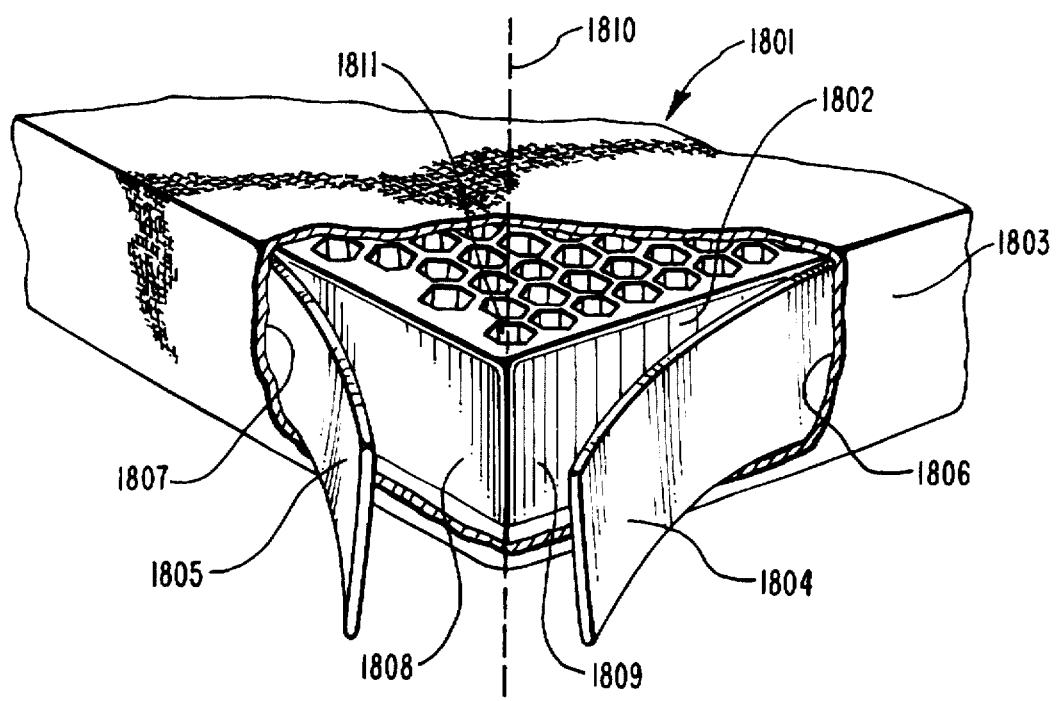
FIG. 18 depicts a cushion of the invention having side wall reinforcements to support the cushioning element.

FIG. 18 depicts an alternative embodiment of a cushion 1801 that includes a cushioning element 1802 and a cover 1803. The cushioning element 1802 has side walls 1808 and 1809 about its periphery, the side walls 1808 and 1809 in this embodiment being generally parallel with the longitudinal axis 1810 of a hollow column 1811 of the cushioning element 1802. A gap 1806 exists between the cover 1803 and the side wall 1809 of the cushioning element. This gap 1806 accomodates the insertion of a stiff or rigid reinforcing side wall support 1804 which may be made of a suitable material such as plastic, wood, metal or composite material such as resin and a reinforcing fiber. Similarly, gap 1807 between side wall 1808 and the cover 1803 may have side wall support 1805 inserted into it. The side wall supports are configured to restrict the cushioning element from being substantially displaced in an outward or radial direction (a direction orthogonal to the longitudinal axis of one of the columns of the cushioning element) so that the cushioning element's columns will buckle to accomodate the shape of a cushioned object, rather than permitting the cushioning element to squirm out from under the cushioned object.

Figure 19:
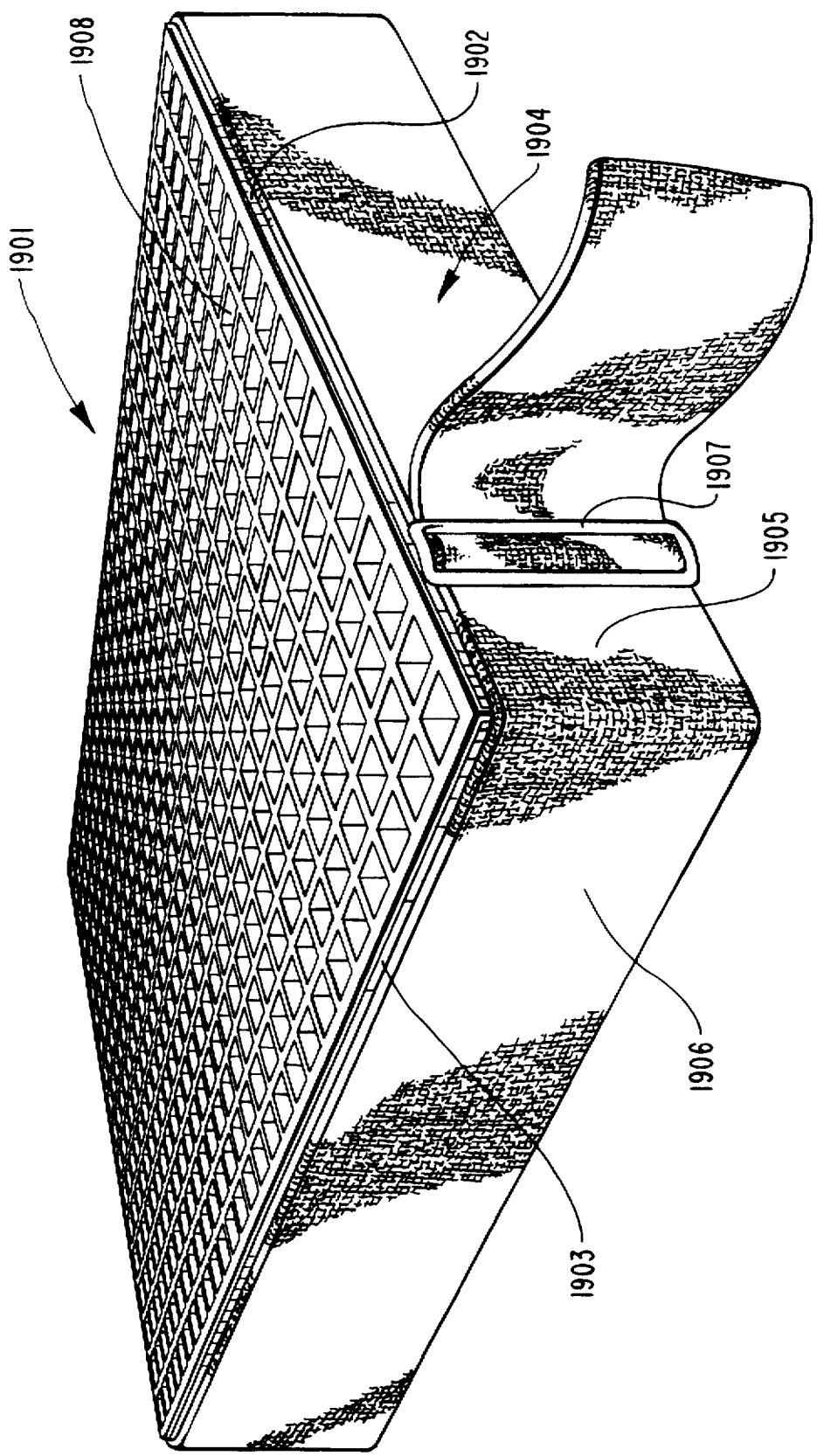
FIG. 19 depicts a cushioning element of the invention having a girdle or strap about its periphery to support the cushioning element.

FIG. 19 depicts an alternative embodiment of a cushioning element 1901 including square columns 1908. The cushioning element has outer side walls 1902 and 1903 about its periphery. The reader should note that although the outer periphery of the cushioning element in this figure is depicted as rectangular, the outer periphery could be of any desired configuration, such as triangular, square, pentagonal, hexagonal, heptagonal, octagonal, any n-sided polygon shape, round, oval, elliptical, heart-shaped, kidney-shaped, quarter moon shaped, n-sided polygonal where n is an integer, or of any other desired shape. The side walls 1902 and 1903 of the cushioning element 1901 have a peripheral strap or girdle 1904 about them. The girdle 1904 has reinforcing side walls 1905 and 1906 which reinforce the structural stability of side walls 1902 and 1903 respectively of the cushioning element 1901. The embodiment of the girdle 1904 depicted in the figure has a fastening mechanism 1907 so that it may be fastened about the periphery of the cushioning element 1901 much as a person puts on a belt. The girdle 1904 serves to confine the cushioning element 1901 so that when a cushioned object is placed on the cushioning element 1901, the cushioning element will not tend to squirm out from beneath the girdle 1904. Thus, the cushioning element 1901 will tend to yield and conform to the cushioned object as needed by having its cushioning media compress and its columns buckle.

Figure 20:
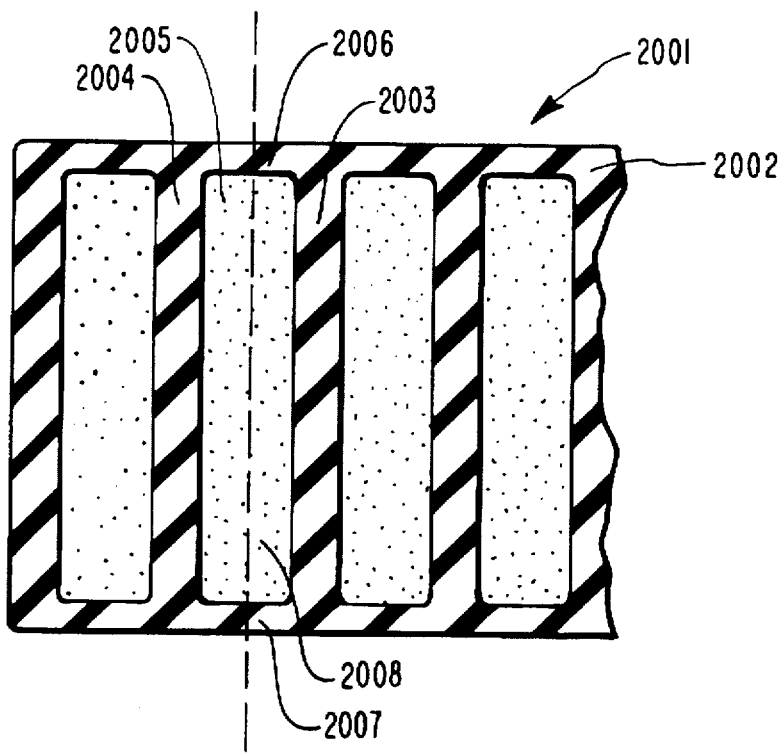
FIG. 20 depicts a cushioning element of the invention with closed column tops and bottoms and fluid cushioning media contained within the column interiors.

FIG. 20 depicts an alternative embodiment of a cushioning element 2001. The cushioning element 2001 includes cushioning media 2002 such as the preferred gel formed into column walls 2003 and 2004 to form a column 2005. The column 2005 depicted has a sealed column top 2006 and a sealed column bottom 2007 in order to contain a column filler 2008. The column filler 2008 could be open or closed cell foam, any known fluid cushioning media such as lubricated spherical objects, or any other desired column filler. The cushioning element 2001 depicted has an advantage of greater firmness compared to similar cushioning elements which either omit the sealed column top and column bottom or which omit the column filler.

Figure 21:
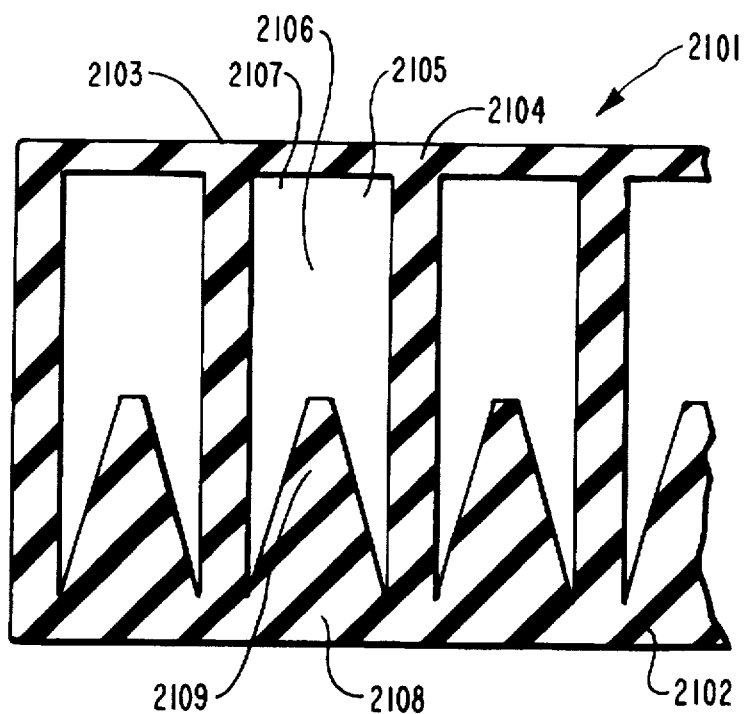
FIG. 21 depicts a cushioning element of the invention with firmness protrusions placed within the column interiors.

FIG. 21 depicts an alternative embodiment of a cushioning element 2101 of the invention. The cushioning element 2101 has cushioning media 2102 formed into column walls 2103 and 2104. The column walls 2103 and 2104 form a column interior 2105. The column 2106 has an open column top 2107 and a closed column bottom 2108. In the embodiment depicted, the column 2107 has a firmness protrusion 2109 protruding into the column interior 2105 from the column bottom 2108. The firmness protrusion 2109 depicted is wedge or cone shaped, but a firmness protrusion could be of an desired shape, such as cylindrical, square, or otherwise in cross section along its longitudinal axis. The purpose of the firmness protrusion 2109 is to provide additional support within a buckled column for the portion of a cushioned object that is causing the buckling. When a column of this embodiment of the invention buckles, the cushioning element will readily yield until the cushioned object begins to compress the firmness protrusion. At that point, further movement of the cushioned object into the cushion is slowed, as the cushioning media of the firmness support needs to be compressed or the firmness support itself needs to be caused to buckle in order to achieve further movement of the cushioned object into the cushioning media.

It is contemplated in the invention that typically the hollow portion of the column will be of uniform cross section throughout its length, but this is not necessary for all embodiments of the invention. For example, in a column having a circular cross section orthogonal to its longitudinal axis, the diameter of the circle could increase along its length, and adjacent columns could correspondingly decrease along their length (i.e. the columns would be formed as opposing cones). As another example, the column walls could all thicken from one cushion surface to another to facilitate the use of tapered cores (which create the hollow portion of the columns) in the manufacturing tool, which tapering facilitates the removal of the cores from the gel.

It is also preferred that the columns of the preferred cushioning element be open at their top and bottom. However, the columns can be bonded to or integral with a face sheet on the top or bottom or both, over all or a portion of the cushion. Or the columns can be interrupted by a sheet of gel or other material at their midsection which is like a face sheet except that it cuts through the interior of a cushioning element.

In the preferred embodiment of the cushioning element the column walls are not perforated. However, perforated walls and/or face sheets are within the scope of this invention. The perforation size and density can be varied by design to control column stiffness, buckling resistance, and weight, as well as to enhance air circulation.

It is also preferred that the wall thickness of the columns be approximately equal throughout the cushioning element for uniformity, but in special applications of the invented cushion, wall thickness may be varied to facilitate manufacturing or to account for differing expected weight loads across the cushion or for other reasons.

Typical cushions in the art are ordinarily one piece, but the invented cushion can be constructed from more than one discontinuous cushioning element of the invention. For example, three one-inch thick cushions of this invention can be stacked to make a three-inch thick cushion of this invention, with or without other materials between the layers, and with or without connecting the three layers to one another.

The cushioning element of this invention can be used alone or with a cover. A cover can be desirable when used to cushion a human body to mask the small pressure peaks at the edges of the column walls. This is not necessary if the gel used is soft enough to eliminate these effects, but may be desirable if firmer gels are used. Covers can also be desirable to keep the gel (which can tend to be sticky) clean. If used, a cover should be pliable or stretchable so as not to overly reduce the gross cushioning effects of the columns compressing and/or buckling. The preferred cover would also permit air to pass through it to facilitate air circulation under the cushioned object.

While it is envisioned that the immediate application of the invented cushion is to cushion human beings (e.g., seat cushions, mattresses, wheelchairs cushions, stadium seats, operating table pads, etc.), animals (e.g. between a saddle and a horse), manufactured products (e.g., padding between a manufactured product and a shipping container), and other objects may be efficiently cushioned using the invention.

It is preferred that columns in the invented cushion be oriented with their longitudinal axis generally parallel to the direction of gravity so that they will buckle under load from a cushioned object rather than collapse from side pressure. It is also preferred that some type of wall or reinforcement be provided about the periphery of the cushioning element in order to add stability to the cushioning element and in order to ensure that the buckling occurs in order to decrease column length under a cushioned object.

In some embodiments of the invention, a perforated column wall is provided to enhance the flow of air through the columns and in order to enhance the circulation of air between the cushion and the cushioned object. Fenestrated column walls may be provided to permit air flow from cell to cell and to thus further enhance air circulation. In other embodiments of the invention, multiple cushioning elements are provided within a single cushion.

The invented cushioning element may be described as a gelatinous elastomeric or viscoelastomeric material (i.e. gel) configured as laterally connected hollow vertical columns which elastically sustain a load up to a limit, and then buckle beyond that limit. This produces localized buckling in a cushioning element beneath a cushioned object depending upon the force placed upon the cushioning element in a particular location. As a result, protruding portions of the cushioned object can protrude into the cushion without being subjected to pressure peaks. As a result, the cushioning element distributes its supportive pressure evenly across the contact area of the cushioned object. This also maximizes the percentage of the surface area of the cushioned object that is in contact with the cushion.

In the preferred embodiments, each individual column wall can buckle, markedly reducing the load carried by that column and causing each column to be able to conform to protuberances of the cushioned object. Buckling may be described as the localized crumpling of a portion of a column, or the change in primary loading of a portion of a column from compression to bending. In designing structural columns, such as concrete or steel columns for buildings or bridges, the designer seeks to avoid buckling because once a column has buckled, it carries far less load than when not buckled. In the columns of this cushion, however, buckling works to advantage in accomplishing the objects of the invention. The most protruding parts of the cushioned object cause the load on the columns underneath them to have a higher than average load as the object initially sinks into the cushion. This higher load causes the column walls immediately beneath the protruding portion of the cushioned object to buckle, which markedly reduces the load on the protruding portion. The surrounding columns, which have not exceeded the buckling threshold, take up the load which is no longer carried by the column(s) beneath the most protruding portion of the cushioned object.

As an example of the desirability of the buckling provided by the cushioning element of the invention, consider the dynamics of a seat cushion. The area of a seated person which experiences the highest level of discomfort when seated without a cushion (such as on a wooden bench) or on a foam cushion is the tissue that is compressed beneath the most protruding bones (typically the ischial tuberosities). When the invented cushioning element is employed, the area beneath the protruding portions will have columns that buckle, but the remainder of the cushioning element should have columns (which are beneath the broad, fleshy non-bony portion of the person's posterior) which will withstand the load placed on them and not buckle. Since the broad fleshy area over which the pressure is substantially equal is approximately 95% of the portion of the person subjected to sitting pressure, and the area beneath the ischial tuberosity is subjected to less than average pressured due to the locally buckled gel columns (in approximately 5% of that area), the person is well supported and the cushion is very comfortable to sit on.

As another example, consider the cushioning element of the invention used in a bed mattress. The shoulders and hips of a person lying on his/her side would buckle the columns in the cushioning element beneath them, allowing the load to be picked up in the less protruding areas of the person's body such as the legs and abdomen. A major problem in prior art mattress cushions is that the shoulders and hips experience too much pressure and the back is unsupported because the abdomen receives too little pressure. The cushion of this invention offers a solution to this problem by tending to equalize the pressure load through local buckling under protruding body parts.

It is most preferred to use the square columns of FIGS. 7 or 8 in the invented cushion because square columns are believed by the inventor to be the best balance between lateral stability (resistance to collapse from side loads) and light weight (which also corresponds to good air circulation and low thermal transfer). Some other types of columns such those depicted in the other figures or mentioned elsewhere herein have more cushioning media (typically gel) per cubic inch of cushion for a given level of cushioning support. Thus, the resulting cushions are heavier and have a higher rate of thermal transfer. They are also more costly to manufacture due to the increased amount of cushioning media required. However, columns with oval, circular or triangular cross sections are preferred for some cushioning applications because they have a greater degree of lateral stability than square or honeycomb columns because triangles form a braced structure and circles and ovals form structurally sound arches when considered from a lateral perspective. Honeycomb columns such as those shown in FIGS. 2, 4, 5, 7, 8, 9 and 10 generally have the least gel per cubic inch of cushion for a given level of support, but have little lateral stability. However, they can be the preferred embodiment in any cushioning application which has need for lightest weight and does not require substantial lateral stability.

The cushions of this invention differ from prior art gel cushions in that while prior art gel cushions come in a variety of shapes, all are essentially a solid mass. When a cushioned object attempts to sink into a prior art gel cushion, the cushion either will not allow the sinking in because the non-contact portions of the cushion are constrained from expanding, or the cushion expands undesirably. In the cushion of this invention, the gel has enough hollow space to allow sinking in without expanding the borders of the cushion, so the problem is alleviated.

Another problem with prior art gel cushions is the weight. For example, a wheelchair cushion made of prior art gel with dimensions of 18"×16"×3.5" would weigh 35–40 pounds, which is unacceptable to wheelchair users. The same dimension cushion of this invention would weigh approximately seven pounds. To be an acceptable weight for wheelchairs, a typical prior art wheelchair gel cushion is made only 1" thick. To prevent bottoming out through such a thin cushion, the makers increase the rigidity of the gel, which ruins the ability of the gel to equalize pressure through semi-hydrostatic characteristics, and the cushions thus relieve pressure no better than a foam cushion. The cushion of this invention can be the preferred full 3.5 inches thick needed to allow sinking in for a human user which is in turn needed to equalize pressure and increase the surface area under pressure, while still being light weight.

The cushions of this invention differ from prior art honeycomb cushions in part in that gel is used instead of thermoplastic or thermoplastic elastomer. Also, a comparatively thick gel is used for the walls of the columns, as compared to very thin films made of comparatively much more rigid thermoplastic film or thermoplastic elastomer film. If thick walls were used in prior art honeycomb cushions, the rigidity of available thermoplastics and available thermoplastic elastomers would cause the cushion to be far too stiff for typical applications. Also, the use of comparatively hard, thin walls puts the cushioned object at increased risk. When the load on a prior art honeycomb cushion exceeds the load carrying capability of virtually all of the columns (i.e., they all buckle), the cushioned object bottoms out onto a relatively hard, rigid, thin pile of thermoplastic film layers. In that condition, the cushioned object is subjected to pressures similar to the pressures it would experience with no cushion at all. The cushioned object is thus at risk of damaging pressures on its most protruding portions. In comparison, if the same bottoming out occurs on the cushion of this invention, the most protruding portions of the cushioned object would be pressed into a pile of relatively thick, soft gel layers, which would add up to typically 20% of the original thickness of the cushion. Thus, the risk of bottoming out is substantially lowered.

Another difference between prior art thermoplastic honeycomb cushions and the cushion of this invention is that the configuration of the invented cushion is not limited to honeycomb columns, but can take advantage of the varying properties offered by columns of virtually any cross sectional shape. The prior art thermoplastic honeycomb cushions are so laterally unstable that at least one face sheet must be bonded across the open cells. This restricts the air circulation, which is only somewhat restored if small perforations are made in the face sheet or cells. While face sheets and perforations are an option on the cushions of this invention, the alternative cross sectional shapes of the columns (e.g., squares or triangles) make face sheets unnecessary due to increased lateral stability and thus perforations are unnecessary since both ends of the column are open to the atmosphere.

The maximum thickness of the walls of the columns of the cushion of this invention should be such that the bulk density of the cushion is less than 50% of the bulk density if the cushion were completely solid gel. Thus, at least 50% of the volume of space occupied by the invented cushioning element is occupied by a gas such as air and the remainder is occupied by gel. The minimum thickness of the walls of the columns is controlled by three factors: (1) manufacturability; (2) the amount of gel needed for protection of the cushioned object in the event of all columns buckling; and (3) the ability to support the cushioned object without buckling the majority of the columns. The preferred thickness would be such that the columns under the most protruding parts of the cushioned object are buckled, and the remaining columns are compressed in proportion to the degree of protrusion of the cushioned object immediately above them but are not buckled.

Materials of Construction of the Cushions

It is preferred that the cushioning media used to manufacture the invented cushioning element be a soft gel. This assures that the invented cushion will yield under a cushioned object by having buckling columns and by the cushioning media itself compressing under the weight of the cushioned object. The semi-hydrostatic nature of the soft gel will provide additional cushioning and will accomodate uneven surfaces on the cushioned object. However, firmer gels are also usable within the invention provided that the gel is soft enough to provide acceptable cushioning for the particular object in the event that all columns buckle. Since with a given type of gel there is typically a correlation between softness and Young's modulus (stiffness), i.e., a softer gel is less stiff, and since there is a correlation between Young's modulus and the load carrying capability of a column before buckling, there is typically a need to have a firmer gel in a cushion that needs to carry a higher load. However, there are other alternatives for increasing a cushion's load carrying capability, such as increasing the column wall thickness, so that the softness of the gel can be selected for its cushioning characteristics and not solely its load bearing characteristics, particularly in cases where cushion weight is not a factor. Any gelatinous elastomer or gelatinous viscoelastomer with a hardness on the Shore A scale of less than 15 may be considered a gel for the purposes of this invention, though a hardness of 3 or less on the Shore A scale is preferred, and a hardness which is off the Shore A scale and is characterized by a gram Bloom of less than about 800 is much preferred. Gram Bloom is defined as the gram weight required to depress a gel a distance of 4 mm with a piston having a cross sectional area of 1 square centimeter at 23 degrees Celsius. The preferred gel is non-flowable at the normal usable temperatures of a cushioning element which is used to cushion a human being, and the preferred gel will not escape from the cushioning element if the cushioning element is punctured. The preferred gel has shape memory so that it tends to return to its original shape after deformation.

The cushioning media or preferred gel must also be strong enough to withstand the loads and deformations expected during the use of the cushion. For a given type of gel, there is typically a correlation between softness and strength, i.e., the softer gels are not as strong as harder gels.

Because of its high strength even in soft formulations, its low cost, its ease of manufacture, the variety of manufacturing methods which can be used, and the wide range of Young's modulus which can be formulated while keeping the hydrostatic characteristics of a gel, the gel formulations of the following patents are the most preferred gels to be used in the cushions of this invention: U.S. Pat. No. 5,334,646 issued in the name of Chen on Aug. 2, 1994; U.S. Pat. No. 4,369,284 issued in the name of Chen on Jan. 18, 1983; U.S. Pat. No. 5,262,468 issued in the name of Chen on Nov. 16, 1993; U.S. Pat. No. 4,618,213 issued in the name of Chen on Oct. 21, 1986; and U.S. Pat. No. 5,336,708 issued in the name of Chen on Aug. 9, 1994, each of which is hereby incorporated by reference in its entirety.

These formulations comprise about 100 parts by weight of a high viscosity triblock copolymer of the general configuration poly(styrene-ethylene-butylene-styrene) and from about 200 to about 1600 parts by weight of a plasticizing oil such as mineral oil. These formulations are very soft to the touch and very pliable to enable column buckling of even relatively thick columns, yet are so strong that they can stretch as much as sixteen times their original length without fracture. Varying the amount of plasticizing oil varies the softness and Young's modulus, so that the designer of the cushion of this invention has a wide range of gels from which to select. There are many additives and variations discussed in the patents above which can impart varying characteristics to the gel.

The high viscosity triblock copolymers employed in the preferred gel have the more general configuration A-B-A wherein each A is a crystalline polymer end block segment of polystyrene; and B is a elastomeric polymer center block segment of poly(ethylene-butylene). The poly(ethylene-butylene) and polystyrene portions are incompatible and form a two-phase system consisting of sub-micron domains of glassy polystyrene interconnected by flexible poly (ethylene-butylene) chains. These domains serve to crosslink and reinforce the structure. This physical elastomeric network structure is reversible, and heating the polymer above the softening point of polystyrene temporarily disrupt the structure, which can be restored by lowering the temperature. Reviews of triblock copolymers are found in the "ENCYCLOPEDIA OF POLYMER SCIENCE AND ENGINEERING", Volume 2 and 5, 1987–1988; "Thermoplastic Elastomers", MODERN PLASTIC ENCYCLOPEDIA, 1989; and Walker, B. M., Ed., et al., HANDBOOK OF THERMOPLASTIC ELASTOMERS, Van Nostrand Reinhold Co., 2nd Edition, 1988. These publications are incorporated herein by reference).

Some high viscosity triblock copolymers in (A) which are suitable for use in the preferred gel invention have a typical Brookfield Viscosity of a 20 weight percent solids Solution in toluene at 25° C. of not less than about 1,800 cps, and preferably about 2,000 cps or higher. Typically, the Brookfield Viscosity values of (A) can range from about 1,800 cps to about 16,000 cps. Less typically, the Brookfield Viscosity values of (A) can range from about 1,800 cps to about 30,000 cps or higher. The proportion of hydrocarbon plasticizing oil in (B) is more preferably from about 350 to about 1,600 parts per 100 parts of the copolymer.

The high viscosity triblock copolymer of the preferred gel can have a broad range of styrene end block to ethylene and butylene center block ratio of approximately about 20:80 or less to about 40:60 or higher. Examples of high viscosity copolymers that can be utilized to achieve one or more of the novel properties of the present invention are styrene-ethylene-butylene-styrene block copolymers (SEBS) available from Shell Chemical Company and Pecten Chemical Company (divisions of Shell Oil Company) under trade designations Kraton G 1651, Kraton G 4600, Kraton G 4609 and the like. Other grades of (SEBS) polymers can also be utilized in the present invention provided such SEBS polymers exhibits the required high viscosity. Such SEBS polymers include (high viscosity) Kraton G 1855X which has a Specific Gravity of 0.92, Brookfield Viscosity of a 25 weight percent solids solution in toluene at 25° C. of about 40,000 cps or about 8,000 to about 20,000 cps at a 20 weight percent solids solution in toluene at 25° C.

The styrene to ethylene and butylene weight ratios for these Shell designated polymers can have a low range of 20:80 or less. Although the typical ratio values for Kraton G 1651, 4600, and 4609 are approximately about 33:67 and for Kraton G 1855X approximately about 27:73, these ratios can vary broadly from the typical product specification values. The styrene to ethylene and butylene weight ratio of SEBS useful in forming the gelatinous elastomer composite articles can range from lower than about 20:80 to above about 40:60. More specifically, the values can be 19:81, 20:80, 21:79, 22:78, 23:77, 24:76, 25:75, 26:74, 27:73, 28:72, 29:71, 30:70, 31:69, 32:68, 33:67, 34:66, 35:65, 36:64, 37:63, 38:62, 39:61, 40:60, 41:59, 42:58, 43:57, 44:65, 45:55, 46:54, 47:53, 48:52, 49:51, 50:50, 51:49 and higher. Other ratio values of less than 19:81 or higher than 51:49 are also possible. Broadly, the styrene end block to ethylene and butylene center block ratio of the triblock copolymers of the invention is about 20:80 to about 40:60, less broadly about 31:69 to about 40:60, preferably about 32:68 to about 38:62, more preferably about 32:68 to about 36:64, particularly more preferably about 32:68 to about 34:66, especially more preferably about 33:67 to about 36:64, and most preferably about 33:67. Triblock copolymers having ratios below 31:69 may be used, but they are less preferred due to their decrease in the desirable properties of the final composition.

Plasticizers particularly preferred for making the preferred gel are well known in the art, they include rubber processing oils such as paraffinic and naphthenic petroleum oils, highly refined aromatic-free paraffinic and naphthenic food and technical grade white petroleum mineral oils, and synthetic liquid oligomers of polybutene, polypropene, polyterpene, etc. The synthetic series process oils are high viscosity oligomers which are permanently fluid liquid nonolefins, isoparaffins or paraffins of moderate to high molecular weight. Many such oils are known and commercially available. Examples of representative commercially oils include Amoco Registered TM polybutenes, hydrogenated polybutenes and polybutenes with epoxide functionality at one end of the polybutene polymer: Examples of such polybutenes include: L-14 (320M n), L-50 (420M n), L-100 (460M n), H-15 (560M n), H-25 (610M n), H-35 (660M n), H-50 (750M n), H-100 (920M n), H-300 (1290M n), L-14E (27–37 cst @ 100° F. Viscosity), L-300E (635–690 cst @ 210° F. Viscosity), Actipol E6 (365M n), E16 (973M n), E23 (1433M n) and the like. Examples of various commercially available oils include: ARCO Prime and Tufflo oils, other white mineral oils include: Bayol, Bernol, American, Blandol, Drakeol, Ervol, Gloria, Kaydol, Litetek, Marcol, Parol, Peneteck, Primol, Protol, Sonrex, and the like.

The high viscosity triblock copolymer component by itself lacks the desired properties; whereas, when the triblock copolymer (having Brookfield Viscosities of a 20 weight percent solids solution in toluene at 25° C. of about 1,800 cps or higher and styrene to ethylene and butylene ratio preferably of the range contemplated in the instant invention) is combined with selected plasticizing oils with an average molecular weight preferably of about 200 to about 700, as determined by ebulliscopic methods, wherein, for most purposes, the oil constitutes about 300 to about 1,600 parts and more preferably about 350 to about 1,600 pans by weight of the triblock copolymer, that an extremely soft and highly elastic material is obtained. This transformation of the triblock copolymer structure in heated oil resulting in a composition having a gel rigidity preferably of about 20 gram or lower to about 800 gram Bloom and substantially without oil bleedout along with high tensile strength and elongation and other desirable combination of physical properties is unexpected. As used herein, the term "gel rigidity" in gram Bloom is determined by the gram weight required to depress a gel a distance of 4 mm with a piston having a cross-sectional area of 1 square centimeter at 23° C.

The aforementioned molecular weight range plasticizing oils are most preferred. Generally, plasticizing oils with average molecular weights less than about 200 and greater than about 700 may also be used.

The preferred gel can be conductive or non-conductive, containing conductive fillers (carbon, metal flakes etc.) or non-conductive fillers. The gel can also contain useful amounts of conventionally employed additives such as stabilizers, antioxidants, antiblocking agents, colorants, fragrances, flame retardants, other polymers in minor amounts and the like to an extend not affecting or substantially decreasing the desired properties of the present invention.

Additives useful in the preferred gel include: tetrakis [methylene 3, -(3'5'-di-tertbutyl-4"-hydroxyphenyl) propionate]methane, octadecyl 3-(3".5"-di-tert-butyl-4"-hydroxyphenyl) propionate, distearyl-pentaerythritoldiproprionate, thiodiethylene bis-(3,5-ter-butyl-4-hydroxy) hydrocinnamate, (1,3,5-trimethyl-2,4,6-tris[3,5-di-tert-butyl-4-hydroxybenzyl]benzene), 4,4"-methylenebis(2,6-di-tert-butylphenol), steraric acid, oleic acid, stearamide, behenamide, oleamide, erucamide, N,N"-ethylenebisstearamide, N,N"-ethylenebisoleamide, sterryl erucamide, erucyl erucamide, oleyl palmitamide, stearyl stearamide, erucyl stearamide, waxes (e.g. polyethylene, polypropylene, microcrystalline, carnauba, paraffin, montan, candelila, beeswax, ozokerite, ceresine, and the like). Minor amounts of other polymers and copolymers can be melt blended with the styrene-ethylene-butylene-styrene block copolymers mentioned above without substantially decreasing the desired properties. Such polymers include (SBS) styrene-butadiene-styrene block copolymers, (SIS) styrene-isoprene-styrene block copolymers, (low styrene content SEBS) styrene-ethylene-butylene-styrene block copolymers, (SEP) styrene-ethylene-propylene block copolymers, (SB)n styrene-butadiene and (SEB)n, (SEBS)n, (SEP)n, (SI)n styrene-isoprene multi-arm, branched, and star shaped copolymers and the like. Still, other homopolymers can be utilized in minor amounts; these include: polystyrene, polybutylene, polyethylene, polypropylene and the like. The composition can also contain metallic pigments (aluminum and brass flakes), TiO2, mica, fluorescent dyes and pigments, phosphorescent pigments, aluminatrihydrate, antimony oxide, iron oxides (Fe3O4, —Fe2O3, etc.), iron cobalt oxides, chromium dioxide, iron, barium ferrite, strontium ferrite and other magnetic particle materials, molybdenum, silicone fluids, lake pigments, aluminates, ceramic pigments, ironblues, ultramarines, phthalocynines, azo pigments, carbon blacks, silicon dioxide, silica, clay, feldspar, glass microspheres, barium ferrite, woilastonite and the like. The report of the committee on Magnetic Materials, Publication NMAB-426, National Academy Press (1985) is incorporated herein by reference.

The preferred gel is prepared by blending together the components including other additatives as desired at about 23° C. to about 100° C. forming a paste like mixture and further heating said mixture uniformly to about 150° C. to about 200° C. until a homogeneous molten blend is obtained. Lower and higher temperatures can also be utilized depending on the viscosity of the oils and amount of SEBS used. These components blend easily in the melt and a heated vessel equipped with a stirrer is all that is required. Small batches can be easily blended in a test tube using a glass stirring rod for mixing. While conventional large vessels with pressure and/or vacuum means can be utilized in forming large batches of the instant compositions in amounts of about 40 lbs or less to 10,000 lbs or more. For example, in a large vessel, inert gases can be employed for removing the composition from a closed vessel at the end of mixing and a partial vacuum can be applied to remove any entrapped bubbles. Stirring rates utilized for large batches can range from about less than 10 rpm to about 40 rpm or higher.

A high viscosity poly(styrene-ethylene-butylene-styrene) triblock copolymer having styrene end block to ethylene and butylene center block ratio preferably within the contemplated range of from about 20:80 to about 40:60, more preferably from between about 31:69 to about 40:60 when blended in the melt with an appropriate amount of plasticizing oil makes possible the attainment of gelatinous elastomer compositions having a desirable combination of physical and mechanical properties, notably high elongation at break of at least 1,600%, ultimate tensile strength of about at least $8 \times 10^5$ dyne/cm$^2$, low elongation set at break of substantially not greater than about 2%, tear resistance of at least $5 \times 10^5$ dyne/cm$^2$, substantially about 100% snap back when extended to 1,200% elongation, and a gel rigidity of substantially not greater than about 700 gram Bloom. It should be noted that when the ratio falls below 31:69, various properties such as elongation, tensile strength, tear resistance and the like can decrease while retaining other desired properties, such as gel rigidity, flexibility, elastic memory.

More specifically, the preferred gel exhibits one or more of the following properties. These are: (1) tensile strength of about $8 \times 10^5$ dyne/cm$^2$ to about $10^7$ dyne/cm$^2$; (2) elongation of about 1,600% to about 3,000% and higher; (3) elasticity modulus of about $10^4$ dyne/cm$^2$ to about $10^6$ dyne/cm$^2$; (4) shear modulus of about $10^4$ dyne/cm$^2$ to about $10^6$ dyne/cm$^2$ as measured with a 1, 2, and 3 kilogram load at 23° C.; (5) gel rigidity of about 20 gram Bloom or lower to about 800 gram Bloom as measured by the gram weight required to depress a gel a distance of 4 mm with a piston having a cross-sectional area of 1 square cm at 23° C.; (6) tear propagation resistance of at least about $5 \times 10^5$ dyne/cm$^2$; (7) and substantially 100% snap back recovery when extended at a crosshead separation speed of 25 cm/minute to 1,200% at 23° C. Properties (1), (2), (3), and (6) above are measured at a crosshead separation speed of 25 cm/minute at 23° C.

Gelatinous elastomer articles molded from the instant compositions have various additional important advantages in that they tend not to crack, creep, tear, crack, or rupture in flexural, tension, compression, or other deforming conditions of normal use; but rather the cushioning element made from the preferred gel possess the intrinsic properties of elastic memory enabling it to recover and retain its original shape after many extreme deformation cycles as compared to prior art triblock copolymer oil-extended compositions. In applications where low rigidity, high elongation, good compression set and excellent tensile strength are important, the gel described above would be preferred.

Generally the molten gelatinous elastomer composition will adhere sufficiently to certain plastics (e.g. acrylic, ethylene copolymers, nylon, polybutylene, polycarbonate, polystyrene, polyester, polyethylene, polypropylene, styrene copolymers, and the like) provided the temperature of the molten gelatinous elastomer composition is sufficient high to fuse or nearly fuse with the plastic. In order to obtain sufficient adhesion to glass, ceramics, or certain metals, sufficient temperature is also required (e.g. above 250° F.). Commercial resins which can aid in adhesion to materials (plastics, glass, and metals) may be added in minor amounts to the gelatinous elastomer composition, these resins include: Super Sta-tac, Nevtac, Piccotac, Escorez, Wingtack, Hercotac, Betaprene, Zonarez, Nirez, Piccolyte, Sylvatac, Foral, Pentalyn, Arkon P, Regalrez, Cumar LX, Picco 6000, Nevchem, Piccotex, Kristalex, Piccolastic, LX-1035, and the like.

The preferred gel of the invention is further illustrated by means of the following illustrative embodiments, which are given for purpose of illustration only and are not meant to limit the invention to the particular components and amounts disclosed.

EXAMPLE I

A comparison can be made between a low viscosity poly(styrene-ethylene-butylene-styrene) triblock copolymer having styrene end block to ethylene and burylena center block ratio below the range between 31:69 to 40:60 and a high viscosity poly(styrene-ethylene-butylene-styrene) triblock copolymer. Three different triblock copolymers can be melt blended separately with a paraffinic white petroleum oil. Table I below shows the physical properties that should be obtained with respect to each of the different viscosity and styrene to ethylene and burylena ratio triblock copolymer oil-blends tested.

The properties to be measured are: Tear Propagation (ASTM D 19938 modified), Cracking (ASTM D 51 8 Method B modified), Tensile Strength (ASTM D 412 modified), Ultimate elongation (ASTM D 41 2 modified), Tensile Set (ASTM D 412 Modified), Compression Set (ASTM D 395 modified), Snap Back, and Hand Kneading (60 seconds).

TABLE I

| | | Weight Parts | | |
|---|---|---|---|---|
| Formulation | S/EB Ratio[1] | A | B | C |
| SEBS[2] | 28:72 | 100 | | |
| SEBS[3] | 29:71 | | 100 | |
| SEBS[4] | 33:67 | | | 100 |
| Paraffinic oil[5] | | 400 | 400 | 400 |
| Stabilizer[6] | | 2.5 | 2.5 | 2.5 |
| Breaking strength[7], dyne/cm$^2$ | | $4 \times 10^5$ | $4 \times 10^54$ | $\times 10^6$ |
| Tear propagation[8], dyne/cm$^2$ | | $8 \times 10^4$ | $7 \times 10^41$ | $\times 10^6$ |
| Compression set[10] at 24 hours | | 81%[R] | 77%[R] | 0.0% |
| Rigidity, gram Bloom | 1,536 | 1,536 | 1,520 | 360 |

[1] Styrene to ethylene and butylene ratio
[2] Shell Kraton G 1650 having a Brookfield viscosity of 1,500 cps as measured for a 20% weight solids solution in toluene at 25° C.
[3] Shell Kraton G 1652 having a Brookfield viscosity of 550 cps as measured for a 20% weight solids solution in toluene at 25° C.

TABLE I-continued

| | | Weight Parts | | |
|---|---|---|---|---|
| Formulation | S/EB Ratio[1] | A | B | C |

[4]Shell Kraton G 1651 having a Brookfield viscosity of 2,000 cps as measured for a 20% weight solids solution in toluene at 25° C.
[5]ARCO prime 200,
[6]Irganoz 1010,
[7]ASTM D 412 modified,
[8]ASTM D 1938 modified,
[9]ASTM D 412 modified,
[10]ASTM D 2395 modified,
[R]ruptured completely The results of Table I show the inferior characteristics of low viscosity triblock copolymers having styrene to ethylene and butylene ratios which are below the contemplated range of the preferred composition.

EXAMPLE II

One hundred parts by weight of a high viscosity poly (styrene-ethylene-butylene-styrene) triblock copolymer (Shell Kraton G 1651) having a styrene end block to ethylene and butylene center block ratio of about 33:67 with 0.1 parts by weight of a stabilizer (Irganox 1010) can be melt blended with various quantities of a naphthenic oil (ARCO Tufflo 6024). Samples having the dimensions of 5 cm×5 cm×3 cm were cut and measured for gel rigidity on a modified Bloom gelometer as determined by the gram weight required to depress the gel a distance of 4 mm with a piston having a cross-sectional area of 1 cm$^2$. The average gel rigidity values with respect to various oil concentrations are set forth in Table II below.

TABLE II

| Oil per 100 parts of Triblock copolymer | Gel Rigidity, gram Bloom |
|---|---|
| 360 | 500 |
| 463 | 438 |
| 520 | 280 |
| 615 | 240 |
| 635 | 220 |
| 710 | 172 |
| 838 | 135 |
| 1,587 | 54 |

EXAMPLE III

Example II can be repeated except about 980 parts oil is used and the gel rigidity should be about 101 gram Bloom. Other properties should be: tensile strength at break about 4.4×10$^6$ dyne/cm$^2$, elongation at break about 2.4470%, elasticity modulus about 3.5×10$^4$ dyne/cm$^2$, and shear modulus about 3.7×10$^4$ dyne/cm$^2$. The tensile strength, elongation, elasticity modulus should be measured with cross-head separation speed of 25 cm/minute at room temperature. The shear modulus should be measured with a 1, 2, and 3 kilogram load at room temperature.

EXAMPLE IV

Example II is repeated except about 520 parts of a polybutene (Amoco Indopol H-300) is used and the gel rigidity should be substantially unchanged with respect to use of naphthenic oil alone.

EXAMPLE V

Example II is repeated except about 520 parts of a polypropene (Amoco-60) is used and the gel rigidity should be substantially unchanged with respect to use of naphthenic oil alone.

EXAMPLE VI

Example II is repeated except about 520 parts of a polyterpene (Hercules Piccolyte S10) is used and the gel rigidity should be substantially unchanged with respect to use of naphthenic oil alone.

EXAMPLE VII

Example II is repeated except about 360 parts of a combined mixture of: 72 parts of a paraffinic oil (ARCO prime 200), 72 pars of a naphthenic oil (ARCO Tufflo 6014), 72 parts of a polybutene oligomer (Amoco Indopol H-200), 72 parts of a polypropene oligomer (Amoco Polypropene C-60), and 72 parts of a polyterpene oligomer (Hercules Piccolyte S10) is used and the gel rigidity should be to be substantially unchanged with respect to the use of naphthenic oil alone.

EXAMPLE VIII

Example III is repeated except 933 parts oil with 147 parts by weight of a high viscosity poly(styrene-ethylene-butylene-styrene) triblock copolymer containing 47 parts of a naphthenic process oil (Shell Kraton G 4609) having a styrene to ethylene and butylene ratio of about 33:67 is used and the physical properties were found to be about substantially unchanged with respect to the components used in Example III.

EXAMPLE IX

Example III is repeated except 933 parts oil with 147 parts by weight of a high viscosity poly(styrene-ethylene-butylene-styrene)triblock copolymer containing 47 parts of a paraffinic white petroleum oil (Shell Kraton G 4609) having a styrene to ethylene and butylene ratio of about 33:67 is used and the physical properties should be about substantially unchanged with respect to the components used in Example I.

EXAMPLE X

Example II is repeated except about 400 parts of oil is used and the properties measured were: tear propagation about 1.4×10$^6$ dyne/cm$^2$, no crack growth in 180° bend under 50 gram load for 5,000 hours at room temperature, tensile strength about 4×10$^6$ dyne/cm$^2$, elongation at break about 1,700%, tensile set about 0% at 1,200% elongation, compression set about 0% when tested under 5,000 gram load for 24 hours, and 100% snap back recovery after extension to 1,200%.

EXAMPLE XI

The procedure of Example II is repeated and a poly (styrene-ethylene-butylene-styrene) triblock copolymer (characterized by a Brookfield Viscosity of a 20 weight percent solids solution in toluene at 25° C. of at least about 1,800 cps.) is used having a styrene end block to ethylene and butylene center block ratio of about 32:68 and the gel rigidity should be within the range of about 20 to about 800 gram Bloom.

EXAMPLE XII

The procedure of Example II is repeated and a poly (styrene-ethylene-butylene-styrene) triblock copolymer (characterized by a Brookfield Viscosity of a 20 weight percent solids solution in toluene at 25° C. of at least about 1,800 cps.) is used having a styrene end block to ethylene and butylene center block ratio of about 34:66 and the gel rigidity should be within the range of about 20 to about 800 gram Bloom.

EXAMPLE XII

The procedure of Example II is repeated and a poly (styrene-ethylene-butylene-styrene) triblock copolymer (characterized by a Brookfield Viscosity of a 20 weight percent solids solution in toluene at 25° C. of at least about 1,800 cps.) is used having a styrene end block to ethylene and butylene center block ratio of about 36:64 and the gel rigidity is found to be within the range of about 20 to about 800 gram Bloom.

EXAMPLE XIV

The procedure of Example II is repeated and a poly (styrene-ethylene-butylene-styrene) triblock copolymer (characterized by a Brookfield Viscosity of a 20 weight percent solids solution in toluene at 25° C. of at least about 1,800 cps.) is used having a styrene end block to ethylene and butylene center block ratio of about 38:62 and the gel rigidity should be within the range of about 20 to about 800 gram Bloom.

EXAMPLE XIV-a

The procedure of Example II is repeated and a poly (styrene-ethylene-butylene-styrene) triblock copolymer (characterized by a Brookfield Viscosity of a 20 weight percent solids solution in toluene at 25° C. of at least about 1,800 cps.) is used having a styrene end block to ethylene and butylene center block ratio of about 31:69 and the gel rigidity should be within the range of about 10 to about 800 gram Bloom.

EXAMPLE XIV-b

The procedure of Example II is repeated and a poly (styrene-ethylene-butylene-styrene) triblock copolymer (characterized by a Brookfield Viscosity of a 20 weight percent solids solution in toluene at 25° C. of at least about 1,800 cps.) is used having a styrene end block to ethylene and butylene center block ratio of about 37:63 and the gel rigidity should be within the range of about 10 to about 800 gram Bloom.

EXAMPLE XIV-c

The procedure of Example II is repeated and a poly (styrene-ethylene-butylene-styrene) triblock copolymer (characterized by a Brookfield Viscosity of a 20 weight percent solids solution in toluene at 25° C. of at least about 1,800 cps.) is used having a styrene end block to ethylene and butylene center block ratio of about 19:81 and the gel rigidity is found to be within the range of about 10 to about 800 gram Bloom.

EXAMPLE XIV-d

The procedure of Example II is repeated and a poly (styrene-ethylene-butylene-styrene) triblock copolymer (characterized by a Brookfield Viscosity of a 20 weight percent solids solution in toluene at 25° C. of at least about 1,800 cps.) is used having a styrene end block to ethylene and butylene center block ratio of about 20:80 and the gel rigidity should be within the range of about 10 to about 800 gram Bloom.

EXAMPLE XIV-e

The procedure of Example II is repeated and a poly (styrene-ethylene-butylene-styrene) triblock copolymer (characterized by a Brookfield Viscosity of a 20 weight percent solids solution in toluene at 25° C. of at least about 1,800 cps.) is used having a styrene end block to ethylene and butylene center block ratio of about 38:62 and the gel rigidity should be within the range of about 10 to about 800 gram Bloom.

EXAMPLE XIV-f

The procedure of Example II is repeated and a poly (styrene-ethylene-butylene-styrene) triblock copolymer (characterized by a Brookfield Viscosity of a 20 weight percent solids solution in toluene at 25° C. of at least about 1,800 cps.) is used having a styrene end block to ethylene and butylene center block ratio of about 29:71 and the gel rigidity should be within the range of about 10 to about 800 gram Bloom.

EXAMPLE XIV-g

The procedure of Example II is repeated and a poly (styrene-ethylene-butylene-styrene) triblock copolymer (characterized by a Brookfield Viscosity of a 20 weight percent solids solution in toluene at 25° C. of at least about 1,800 cps.) is used having a styrene end block to ethylene and butylene center block ratio of about 26:74 and the gel rigidity should be within the range of about 10 to about 800 gram Bloom.

EXAMPLE XIV-h

The procedure of Example II is repeated and a poly (styrene-ethylene-butylene-styrene) triblock copolymer (characterized by a Brookfield Viscosity of a 20 weight percent solids solution in toluene at 25° C. of at least about 1,800 cps.) is used having a styrene end block to ethylene and butylene center block ratio of about 22:78 and the gel rigidity should be within the range of about 10 to about 800 gram Bloom.

EXAMPLE XIV-i

The procedure of Example II is repeated and a poly (styrene-ethylene-butylene-styrene) triblock copolymer (characterized by a Brookfield Viscosity of a 20 weight percent solids solution in toluene at 25° C. of at least about 1,800 cps.) is used having a styrene end block to ethylene and butylene center block ratio of about 25:75 and the gel rigidity should be within the range of about 10 to about 800 gram Bloom.

EXAMPLE XIV-j

The procedure of Example II is repeated and a poly (styrene-ethylene-butylene-styrene) triblock copolymer (characterized by a Brookfield Viscosity of a 20 weight percent solids solution in toluene at 25° C. of at least about 1,800 cps.) is used having a styrene end block to ethylene and butylene center block ratio of about 26:74 and the gel rigidity should be within the range of about 10 to about 800 gram Bloom.

EXAMPLE XV

Example II is repeated except about 980 pads oil containing 100 parts of a Fe3O4 magnetic particle is used and the gel rigidity should be within the range of about 20 to 800 gram Bloom.

EXAMPLE XVI

The procedure of Example II is repeated and a poly (styrene-ethylene-butylene-styrene) triblock copolymer (characterized by a Brookfield Viscosity of a 20 weight percent solids solution in toluene at 25° C. of at least about 1,800 cps.) is used having a styrene end block to ethylene and butylene center block ratio of about 27:73.

EXAMPLE XVII

A cushioning element is manufactured that includes a quantity of gel cushioning media formed to have a top, a bottom, and an outer periphery, the cushioning media being compressible so that it will deform under the compressive force of a cushioned object, and a plurality of hollow columns situated in said cushioning media, each of said columns having a longitudinal axis along its length, each of said columns having a column wall which defines a column interior, and each of said columns having a column top and a column bottom. The cushioning element is adapted to have a cushioned object placed in contact with said cushioning element top and the column top and the column bottom of one of said columns are located at two different points on said longitudinal axis of said column. A column's longitudinal axis is located generally parallel to the direction of a compressive force exerted on the cushioning element by a cushioned object in contact with said column top, and at least one of the columns is capable of buckling beneath a protuberance that is located on a cushioned object. The cushioning element is yieldable as a result of compressibility of said cushioning media and bucklability of said column. The cushioning media comprises thermoplastic, heat formable and heat reversible gelatinous elastomer composition, G. which is physically interlocked with a selected material Mn, the gelatinous elastomer composition formed from (a) 100 parts by weight of a high viscosity triblock copolymer of the general configuration poly(styrene-ethylene-butylene-styrene); (b) from about 200 to about 1,600 parts by weight of a plasticizing oil; said composition characterized by a gel rigidity of from about 20 to about 800 gram Bloom; the composition being formed from the combination GnMnGn, MnGnMn, MnGnGn, GnGnMn, MnGnGnMn, GnMnGnGn, GnMnMnGn, GnMnMnGn, GnGnMnMn, GnGnMnGnMn, GnMnGnGn, GnGnMn, GnMnGnMnMn, MnGnMnGnMnGn, GnGnMnMnGn, or GnGnMnGnMnGn, wherein when n is a subscript of M, n is selected from the group consisting of foam, plastic, fabric, metal, concrete, wood, glass, ceramics, synthetic resin, synthetic fibers or refractory materials, and wherein when n is a subscript of G, n denotes the same or a different gel rigidity.

Although the gel formulations referred to above are most preferred, there are numerous other preferred gels. For example, gels which are made with the same ingredients as those mentioned above, but in different combinations or in conjunction with different ingredients can be used advantageously for this invention. For example, the GLS Corporation of Cary, Ill. offers a gel in injection moldable pellet form under the designation G-6703 which is made with the ingredients of the gels mentioned above but with less plasticizing oil, and has a Shore A hardness of 3. Other preferred gels which may be used in the invention include PVC plastisol gels, silicone gels, and polyurethane gels.

PVC plastisol gels are well known in the art, and are exemplified by artificial worms and grubs used in fishing. A description of a typical PVC plastisol gel is given in U.S. Pat. No. 5,330,249 issued in the name of Weber et al. on Jul. 19, 1994, is hereby incorporated by reference. PVC plastisol gels are not the most preferred because their strength is not as high for a given gel rigidity as the gels of the Chen patents, but they are acceptable for use in the invention.

Silicone gels are also well known in the art, and are available from many sources including GE Silicones and Dow Corning. From a performance standpoint, silicone gels are excellent gels for this invention. However, the cost of silicone gels is many times higher than the most preferred gels.

Polyurethane gels are also well known in the art, and are available from a number of companies including Bayer Aktiengesellschaft in Europe. For reference, the reader is directed to U.S. Pat. No. 5,362,834 issued in the name of Schapel et al. on Nov. 8, 1994, which is hereby incorporated by reference, for more information concerning polyurethane gels. Like silicone gels, polyurethane gels are excellent from a performance standpoint, but are many times more expensive than the most preferred gels.

Method for Making the Cushions

There are several ways in which the cushion can be manufactured from the most preferred gels.

1. Injection Molding

The invented cushions can be injection molded by standard injection molding techniques. For example, a cavity mold is created with cores inside the cavity. The gel ingredients are heated while stirring, which turns the gel into a liquid. The liquid is injected into the cavity and forms around the cores. The material is allowed to cool, which causes it to solidify. When the mold is parted, the cores pull out of the solidified gel and leave the hollow columns. The cushion is removed from the cavity, the mold is closed, and liquid is injected to form the next cushion, this process being repeated to manufacture the desired quantity of cushioning elements. This results in very inexpensive cushioning elements because the preferred gel is inexpensive and the manufacturing process is quick and requires very little labor.

Figure 4:
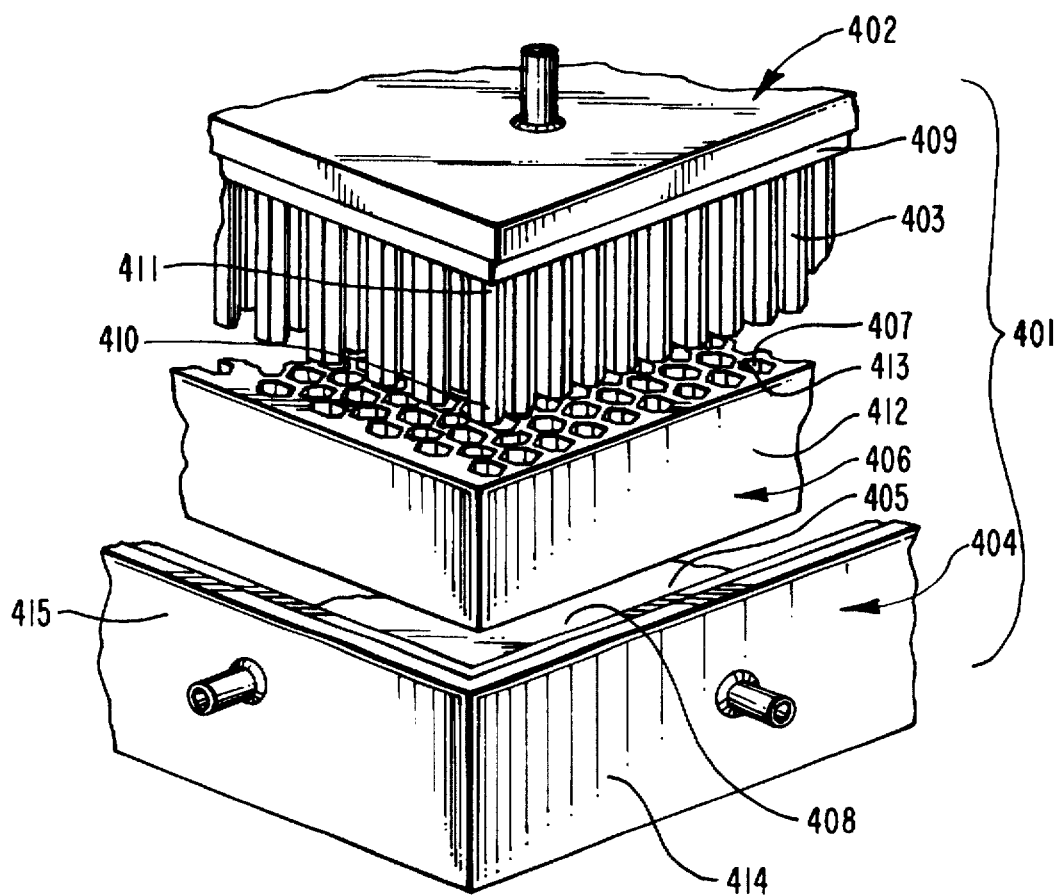
FIG. 4 depicts a mold which may be used to manufacture the invented cushion.

Referring to FIG. 4, an example mold in use is depicted. The mold assembly 401 has a first mold half 401 and a second mold half 404. The second mold half 404 has a cavity 408 and a base plate 405 at the bottom of the cavity 408. It also has side walls 414 and 415. The first mold half 402 has a core mounting plate 409 and a plurality of cores 403 mounted on it in any desired spacing and arrangement. The cores 403 may be of any desired shape, such as triangular, square, pentagonal, n-sided (where n is any integer), round, oval or of any other configuration in cross section in order to yield a molded cushioning element 406 of the desired configuration. The cores 403 could also be tapered from a more narrow dimension (reference numeral 410) at their end distal from the core mounting plate 409 to a wider dimension (reference numeral 411) at their end proximal the core mounting plate. This would create a tapered column or tapered column walls so that the radial measurement of a column orthogonal to its longitudinal axis would be different at two selected different points on the longitudinal axis. Alternatively the cores 403 could be tapered from 410 to 411, stepped from 410 to 411 or configured otherwise to create a column of desired shape. Use of the hexagonal cores 403 depicted yields a cushioning element 406 with cushioning media 412 molded so that the column walls 413 form the hollow columns 407 in a hexagonal configuration.

When the first mold half 402 and second mold half 404 are brought together, core distal ends 410 abut the second mold half base plate 405. This prevents liquid cushioning media from flowing between the base plate 405 and the core distal ends 410 in order to achieve a cushioning element 406 which has hollow columns through which air can circulate. If the core distal ends 410 did not reach all the way to the base plate 408, then the columns 407 would be open at one end and closed at the other.

FIG. 5 depicts an alternative mold configuration. The mold assembly 501 includes first mold half 502 that includes a first core mounting plate 509 onto which a plurality of cores 503 are mounted in a desired configuration. The cores 503 each have a core proximal end proximal to the core mounting plate 509 and a core distal end 511 distal to the core mounting plate 509. The mold assembly 501 also includes a mold second half 504 which has a core mounting plate 505, side walls 512, and cores 508 each having a core proximal end 513 proximal to the core mounting plate 505 and a core distal end 514 distal to the core mounting plate. The second core half 504 also has a cavity 514 in which its cores 508 are found. The mold assembly 501 may be designed so that when the two mold halves are brought together the core distal ends abut the surface of their opposing core mounting plates. This produces a cushioning element 506 with hollow columns 507 that are open from one end to the other in order to maximize air circulation through the columns 507 and yieldability of the cushioning element 506. Alternatively, the mold assembly 501 may be designed so that the core distal ends do not contact the core mounting plates. This will result in a cushion having a cross sectional appearance like that depicted in FIG. 6, where the columns are shorter in length than the thickness of the cushioning element, so the columns are closed at one end.

2. Extrusion

The invented cushioning elements may also be manufactured by typical extrusion processes. If extrusion is used, hot liquid gel is forced through an extrusion die. The die has metal rods situated to obstruct the path of the gel in some locations so that the gel is forced through the die in a pattern resembling the desired shape of the finished cushioning element. Thus the die, having an aperture, an aperture periphery, and forming rods within the aperture has an appearance similar to that of the desired cushioning element except that the portions of the die that are solid will be represented by empty air in the finished cushion, and the portions of the die in the aperture that are unobstructed will represent gel in the finished cushioning element. Thus the rods of the die should be of the shape and size that the desired cushioning element is intended to be; the spacing of the rods should approximate the spacing of the columns that is desired in the finished cushioning element; and the shape and size of the aperture periphery should approximate the shape and size of the periphery of the desired cushioning element.

When gel is forced through the die, the liquid gel is cooled during its traverse through the die, causing it to solidify as it leaves the die. The gel is the cut at desired length intervals to form cushioning elements. Of course, cushioning elements so formed have hollow columns throughout their length, although the columns could be sealed as mentioned elsewhere herein. It not expected, however, that extrusion is a practical method for manufacturing cushions with columns that vary in dimension along their length. The extruded cushioning element is very inexpensive because the both the cushioning media (i.e. the preferred gel) is inexpensive and the manufacturing process is highly automated so that labor requirements are very low.

3. Casting

Another manufacturing process by which the invented cushioning element can be made is by generally known casting technology. In order to cast the invented cushioning element, hot liquid gel (or other cushioning media) is poured into an open cavity, and an assembly of metal rods is pushed into the liquid. The rods will form the columns of the finished product. The liquid flows between the metal rods, cools and solidifies. The metal rods are then removed, leaving the hollow portions of the columns, and the cushion is removed from the cavity. A vibrator may be used to vibrate the cavity to facilitate the flow of the liquid between the rods if needed.

Casting is a more labor intensive manufacturing method than injection molding or extrusion, but the tooling is generally less expensive, especially for large cushions. This is the preferred method of making very large cushions, such as king-size bed mattresses, since the size of such cushions is greater than that which can be manufactured using injection molding or extrusion methods.

The reader should note that any other manufacturing method may be used which results in the a cushioning element having the general configuration of or achieving the object of this invention. Such other methods may include but are not limited to rotational molding of a cushioning media such as a hot liquid gel, and vacuum forming of sheets of a cushioning media such as gel.

While the present invention has been described and illustrated in conjunction with a number of specific embodiments, those skilled in the art will appreciate that variations and modifications may be made without departing from the principles of the invention as herein illustrated, described, and claimed.

The present invention may be embodied in other specific forms without departing from its spirit or essential characteristics. The described embodiments are to be considered in all respects as only illustrative, and not restrictive. The scope of the invention is, therefore, indicated by the appended claims, rather than by the foregoing description. All changes which come within the-meaning and range of equivalency of the claims are to be embraced within their scope.

I claim:

1. A yieldable cushioning element that includes a flexible, resilient, gel cushioning media having shape memory and being substantially solid and non-flowable at temperatures below 130 degrees Fahrenheit, the cushioning element comprising:

a quantity of gel cushioning media formed to have a top, a bottom, and an outer periphery, the cushioning media being compressible so that it will deform under the compressive force of a cushioned object, and a plurality of hollow columns situated in said cushioning media, each of said columns having a longitudinal axis along its length, each of said columns having a column wall which defines a column interior, and each of said columns having a column top and a column bottom;

wherein the cushioning element is adapted to have a cushioned object placed in contact with said cushioning element top; wherein the column top and the column bottom of one of said columns are located at two different points on said longitudinal axis of said column;

wherein said column's longitudinal axis is located generally parallel to the direction of a compressive force exerted on the cushioning element by a cushioned object in contact with said column top;

wherein at least one of said column walls is capable of buckling beneath a protuberance that is located on a cushioned object; and wherein the cushioning element is yieldable as a result of compressibility of said cushioning media and bucklability of said column.

2. A cushioning element as recited in claim 1 wherein in at least one of said columns, said column top is open to said column interior.

3. A cushioning element as recited in claim 1 wherein in at least one of said columns, said column bottom is open to said column interior.

4. A cushioning element as recited in claim 3 wherein said column interior is hollow so that air may pass though said column to said column top in order to ventilate a cushioned object in contact with said top of the cushioning element.

5. A cushioning element as recited in claim 1 wherein said gel cushioning media is selected from the group consisting of gelatinous elastomers and gelatinous viscoelastomers.

6. A cushioning element as recited in claim 1, wherein a cross section of one of said columns taken orthogonal to said longitudinal axis of said column has a shape selected from the group consisting of triangular, square, rectangular, pentagonal, heptagonal, octagonal, round, oval,-and n-sided polygonal where n is an integer.

7. A cushioning element as recited in claim 1, wherein a cross section of one of said columns taken orthogonal to said longitudinal axis of said column is hexagonal.

8. A cushioning element as recited in claim 1 wherein said cushioning element has shape memory so that when a cushioned object is removed from contact with the cushioning element, the cushioning element has a tendency to return to a shape that approximates the shape of the cushioning element before the cushioning element and the cushioned object came into contact with each other.

9. A cushioning element as recited in claim 1 wherein said gel cushioning element is configured to have a low overall thermal mass and a low rate of thermal transfer in order to provide a comfortable cushioning element.

10. A cushioning element as recited in claim 1 wherein said periphery of the cushioning element has a shape selected from the group consisting of triangular, square, rectangular, pentagonal, hexagonal, heptagonal, octagonal, round, oval, elliptical, heart-shaped, and n-sided polygonal.

11. A cushioning element as recited in claim 1 wherein said cushioning media includes a quantity of gas bubbles within it, said gas bubbles serving to increase the compressibility of the cushioning element.

12. A cushioning element as recited in claim 11 wherein said gas bubbles are dispersed throughout said cushioning media of the cushioning element.

13. A cushioning element as recited in claim 11 wherein a plurality of said gas bubbles are present in said column walls, said gas bubbles in said column walls serving to decrease the level of compressive force required to be exerted on a column in order to cause the column to buckle.

14. A cushioning element as recited in claim 1 wherein a plurality of said column walls have openings in them to permit movement of a liquid or gas between adjacent columns.

15. A cushioning element as recited in claim 1 wherein at least one of said columns has a column interior that has a greater radial measurement orthogonal to the longitudinal axis of that column at a first point on the longitudinal axis of the column than at a second point on said longitudinal axis.

16. A cushioning element as recited in claim 15 wherein said column is tapered between said column top and said column bottom.

17. A cushioning element as recited in claim 15 wherein said column is stepped between said column top and said column bottom.

18. A cushioning element as recited in claim 1 wherein in at least one column, said column top and said column bottom are sealed so that said column interior is not in fluid or air communication with a region outside of said column interior.

19. A cushioning element as recited in claim 18 wherein said column interior includes a quantity of fluid cushioning media within it.

20. A cushioning element as recited in claim 1 wherein at least one of said columns has a column interior that contains a quantity of foam within it, said foam being selected from the group consisting of open cell foam and closed cell foam.

21. A cushioning element as recited in claim 1 wherein at least one of said columns has a firmness protrusion located at its column bottom, said firmness protrusion being adapted to provide support within said column when said column buckles so that the cushioning element can readily yield in the vicinity of said column under a cushioned object until the cushioned object begins to compress said firmness protrusion, whereupon said firmness protrusion retards further movement of the cushioned object into the cushioning element.

22. A cushioning element as recited in claim 1 wherein at least one of said columns is adapted to buckle by having a portion of its column wall bulge outward away from the column interior.

23. A cushioning element as recited in claim 1 wherein at least one of said columns is adapted to buckle by having a portion of its column wall bulge inward toward the column interior.

24. A cushioning element as recited in claim 1 wherein at least one of said columns is adapted to yield along its longitudinal axis by buckling of its column wall.

25. A cushioning element as recited in claim 1, wherein the cushioning element has a total volume contained within the boundaries of the cushioning element top, bottom and outer periphery; and wherein said cushioning element total volume is occupied by not more than about 50% by volume of cushioning media.

26. A cushioning element as recited in claim 1 wherein said gel cushioning media is selected from the group consisting of elastomers and viscoelastomers.

27. A cushioning element as recited in claim 26 wherein said gel cushioning media has a Shore A hardness of less than 15.

28. A cushioning element as recited in claim 26 wherein said gel cushioning media has a Shore A hardness of less than 3.

29. A cushioning element as recited in claim 26 wherein said gel cushioning media has a gram Bloom of less than 800.

30. A cushioning element as recited in claim 26 wherein said gel cushioning media comprises a high viscosity triblock copolymer.

31. A cushioning element as recited in claim 30 wherein said copolymer has the general configuration of poly (styrene-ethylene-butylene-styrene).

32. A cushioning element as recited in claim 26 wherein said gel cushioning media comprises about 100 parts by weight of a triblock copolymer and from about 200 to about 1600 parts by weight of a plasticizing oil.

33. A cushioning element as recited in claim 32 wherein said copolymer has the general configuration of poly (styrene-ethylene-butylene-styrene).

34. A yieldable cushion that includes a flexible, resilient, gelatinous cushioning media having shape memory and being substantially solid and non-flowable at temperatures below 130 degrees Fahrenheit, the cushion comprising:

a cushioning element having a top, a bottom, a center and a side wall, said cushioning element comprising a quantity of gelatinous cushioning media and a plurality of contiguous, adjacent hollow columns located within said cushioning media, said columns each having a column interior and a column wall, a base configured to be placed in contact with said cushioning element bottom, said base being rigid in order to provide support beneath said cushioning element when a cushioned object is in contact with the cushion such that a compressive force is exerted against said cushioning element top by the cushioned object; and a side wall support, said side wall support being configured to tend to constrain said side wall of said cushioning element from moving outward from said cushioning element center;

wherein said cushion is yieldable in response to a compressive force exerted upon it by a cushioned object; and wherein said yieldability of the cushion results from said cushioning media being compressible and from said columns being bucklable, so that the cushion is able to substantially conform to the shape of a cushioned object.

35. A cushion as recited in claim 34 wherein in at least one of said columns, said column top is open to said column interior.

36. A cushion as recited in claim 34 wherein in at least one of said columns, said column bottom is open to said column interior.

37. A cushion as recited in claim 34 wherein in at least one of said columns, both said column top and said column bottom are open to said column interior.

38. A cushion as recited in claim 37 wherein said column interior is hollow so that air may pass though said column to said column top in order to ventilate a cushioned object in contact with said top of the cushioning element.

39. A cushion as recited in claim 34 wherein said gel cushioning media is selected from the group consisting of gelatinous elastomers and gelatinous viscoelastomers.

40. A cushion as recited in claim 34, wherein a cross section of one of said columns taken orthogonal to said longitudinal axis of said column has a shape selected from the group consisting of triangular, square, rectangular, pentagonal, heptagonal, octagonal, round, oval, and n-sided polygonal where n is an integer.

41. A cushion as recited in claim 34 wherein said gel cushioning element is configured to have a low overall thermal mass and a low overall rate of thermal transfer in order to provide a comfortable cushioning element.

42. A cushion as recited in claim 34 wherein said periphery of the cushioning element has a shape selected from the group consisting of triangular, square, rectangular, pentagonal, hexagonal, heptagonal, octagonal, round, oval, elliptical, heart-shaped, and n-sided polygonal.

43. A cushion as recited in claim 34 wherein said cushioning media includes a quantity of gas bubbles within it, said gas bubbles serving to enhance the compressibility of the cushioning element.

44. A cushion as recited in claim 43 wherein said gas bubbles are dispersed throughout said cushioning media of the cushioning element.

45. A cushion as recited in claim 44 wherein a plurality of said gas bubbles are present in said column walls, said gas bubbles in said column walls serving to decrease the level of compressive force required to be exerted on a column in order to cause the column to buckle.

46. A cushion as recited in claim 34 wherein a plurality of said column walls have openings in them to permit movement of a liquid or gas between adjacent columns.

47. A cushion as recited in claim 34 wherein at least one of said columns has a column interior that has a greater radial measurement orthogonal to the longitudinal axis of that column at a first point on the longitudinal axis of the column than at a second point on said longitudinal axis.

48. A cushion as recited in claim 47 wherein said column is tapered between said column top and said column bottom.

49. A cushion as recited in claim 48 wherein said column is stepped between said column top and said column bottom.

50. A cushion as recited in claim 34 wherein in at least one column, said column top and said column bottom are sealed so that said column interior is not in fluid or air communication with a region outside of said column interior.

51. A cushion as recited in claim 50 wherein said column interior includes a quantity of fluid cushioning media within it.

52. A cushion as recited in claim 34 wherein at least one of said columns has a column interior that contains a quantity of foam within it, said foam being selected from the group consisting of open cell foam and closed cell foam.

53. A cushion as recited in claim 34 wherein at least one of said columns has a firmness protrusion located at its column bottom, said firmness protrusion being adapted to provide support within said column when said column buckles so that the cushioning element can readily yield in the vicinity of said column under a cushioned object until the cushioned object begins to compress said firmness protrusion, whereupon said firmness protrusion retards further movement of the cushioned object into the cushioning element.

54. A cushion as recited in claim 34 wherein at least one of said columns is adapted to buckle by having a portion of its column wall bulge outward away from the column interior.

55. A cushion as recited in claim 34 wherein at least one of said columns is adapted to buckle by having a portion of its column wall bulge inward toward the column interior.

56. A cushion as recited in claim 34 wherein at least one of said columns is adapted to yield along its longitudinal axis by buckling of its column wall.

57. A cushion as recited in claim 34, wherein the cushioning element has a total volume contained within the boundaries of the cushioning element top, bottom and outer periphery; and wherein said cushioning element total volume is occupied by not more than about 50% by volume of cushioning media.

58. A cushion as recited in claim 34 wherein said gelatinous cushioning media is selected from the group consisting of gelatinous elastomers and viscoelastomers.

59. A cushion as recited in claim 34 wherein said gel cushioning media has a Shore A hardness of less than 15.

60. A cushion as recited in claim 34 wherein said gel cushioning media has a Shore A hardness of less than 3.

61. A cushion as recited in claim 34 wherein said gel cushioning media has a gram Bloom of less than 800.

62. A cushion as recited in claim 34 wherein said gel cushioning media comprises a high viscosity triblock copolymer.

63. A cushion as recited in claim 62 wherein said copolymer has the general configuration of poly(styrene-ethylene-butylene-styrene).

64. A cushion as recited in claim 34 wherein said gel cushioning media comprises about 100 parts by weight of a triblock copolymer and from about 200 to about 1600 parts by weight of a plasticizing oil.

65. A cushion as recited in claim 64 wherein said copolymer has the general configuration of poly(styrene-ethylene-butylene-styrene).

66. A yieldable cushion that includes a flexible, resilient, gelatinous cushioning media having shape memory and being substantially solid and non-flowable at temperatures below 130 degrees Fahrenheit, the cushion comprising:

a cushioning element having a top, a bottom, a center and an outer periphery, said cushioning element comprising a quantity of gelatinous cushioning media and a plurality of columns located within said cushioning media, said columns each having a longitudinal axis, a column interior and a column wall, a container in which said cushioning element is placeable, said container having a container base configured to be in contact with said cushioning element bottom, said base being rigid in order to provide support beneath said cushioning element when a cushioned object is in contact with the cushion such that a compressive force is exerted against said cushioning element top by the cushioned object, said container also having a rigid outer periphery support, said rigid outer periphery support being configured to provide support to said cushioning element outer periphery in order to impede its tendency to move outward away from said cushioning element center when a cushioned object exerts a compressive force on the cushion, wherein said cushion is yieldable in response to a compressive force exerted upon it by a cushioned object; and wherein said yieldability of the cushion results from said cushioning media being compressible and from said columns being bucklable generally in the direction of their longitudinal axes, so that the cushion is able to substantially conform to the shape of a cushioned object.

67. A cushion as recited in claim 66 wherein in at least one of said columns, said column top is open to said column interior.

68. A cushion as recited in claim 66 wherein in at least one of said columns, said column bottom is open to said column interior.

69. A cushion as recited in claim 66 wherein in at least one of said columns, both said column top and said column bottom are open to said column interior.

70. A cushion as recited in claim 69 wherein said column interior is hollow so that air may pass though said column to said column top in order to ventilate a cushioned object in contact with said top of the cushioning element.

71. A cushion as recited in claim 69, wherein a cross section of one of said columns taken orthogonal to said longitudinal axis of said column has a shape selected from the group consisting of triangular, square, rectangular, pentagonal, heptagonal, octagonal, round, oval, and n-sided polygonal where n is an integer.

72. A cushion as recited in claim 66 wherein said gel cushioning media is selected from the group consisting of gelatinous elastomers and gelatinous viscoelastomers.

73. A cushion as recited in claim 66, wherein a cross section of one of said columns taken orthogonal to said longitudinal axis of said column has a hexagonal shape.

74. A cushion as recited in claim 66 wherein said gel cushioning element is configured to have a low overall thermal mass and a low overall rate of thermal transfer in order to provide a comfortable cushioning element.

75. A cushion as recited in claim 66 wherein said periphery of the cushioning element has a shape selected from the group consisting of triangular, square, rectangular, pentagonal, hexagonal, heptagonal, octagonal, round, oval, elliptical, heart-shaped, and n-sided polygonal.

76. A cushion as recited in claim 66 wherein said cushioning media includes a quantity of gas bubbles within it, said gas bubbles serving to enhance the compressibility of the cushioning element.

77. A cushion as recited in claim 76 wherein said gas bubbles are dispersed throughout said cushioning media of the cushioning element.

78. A cushion as recited in claim 76 wherein a plurality of said gas bubbles are present in said column walls, said gas bubbles in said column walls serving to decrease the level of compressive force required to be exerted on a column in order to cause the column to buckle.

79. A cushion as recited in claim 66 wherein a plurality of said column walls have openings in them to permit movement of a liquid or gas between adjacent columns.

80. A cushion as recited in claim 66 wherein at least one of said columns has a column interior that has a greater radial measurement orthogonal to the longitudinal axis of that column at a first point on the longitudinal axis of the column than at a second point on said longitudinal axis.

81. A cushion as recited in claim 80 wherein said column is tapered between said column top and said column bottom.

82. A cushion as recited in claim 80 wherein said column is stepped between said column top and said column bottom.

83. A cushion as recited in claim 66 wherein in at least one column, said column top and said column bottom are sealed so that said column interior is not in fluid or air communication with a region outside of said column interior.

84. A cushion as recited in claim 83 wherein said column interior includes a quantity of fluid cushioning media within it.

85. A cushion as recited in claim 66 wherein at least one of said columns has a column interior that contains a quantity of foam within it, said foam being selected from the group consisting of open cell foam and closed cell foam.

86. A cushion as recited in claim 66 wherein at least one of said columns has a firmness protrusion located at its column bottom, said firmness protrusion being adapted to provide support within said column when said column buckles so that the cushioning element can readily yield in the vicinity of said column under a cushioned object until the cushioned object begins to compress said firmness protrusion, whereupon said firmness protrusion retards further movement of the cushioned object into the cushioning element.

87. A cushion as recited in claim 66 wherein at least one of said columns is adapted to buckle by having a portion of its column wall bulge outward away from the column interior.

88. A cushion as recited in claim 66 wherein at least one of said columns is adapted to buckle by having a portion of its column wall bulge inward toward the column interior.

89. A cushion as recited in claim 66 wherein at least one of said columns is adapted to yield along its longitudinal axis by buckling of its column wall.

90. A cushion as recited in claim 66, wherein the cushioning element has a total volume contained within the boundaries of the cushioning element top, bottom and outer periphery; and wherein said cushioning element total volume is occupied by not more than about 50% by volume of cushioning media.

91. A cushion as recited in claim 66 wherein said gel cushioning media is selected from the group consisting of elastomers and viscoelastomers.

92. A cushion as recited in claim 66 wherein said gel cushioning media has a Shore A hardness of less than 15.

93. A cushion as recited in claim 66 wherein said gel cushioning media has a Shore A hardness of less than 3.

94. A cushion as recited in claim 66 wherein said gel cushioning media has a gram Bloom of less than 700.

95. A cushion as recited in claim 66 wherein said gel cushioning media comprises a high viscosity triblock copolymer.

96. A cushion as recited in claim 95 wherein said copolymer has the general configuration of poly(styrene-ethylene-butylene-styrene).

97. A cushion as recited in claim 66 wherein said gel cushioning media comprises about 100 parts by weight of a triblock copolymer and from about 200 to about 1600 parts by weight of a plasticizing oil.

98. A cushion as recited in claim 97 wherein said copolymer has the general configuration of poly(styrene-ethylene-butylene-styrene).

99. A yieldable cushion that includes a flexible, resilient, gelatinous cushioning media having shape memory and being substantially solid and non-flowable at temperatures below 130 degrees Fahrenheit, the cushion comprising:

a cushioning element having a top, a bottom, a center and a side wall, said cushioning element comprising a quantity of gelatinous cushioning media and a plurality of columns located within said cushioning media, said columns each having longitudinal axis, a column interior and a column wall, a base configured to be placed in contact with said cushioning element bottom, said base providing support beneath said cushioning element when a cushioned object is in contact with the cushion such that a compressive force is exerted against said cushioning element top by the cushioned object, and a cover adapted to cover and protect said cushioning element;

wherein said cushion is yieldable in response to a compressive force exerted upon it by a cushioned object; and wherein said yieldability of the cushion results from said cushioning media being compressible and from said columns being bucklable in the direction of their longitudinal axes, so that the cushion is able to substantially conform to the shape of a cushioned object.

100. A cushion as recited in claim 99 wherein said cover is an elastic cover that permits air flow between said cushioning element top and a cushioned object adjacent thereto.

101. A cushion as recited in claim 99 further comprising:

a side wall support, said side wall support being configured to tend to constrain said side wall of said cushioning element from moving in an outward direction.

102. A cushion as recited in claim 99 wherein said sidewall support is a rigid plate adapted to be placed between said cover and said cushioning element.

103. A yieldable cushion that includes a flexible, resilient, gelatinous cushioning media having shape memory and being substantially solid and non-flowable at temperatures below 130 degrees Fahrenheit, the cushion comprising:

cushioning element having a top, a bottom, a center and an outer periphery, said cushioning element comprising a quantity of gelatinous cushioning media and a plurality of columns located within said cushioning media, said columns each having a longitudinal axis, a column interior and a column wall, and a girdle placeable about said outer periphery of said cushioning element, said girdle serving to retard movement of said outer periphery when a cushioned object exerts a compressive force on the cushioning element, wherein said cushion is yieldable in response to a compressive force exerted upon it by a cushioned object; and wherein said yieldability of the cushion results from said cushioning media being compressible and from said columns being bucklable generally in the direction of their longitudinal axes, so that the cushion is able to substantially conform to the shape of a cushioned object.

104. A cushion as recited in claim 103 wherein said girdle is a strap.

105. A yieldable cushioning element that includes a flexible, resilient, gel cushioning media having shape memory and being substantially solid and non-flowable at temperatures below 130 degrees Fahrenheit, the cushioning element comprising:

a quantity of gel cushioning media formed to have a top, a bottom, and an outer periphery, the cushioning media being compressible so that it will deform under the compressive force of a cushioned object, and a plurality of hollow columns situated in said cushioning media, each of said columns having a longitudinal axis along its length, each of said columns having a column wall which defines a column interior, and each of said columns having a column top and a column bottom;

wherein the cushioning element is adapted to have a cushioned object placed in contact with said cushioning element top;

wherein the column top and the column bottom of one of said columns are located at two different points on said longitudinal axis of said column;

wherein said column's longitudinal axis is located generally parallel to the direction of a compressive force exerted on the cushioning element by a cushioned object in contact with said column top;

wherein at least one of said columns is capable of buckling beneath a protuberance that is located on a cushioned object;

wherein the cushioning element is yieldable as a result of compressibility of said cushioning media and bucklability of said column;

wherein said cushioning media comprises thermoplastic, heat formable and heat reversible gelatinous elastomer composition, G, which is physically interlocked with a selected material Mn, said gelatinous elastomer composition formed from (a) 100 parts by weight of a high viscosity triblock copolymer of the general configuration poly(styrene-ethylene-butylene-styrene); (b) from about 200 to about 1,600 parts by weight of a plasticizing oil; said composition characterized by a gel rigidity of from about 20 to about 800 gram Bloom; said composition formed from the combination GnMnGn, MnGnMn, MnGnGn, GnGnMn, MnGnGnMn, GnMnGnGn, GnMnMnGn, GnMnMnGn, GnGnMnMn, GnGnMnGnMn, GnMnGnGn, GnGnMn, GnMnGnMnMn, MnGnMnGnMnGn, GnGnMnMnGn, or GnGnMnGnMnGn, wherein when n is a subscript of M, n is selected from the group consisting of foam, plastic, fabric, metal, concrete, wood, glass, ceramics, synthetic resin, synthetic fibers or refractory materials; and wherein when n is a subscript of G, n denotes the same or a different gel rigidity.

106. A cushioning element as recited in claim 105 wherein said styrene end block to ethylene and butylene center block ratio is from about 20:80 to about 40:60.

107. A cushioning element as recited in claim 105, wherein said triblock copolymer is characterized by a Brookfield Viscosity of a 20 weight percent solids solution in toluene at 25° C. of substantially greater than 1,800 cps.

108. A cushioning element as recited in claim 105 wherein said cushioning media is a gelatinous elastomer composition comprising:
(a) about 100 parts by weight of a triblock copolymer of the general configuration poly(styrene-ethylene-butylene-styrene) wherein said styrene end block to ethylene and butylene center block ratio is within the range of from between 31:69 to 40:60;
(b) from about 200 to about 1,600 parts by weight of an plasticizing oil selected from the group consisting of petroleum paraffinic oils, petroleum naphthenic oils, synthetic polybutene oils, synthetic polypropene oils, synthetic polyterpene oils and mixtures thereof; said oils having an average molecular weight of between about 200 to about 800; and
(c) said gelatinous elastomer composition being characterized as having an elongation at break of at least about 1,600%, an ultimate tensile strength of at least about $8 \times 10^5$ dyne/cm$^2$, and a gel rigidity of substantially not greater than about 800 gram Bloom.

109. A cushioning element as recited in claim 108 wherein said cushioning media exhibits the following properties:
(a) tensile strength of about $8 \times 10^5$ dyne/cm$^2$ to about $10^7$ dyne/cm$^2$ as measured with crosshead separation speed of 25 cm per minute at 23° C.;
(b) elongation of about 1,600% to about 3,000% as measured with crosshead separation speed of 25 cm per minute at 23° C.;
(c) elasticity modulus of about $10^4$ dyne/cm$^2$ to about $10^6$ dyne/cm$^2$ as measured with crosshead separation speed of 25 cm per minute at 23° C.;
(d) shear modulus of about $10^4$ dyne/cm$^2$ to about $10^6$ dyne/cm$^2$ as measured with a 1, 2, and 3 kilogram load at 23° C.;
(e) gel rigidity of about 20 gram Bloom to about 800 gram Bloom as measured by the gram weight required to depress a gel a distance of 4 mm with a piston having a cross-sectional area of 1 square cm at 23° C.;
(f) tear propagation resistance of at least $5 \times 10^5$ dyne/cm$^2$ as measured at a crosshead separation speed of 25 cm/minute at 23° C.;
(g) and substantially 100% snap back recovery when extended at a crosshead separation speed of 25 cm/minute to 1,200% at 23° C.

110. A cushioning element as recited in claim 105 wherein said cushioning media is a gelatinous elastomer composition consisting essentially of:
(a) about 100 parts by weight of a triblock copolymer of the general configuration poly(styrene-ethylene-butylene-styrene) wherein said styrene end block to ethylene and butylene center block ratio is about 32:68 to about 38:62;
(b) from about 200 to about 1,600 parts by weight of an plasticizing oil selected from the group consisting of petroleum paraffinic oils, petroleumnaphthenic oils, synthetic polybutene oils, synthetic polypropene oils, synthetic polyterpene oils and mixtures thereof; said oils having an average molecular weight of between about 200 to about 800; and
(c) said gelatinous elastomer composition being characterized as having an elongation at break of at least about 1,600%, an ultimate tensile strength of at least about $8 \times 10^5$ dyne/cm$^2$, and a gel rigidity of substantially not greater than about 800 gram Bloom.

111. A cushioning element as recited in claim 110 wherein said cushioning media is a gelatinous elastomer composition comprising:
(a) about 100 parts by weight of a triblock copolymer of the general configuration poly(styrene-ethylene-butylene-styrene) wherein said styrene end block to ethylene and butylene center block ratio is about 32:68 to about 36:64;
(b) from about 200 to about 1,600 parts by weight of an plasticizing oil selected from the group consisting of petroleum paraffinic oils, petroleum naphthenic oils, synthetic polybutene oils, synthetic polypropene oils, synthetic polyterpene oils and mixtures thereof; said oils having an average molecular weight of between about 200 to about 800; and
(c) said gelatinous elastomer composition being characterized as having an elongation at break of at least about 1,600%, an ultimate tensile strength of at least about $8 \times 10^5$ dyne/cm$^2$, and a gel rigidity of substantially not greater than about 800 gram Bloom.

112. A cushioning element as recited in claim 111, said cushioning media being a gelatinous elastomer composition comprising:
(a) about 100 parts by weight of triblock copolymer of the general configuration poly(styrene-ethylene-butylene-styrene) wherein said styrene end block to ethylene and butylene center block ratio is within the range of from between 31:69 to 40:60;
(b) from about 200 to about 1,600 parts by weight of a plasticizing oil;
(c) said gelatinous elastomer composition having a gel rigidity of about 20 gram to about 800 gram Bloom.

113. A cushioning element as recited in claim 112 wherein said plasticizing oil is selected from the group consisting of petroleum paraffinic oils, petroleum naphthenic oils, and mixtures thereof.

114. A cushioning element as recited in claim 112 wherein said plasticizing oil is selected from the group consisting of synthetic polybutene oils, synthetic polypropene oils, synthetic polyterpene oils and mixtures thereof.

115. A cushioning element as recited in claim 112 wherein said plasticizing oil is selected from the group consisting of petroleum paraffinic oils, petroleum naphthenic oils, synthetic polybutene oils, synthetic polypropylene oils, synthetic polyterpene oils and mixtures thereof; said oils having an average molecular weight of between about 200 to about 800.

116. A cushioning element as recited in claim 112 wherein said oils having an average molecular weight of between about 200 to about 800.

117. A cushioning element as recited in claim 112 wherein said cushioning element exhibits high creep, craze, tear, and crack resistance and is substantially free from oil bleedout.

118. A yieldable cushioning element that includes a flexible, resilient, gel cushioning media having shape memory and being substantially solid and non-flowable at temperatures below 130 degrees Fahrenheit, the cushioning element comprising:
a quantity of gel cushioning media formed to have a top, a bottom, and an outer periphery, the cushioning media being compressible so that it will deform under the compressive force of a cushioned object, and
a plurality of hollow columns situated in said cushioning media, each of said columns having a longitudinal axis along its length, each of said columns having a column wall which defines a column interior, and each of said columns having a column top and a column bottom;

wherein the cushioning element is adapted to have a cushioned object placed in contact with said cushioning element top;

wherein the column top and the column bottom of one of said columns are located at two different points on said longitudinal axis of said column;

wherein said column's longitudinal axis is located generally parallel to the direction of a compressive force exerted on the cushioning element by a cushioned object in contact with said column top;

wherein at least one of said columns is capable of buckling beneath a protuberance that is located on a cushioned object;

wherein the cushioning element is yieldable as a result of compressibility of said cushioning media and bucklability of said column;

wherein the cushioning media is a gelatinous elastomer composition comprising:
 (a) about 100 parts by weight of a high viscosity triblock copolymer of the general configuration poly (styrene-ethylene-butylene-styrene);
 (b) from about 200 to about 1,600 parts by weight of a plasticizing oil; said composition characterized by a gel rigidity of from about 20 to about 800 gram Bloom.

119. A yieldable cushioning element that includes a flexible, resilient, gel cushioning media having shape memory and being substantially solid and non-flowable at temperatures below 130 degrees Fahrenheit, the cushioning element comprising:

a quantity of gel cushioning media formed to have a top, a bottom, and an outer periphery, the cushioning media being compressible so that it will deform under the compressive force of a cushioned object, and a plurality of hollow columns situated in said cushioning media, each of said columns having a longitudinal axis along its length, each of said columns having a column wall which defines a column interior, and each of said columns having a column top and a column bottom;

wherein the cushioning element is adapted to have a cushioned object placed in contact with said cushioning element top;

wherein the column top and the column bottom of one of said columns are located at two different points on said longitudinal axis of said column;

wherein said column's longitudinal axis is located generally parallel to the direction of a compressive force exerted on the cushioning element by a cushioned object in contact with said column top;

wherein at least one of said columns is capable of buckling beneath a protuberance that is located on a cushioned object;

wherein the cushioning element is yieldable as a result of compressibility of said cushioning media and bucklability of said column;

wherein the cushioning media is a gelatinous elastomer composition comprising:
 (a) about 100 parts by weight of a high viscosity triblock copolymer of the general configuration poly (styrene-ethylene-butylene-styrene); said styrene to ethylene and butylene is of a ratio of from about 20:80 to about 40:60; and
 (b) from about 200 to about 1,600 parts by weight of a plasticizing oil; said composition characterized by a gel rigidity of from about 20 to about 800 gram Bloom.

120. A cushioning element as recited in claim 119 wherein said triblock copolymer is characterized by a Brookfield Viscosity of a 20 weight percent solids solution in toluene at 25° C. of at least about 1,800 cps.

* * * * *

(12) EX PARTE REEXAMINATION CERTIFICATE (6279th)
United States Patent
Pearce

(10) Number: US 5,749,111 C1
(45) Certificate Issued: Jul. 1, 2008

(54) GELATINOUS CUSHIONS WITH BUCKLING COLUMNS

(75) Inventor: Tony M. Pearce, Alpine, UT (US)

(73) Assignee: Edizone, LC, Alpine, UT (US)

Reexamination Request:
No. 90/007,656, Aug. 5, 2005
No. 90/008,333, Nov. 20, 2006

Reexamination Certificate for:
Patent No.: 5,749,111
Issued: May 12, 1998
Appl. No.: 08/601,374
Filed: Feb. 14, 1996

(51) Int. Cl.
*A47C 27/00* (2006.01)
*A47C 27/14* (2006.01)

(52) U.S. Cl. .................. 5/652; 5/652.1; 5/653; 5/654; 5/706; 5/740; 5/909; 5/948; 5/953; 428/137; 428/138

(58) Field of Classification Search .............. 5/652, 5/652.1, 653, 654, 740, 948, 909, 706, 420; 428/138; 36/35 R
See application file for complete search history.

(56) References Cited

U.S. PATENT DOCUMENTS 4,179,826 A 12/1979 Davidson
5,172,494 A 12/1992 Davidson
5,336,708 A 8/1994 Chen
5,444,881 A 8/1995 Landi et al.
5,749,111 A 5/1998 Pearce

OTHER PUBLICATIONS

Random House Webster's Unabridged Dictionary, V3.0 for 32bit Windows system, Random House, Inc., 1999.
Seely, Fred B. and Smith, James O., *Advanced Mechanics of Materials*, 2$^{nd}$ Ed., John Wiley & Sons, Inc., 1952, pp. 585–590.

*Primary Examiner*—Matthew C. Graham

(57) ABSTRACT

A cushion that includes a cushioning element. The cushioning element has a number of substantially parallel elongate columns formed in a gelatinous cushioning media. The columns are configured so that when a force is applied to the cushioning element in a direction that is generally parallel to the longitudinal axes of the columns, the cushioning element will yield by a combination of compressability of the cushioning media and bucklability of the walls of the columns. In particular, the walls of columns which are located beneath a protuberance on an object being cushioned tend to buckle, permitting the cushioning element to conform to the shape of the cushioned object while evenly distributing a supporting force across the contact area of the cushioned object and avoiding pressure peaks. The preferred cushioning media is a gelatinous elastomer or gelatinous viscoelastomer. Various configurations of cushioning elements, including sidewall supports, are disclosed.

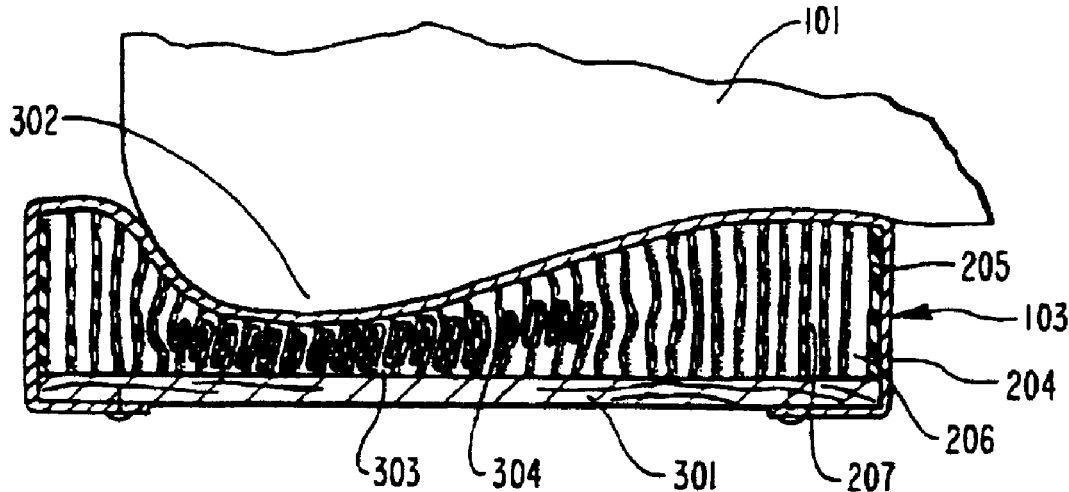

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claim 1–120 is confirmed.

* * * * *

(12) EX PARTE REEXAMINATION CERTIFICATE (7490th)
United States Patent
Pearce

(10) Patent Number: US 5,749,111 C2
(45) Certificate Issued: May 4, 2010

(54) GELATINOUS CUSHIONS WITH BUCKLING COLUMNS

(75) Inventor: Tony M. Pearce, Alpine, UT (US)

(73) Assignee: TNT Holdings, LLC, Alpine, UT (US)

Reexamination Request:
No. 90/009,026, Jan. 25, 2008

Reexamination Certificate for:
Patent No.: 5,749,111
Issued: May 12, 1998
Appl. No.: 08/601,374
Filed: Feb. 14, 1996

Reexamination Certificate C1 5,749,111 issued Jul. 1, 2008

(51) Int. Cl.
*A47C 27/00* (2006.01)
*A47C 27/14* (2006.01)

(52) U.S. Cl. ............ 5/652; 5/909; 5/948; 5/652.1; 5/653; 5/654; 5/706; 5/740; 5/953; 428/137; 428/138

(58) Field of Classification Search ............ 5/654, 5/909, 948; 427/138
See application file for complete search history.

(56) References Cited

U.S. PATENT DOCUMENTS

| | | |
|---|---|---|
| 2,617,751 A | 11/1952 | Bickett |
| 2,887,425 A | 5/1959 | Holland |
| 3,043,731 A | 7/1962 | Hill |
| 5,172,494 A | 12/1992 | Davidson |
| 5,336,708 A | 8/1994 | Chen |
| 5,444,881 A | 8/1995 | Landi et al. |
| 5,633,286 A | 5/1997 | Chen |

FOREIGN PATENT DOCUMENTS

WO   WO 88/10339   12/1988

OTHER PUBLICATIONS

Handbook of Thermoplastic Elastomers, Van Nostrand Reinhold Co., 2nd Edition, 1988, pp. 26–30.

*Primary Examiner*—Matthew C. Graham

(57) ABSTRACT

A cushion that includes a cushioning element. The cushioning element has a number of substantially parallel elongate columns formed in a gelatinous cushioning media. The columns are configured so that when a force is applied to the cushioning element in a direction that is generally parallel to the longitudinal axes of the columns, the cushioning element will yield by a combination of compressability of the cushioning media and bucklability of the walls of the columns. In particular, the walls of columns which are located beneath a protruberance on an object being cushioned tend to buckle, permitting the cushioning element to conform to the shape of the cushioned object while evenly distributing a supporting force across the contact area of the cushioned object and avoiding pressure peaks. The preferred cushioning media is a gelatinous elastomer or gelatinous viscoelastomer. Various configurations of cushioning elements, including sidewall supports, are disclosed.

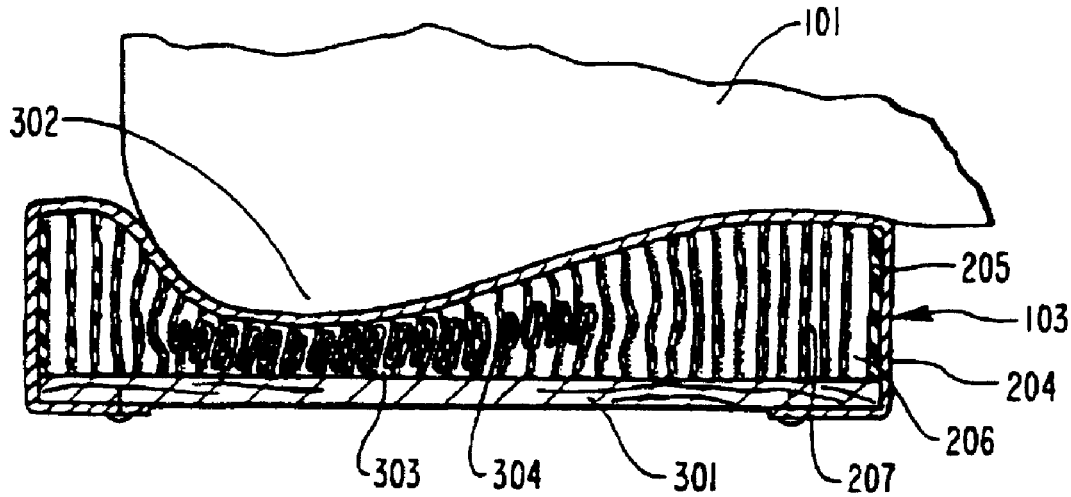

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 25, 57 and 90 are cancelled.

Claims 1–4, 6, 9, 10, 34, 38, 41, 49, 66, 70, 99, 102, 103, 105 and 108–119 are determined to be patentable as amended.

Claims 5, 7, 8, 11–24, 26–33, 35–37, 39–40, 42–48, 50–56, 58–65, 67–69, 71–89, 91–98, 100, 101, 104, 106, 107 and 120, dependent on an amended claim, are determined to be patentable.

New claims 121–123 are added and determined to be patentable.

1. A yieldable cushioning element that includes a flexible, resilient, gel cushioning media having shape memory and being substantially solid and non-flowable at temperatures below 130 degrees Fahrenheit, the cushioning element comprising:
   a quantity of gel cushioning media formed to have a top, a bottom, and an outer periphery, the cushioning media being compressible so that it will deform under the compressive force of a cushioned object, and
   a plurality of hollow columns situated in said cushioning media, each of said columns having a longitudinal axis along its length, each of said columns having a column wall which defines a column interior, and each of said columns having a column top and a column bottom;
   *wherein not more than 50% of a total volume bounded by the top, the bottom, and the outer periphery of the quantity of gel cushioning media is occupied by the quantity of gel cushioning media;*
   wherein the cushioning element is adapted to have a cushioned object placed in contact with said cushioning element top;
   *wherein at least one of the column top and the column bottom of at least one hollow column of the plurality of hollow columns is open to allow air within the at least one hollow column to vent out from the column interior;*
   wherein the column top and the column bottom of [one of said columns] *the at least one hollow column of the plurality of hollow columns* are located at two different points on said longitudinal axis of said *at least one hollow* column;
   wherein [said column's] *the* longitudinal axis *of the at least one hollow column* is located generally parallel to the direction of a compressive force exerted on the cushioning element by a cushioned object in contact with said column top *of the at least one hollow column*;
   wherein at least one of said column walls is capable of buckling beneath a protuberance that is located on a cushioned object; and
   wherein the cushioning element is yieldable as a result of compressiblity of said cushioning media and bucklability of said column.

2. A cushioning element as recited in claim 1 wherein [in at least one of said columns,] said column top *of the at least one hollow column* is open to said column interior *of the at least one hollow column*.

3. A cushioning element as recited in claim 1, wherein [in at least one of said columns,] said column bottom *of the at least one hollow column* is open to said column interior *of the at least one hollow column*.

4. A cushioning element as recited in [claim 3] *claim 2* wherein said column interior *of the at least one hollow column* is hollow so that air may pass [though] *through* said *at least one hollow* column to said column top *of the at least one hollow column* in order to ventilate a cushioned object in contact with said top of the cushioning element.

6. A cushioning element as recited in claim 1, wherein a cross section of one of said columns taken orthogonal to said longitudinal axis of said column has a shape selected from the group consisting of triangular, square, rectangular, pentagonal, heptagonal, octagonal, round, [oval,-and] *oval, and* n-sided polygonal where n is an integer.

9. A cushioning element as recited in claim 1 wherein said [gel] cushioning element is configured to have a low overall thermal mass and a low rate of thermal transfer in order to provide a comfortable cushioning element.

10. A cushioning element as recited in claim 1 wherein said *outer* periphery of the cushioning element has a shape selected from the group consisting of triangular, square, rectangular, pentagonal, hyexagonal, heptagonal, octagonal, round, oval, elliptical, heart-shaped, and n-sided polygonal.

34. A yieldable cushion that includes a flexible, resilient, gelatinous cushioning media having shape memory and being substantially solid and non-flowable at temperatures below 130 degrees Fahrenheit, the cushion comprising:
   a cushioning element having a top, a bottom, a center and a side wall, said cushioning element comprising a quantity of gelatinous cushioning media and a plurality of contiguous, adjacent hollow columns located within said cushioning media, said columns each having a column interior and a column wall,
   a base [configured to be placed] in contact with said cushioning element bottom, said base being rigid in order to provide support beneath said cushioning element when a cushioned object is in contact with the cushion such that a compressive force is exerted against said cushioning element top by the cushioned object, and
   a side wall support, said side wall support being configured to tend to constrain said side wall of said cushioning element from moving outward from said cushioning element center;
   *wherein said cushioning element has a total volume contained within the boundaries of the cushioning element top, bottom and outer periphery, said cushioning element total volume being occupied by not more than about 50% by volume of said cushioning media;*
   wherein said cushion is yieldable in response to a compressive force exerted upon it by a cushioned object; and
   wherein said yieldability of the cushion results from said cushioning media being compressible and from said columns being bucklable, so that the cushion is able to substantially confirm to the shape of a cushioned object.

38. A cushion as recited in claim 37 wherein said column interior is hollow so that air may pass [though] *through* said column to *at least one of* said column top *and said column bottom* in order to ventilate a cushioned object in contact with said top of the cushioning element.

41. A cushion as recited in claim 34 wherein said [gel] cushioning element is configured to have a low overall thermal mass and a low overall rate of thermal transfer in order to provide a comfortable cushioning element.

49. A cushion as recited in [claim 48] *claim 47* wherein said column is stepped between said column top and said column bottom.

66. A yieldable cushion that includes a flexible, resilient, gelatinous cushioning media having shape memory and being substantially solid and non-flowable at temperatures below 130 degrees Fahrenheit, the cushion comprising:

a cushioning element having a top, a bottom, a center and an outer periphery, said cushioning element comprising a quantity of gelatinous cushioning media and a plurality of columns located within said cushioning media, said columns each having a longitudinal axis, a column interior and a column wall, a container in which said cushioning element is [placeable] *placed*, said container having a container base configured to be in contact with said cushioning element bottom, said base being rigid in order to provide support beneath said cushioning element when a cushioned object is in contact with the cushion such that a compressive force is exerted against said cushioning element top by the cushioned object, said container also having a rigid outer periphery support, said rigid outer periphery support being configured to provide support to said cushioning element outer periphery in order to impede its tendency to move outward away from said cushioning element center when a cushioned object exerts a compressive force on the cushion,

*wherein said cushioning element has a total volume contained within the boundaries of the cushioning element top, bottom and outer periphery, said cushioning element total volume being occupied by not more than 50% by volume of said cushioning media;* wherein said cushion is yieldable in response to a compressive force exerted upon it by a cushioned object; and wherein said yieldability of the cushion results from said cushioning media being compressible and from said columns being bucklable generally in the direction of their longitudinal axes, so that the cushion is able to substantially conform to the shape of a cushioned object.

70. A cushion as recited in claim 69 wherein said column interior is hollow so that air may pass [though] *through* said column to *at least one of* said column top *and said column bottom* in order to ventilate a cushioned object in contact with said top of the cushioning element.

99. A yieldable cushion that includes a flexible, resilient, gelatinous cushioning media having shape memory, and being substantially solid and non-flowable at temperatures below 130 degrees Fahrenheit, the cushion comprising:

a cushioning element having a top, a bottom, a center and a side wall, said cushioning element comprising a quantity of gelatinous cushioning media and a plurality of columns located within said cushioning media, said columns each having *a* longitudinal axis, a column interior and a column wall, a base [configured to be placed] in contact with said cushioning element bottom, said base providing support beneath said cushioning element when a cushioned object is in contact with the cushion such that a compressive force is exerted against said cushioning element top by the cushioned ojbect, and a cover adapted to cover and protect said cushioning element;

*wherein the cushioning element has a total volume contained within the boundaries of the cushioning element top, bottom and an outer periphery of the cushioning element, said total volume of said cushioning element being occupied by not more than about 50% by volume of said cushioning media;* wherein said cushion is yieldable in response to a compressive force exerted upon it by a cushioned object; and wherein said yieldability of the cushion results from said cushioning media being compressible and from said columns being bucklable in the direction of their longitudinal axes, so that the cushion is able to substantially conform to the shape of a cushioned object.

102. A cushion as recited in claim [99] *101* wherein said [sidewall] *side wall* support is a rigid plate adapted to be placed between said cover and said cushioning element.

103. A yieldable cushion that includes a flexible, resilient, gelatinous cushioning media having shape memory and being substantially solid and non-flowable at temperaturse below 130 degrees Fahrenheit, the cushion comprising:

*a* cushioning element having a top, a bottom, a center and an outer periphery, said cushioning element comprising a quantity of gelatinous cushioning media and a plurality of columns located within said cushioning media, said columns each having a longitudinal axis, a column interior and a column wall, and a girdle [placeable] *placed* about said outer periphery of said cushioning element, said girdle serving to retard movement of said outer periphery when a cushioned object exerts a compressive force on the cushioning element,

*wherein said cushioning element has a total volume contained within the boundaries of the cushioning element top, bottom and outer periphery, and said total volume of said cushioning element is occupied by not more than about 50% by volume of said cushioning media;* wherein said cushion is yieldable in response to a compressive force exerted upon it by a cushioned object; and wherein said yieldability of the cushion results from said cushioning media being compressible and from said columns being buckable generally in the direction of their longitudinal axes, so that the cushion is able to substantially conform to the shape of a cushioned object.

105. A yieldable cushioning element that includes a flexible, resilient, gel cushioning media having shape memory and being substantially solid and non-flowable at temperatures below 130 degrees Fahrenheit, the cushioning element comprising:

a quantity of gel cushioning media formed to have a top, a bottom, and an outer periphery, the cushioning media being compressible so that it will deform under the compressive force of a cushioned object, and a plurality of hollow columns situated in said cushioning media, each of said columns having a longitudinal axis along its length, each of said columns having a column wall which defines a column interior, and each of said columns having a column top and a column bottom; *wherein not more than about 50% of a total volume bounded by said top, said bottom, and said outer periphery of said quantity of gel cushioning media is occupied by said gel cushioning media;* wherein the cushioning element is adapted to have a cushioned object placed in contact with said cushioning element top;

wherein the column top and the column bottom of one of said columns are located at two different points on said longitudinal axis of said column;

wherein said column's longitudinal axis is located generally parallel to the direction of a compressive force exerted on the cushioning element by a cushioned object in contact with said column top;

wherein at least one of said columns is capable of buckling beneath a protuberance that is located on a cushioned object;

wherein the cushioning element is yieldable as a result of compressibility of said cushioning media and bucklability of said column;

wherein said cushioning media comprises thermoplastic, heat formable and heat reversible gelantinous elastomer composition, G, which is physically interlocked with a selected materal Mn, said gelatinous elastomer compositiion formed (a) 100 parts by weight of a high viscosity triblock copolymer of the general configuration poly(styrene-ethylene-butylene-styrene), (b) from about 200 to about 1,600 parts by weight of a plasticizing oil; said composition characterized by a gel rigidity of from about 20 to about 800 gram Bloom; said composition formed from the combination GnMnGn, MnGnMn, MnGnGn, GnGnMn, MnGnGnMn, GnMnGnGn, GnMnMnGn, GnMnGnGn, GnGnMnMn, GnGnMnGnMn, GnMnGnGn, GnGnMn, GnMnGnMnMn, MnGnMnGnMnGn, GnGnMnMnGn, or GnGnMnGnMnGn, wherein when n is a subscript of M, n is selected from the group consisting of foam, plastic, fabric, metal, concrete, wood, glass, ceramics, synthetic resin, synthetic fibers or refractory materials; and wherein when n is a subscript of G, n denotes the same or a different gel rigidity.

108. A cushioning element as recited in claim 105 wherein said cushioning media is gelatinous elastomer composition comprising:

(a) about 100 parts by weight of a triblock copolymer of the general configuration poly(styrene-ethylene-butylene-styrene) wherein said styrene end block to etylene and butylene centerblock ratio is within the range of from between 31:69 to 40:60;

(b) from about 200 to about 1,600 parts by weight of [an] *said* plasticizing oil selected from the group consisting of petroleum paraffinic oils, petroleum naphthenic oils, synthetic polybutene oils, synthetic polypropene oils, synthetic polyterpene oils and mixtures thereof; said [oils] *plasticizing oil* having an average molecular weight of between about 200 to about 800; and (c) said gelatinous elastomer composition being characterized as having an elongation at break of at least about 1,600%, an ultimate tensile strength of at least about 8×10$^5$ dyne/cm$^2$, and a gel rigidity of substantially not greater than about 800 gram Bloom.

109. A cushioning element as recited in claim 108 wherein said cushioning media exhibits the following properties:

(a) tensile strength of about 8×10$^5$ dyne/cm$^2$ to about 10$^7$ dyne/cm$^2$ as measured with crosshead separation speed of 25 cm per minute at 23° C.;

(b) elongation of about 1,600% to about 3,000% as measured with crosshead separation speed of 25 cm per minute at 23°C.;

(c) elasticity modulus of about 10$^4$ dyne/cm$^2$ to about 10$^6$ dyne/cm$^2$ as measured with crosshead separation speed of 25 cm per minute at 23° C.:

(d) shear modulus of about 10$^4$ dyne/cm$^2$ to about 10$^6$ dyne/cm$^2$ as measured with a 1, 2, and 3 kilogram load at 23° C.;

(e) gel rigidity of about 20 gram Bloom to about 800 gram Bloom as measured by the gram weight required to depress a gel a distance of 4 mm with a piston having a cross-sectional area of 1 square cm at 23° C.;

(f) tear propagation resistance of at least 5×10$^5$ dyne/cm$^2$ as measured at a crosshead separation speed of 25 cm/minute at 23°C.; *and*

(g) [and] substantially 100% snap back recovery when extended at a crosshead separation speed of 25 cm/minute to 1,200% at 23°C.

110. A cushioning element as recited in claim 105 wherein said cushioning media is a gelatinous elastomer composition consisting essentially of:

(a) about 100 parts by weight of a triblock copolymer of the general configuration poly(styrene-ethylene-butylene-styrene) wherein said styrene end block to ethylene and butylene center block ratio is about 32:68 to about 38:62;

(b) from about 200 to about 1,600 parts by weight of [an] *said* plasticizing oil selected from the group consisting of petroleum paraffinic oils, petroleumnaphthenic oils, synthetic polybutene oils, cynthetic polypropene oils, synthetic polyterpene oils and mixtures thereof; said [oils] *plasticizing oil* having an average molecular weight of between about 200 to about 800; and (c) said gelatinous elastomer composition being characterized as having an elongation at break of at least about 1,600%, an ultimate tensile strength of at least about 8×10$^5$ dyne/cm$^2$, and a gel rigidity of substantially not greater than about 800 gram Bloom.

111. A cushioning element as recited in [claim 110] *claim 105* wherein said cushioning media is a gelatinous elastomer composition comprising:

(a) about 100 parts by weight of a triblock copolymer of the general configuration poly(styrene-ethylene-butylene-styrene) wherein said styrene end bolock to ethylene and butylene center block ratio is about 32:68 to about 36:64;

(b) from about 200 to about 1,600 parts by weight of [an] *said* plasticizing oil selected from the group consisting of petroleum paraffinic oils, petroleum naphthenic oils, synthetic polybutene oils, synthetic polypropene oils, synthetic polyterpene oils and mixtures thereof; said [oils] *plasticizing oil* having an average molecular weight of between about 200 to about 800; and (c) said gelatinous elastomer composition being characterized as having an elongation at break of at least about 1,600%, an ultimated tensile strength of at least about 8×10$^5$ dyne/cm$^2$, and a gel rigidity of substantially not greater than about 800 gram Bloom.

112. A cushioning element as recited in [claim 111] *claim 105*, said cushioning media being a gelatinous elastomer composition comprising:

(a) about 100 parts by weight of triblock copolymer of the general configuration poly(styrene-ethylene-butylene-styrene) wherein said styrene end block to ethylene and butylene center block ratio is within the range of from between 31:69 to 40:60;

(b) from about 200 to about 1,600 parts by weight of [a] *said* plasticizing oil;

(c) said gelatinous elastomer composition having a gel rigidity of about 20 gram to about 800 gram Bloom.

113. A cushioning element as recited in [claim 112] *claim 105* wherein said plasticizing oil is selected from the group consisting of petroleum paraffinic oils, petroleum naphthenic oils, and mixtures thereof.

114. A cushioning element as recited in [claim 112] *claim 105* wherein said plasticizing oil is selected from the group consisting of synthetic polybutene oils, synthetic polypropene oils, synthetic polyterpene oils and mixtures thereof.

115. A cushioning element as recited in [claim 112] *claim 105* wherein said plasticizing oil is selected from the group consisting of petroleum paraffinic oils, petroleum naphthenic oils, synthetic polybutene oils, synthetic polypropylene oils, synthetic polyterpene oils and mixtures thereof; said [oils] *plasticizing oil* having an average molecular weight of between about 200 to about 800.

116. A cushioning element as recited in [claim 112] *claim 105* wherein said [oils] *plasticizing oil* having an average molecular weight of between about 200 to about 800.

117. A cushioning element as recited in [claim 112] *claim 105* wherein said cushioning element exhibits high creep, craze, tear, and crack resistance and is substantially free from oil bleedout.

118. A yieldable cushioning element that includes a flexible, resilient, gel cushioning media having shape memory and being substantially solid and non-flowable at temperatures below 130 degrees Fahrenheit, the cushioning element comprising:

a quantity of gel cushioning media formed to have a top, a bottom, and an outer periphery, the cushioning media being compressible so that it will deform under the compressive force of a cushioned object; and a plurality of hollow columns situated in said cushioning media, each of said columns having a longitudinal axis along its length, each of said columns having a column wall which defines a column interior, and each of said columns having a column top and a column bottom;

*wherein not more than about 50% of a total volume bounded by said top, said bottom, and said outer periphery of said quantity of gel cushioning media is occupied by said gel cushioning media;* wherein the cushioning element is adapted to have a cushioned object placed in contact with said cushioning element top;

wherein the column top and the column bottom of one of said columns are located at two different points on said longitudinal axis of said column;

wherein said column's longitudinal axis is located generally parallel to the direction of a compressive force exerted on the cushioning element by a cushioned object in contact with said column top;

wherein at least one of said columns is capable of buckling beneath a protuberance that is located on a cushioned object;

wherein the cushioning element is yieldable as a result of compressibility of said cushioning media and bucklability of said column;

wherein the cushioning media is a gelatinous elastomer composition comprising;

(a) about 100 parts by weight of a high viscosity triblock copolymer of the general configuration poly (styrene-ethylene-butylene-styrene);

(b) from about 200 to about 1,600 parts by weight of a plasticizing oil; said composition characterized by a gel rigidity of from about 20 to about 800 gram Bloom.

119. A yieldable cushioning element that includes a flexible, resilient, gel cushioning media having shape memory and being substantially solid and non-flowable at temperatures below 130 degrees Fahrenheit, the cushioning element comprising: a quanity of gel cushioning media formed to have a top, a bottom and an outer periphery, the cushioning media being compressible so that it will deform under the compressive force or a cushioned object; and a plurality of hollow columns situated in said cushioning media, each of said columns having a longitudinal axis along its length, each of said columns having a column wall which defines a column interior, and each of said columns having a column top and a column bottom;

*wherein not more than about 50% of a total volume bounded by said top, said bottom, and said outer periphery of said quantity of gel cushioning media is occupied by said gel cushioning media;* wherein the cushioning element is adapted to have a cushioned object placed in contact with said cushioning element top;

wherein the colulmn top and the column bottom of one of said columns are located at two different points on said longitudinal axis of said column;

wherein said column's longitudinal axis is located generally parallel to the direction of a compressive force exerted on the cushioning element by a cushioned object in contact with said column top;

wherein at least one of said columns is capable of buckling beneath a protuberance that is located on a cushioned object;

wherein the cushioning element is yieldable as a result of compressibility of said cushioning media and bucklability of said column;

wherein the cushioning media is a gelatinous elastomer composition comprising:

(a) about 100 parts by weight of a high viscosity triblock copolymer of the general configuration poly (styrene-ethylene-butylene-styrene); said styrene to ethylene and butylene is of a ratio fo from about 20:80 to about 40:60; and (b) from about 200 to about 1,600 parts by weight of a plasticizing oil; said composition characterized by a gel rigidity of from about 20 to about 800 gram Bloom.

*121. The yieldable cushioning element of claim 1, wherein each of said columns has a straight longitudinal axis extending from said top to said bottom of said quantity of gel cushioning medium.*

*122. The yieldable cushioning element of claim 1, wherein said cushioning media comprises a thermoplastic, heat formable and heat reversible gelatinous elastomer composition which is physically interlocked with a fabric material.*

*123. The yieldable cushioning element of claim 1, wherein at least one of said column walls is configured to deform elastically in response to a compressive load exerted on the cushioning element by a cushioned object in contact with said top of said cushioning medium and to buckle as said compressive load exceeds a buckling threshold load.*

* * * * *

US005749111C3

(12) EX PARTE REEXAMINATION CERTIFICATE (10575th)

United States Patent
Pearce

(10) Number: US 5,749,111 C3
(45) Certificate Issued: Apr. 24, 2015

(54) GELATINOUS CUSHIONS WITH BUCKLING COLUMNS

(75) Inventor: Tony M. Pearce, Alpine, UT (US)

(73) Assignee: EDIZONE, LLC, Alpine, UT (US)

Reexamination Request:
No. 90/013,364, Oct. 7, 2014

Reexamination Certificate for:
Patent No.: 5,749,111
Issued: May 12, 1998
Appl. No.: 08/601,374
Filed: Feb. 14, 1996

Reexamination Certificate C1 5,749,111 issued Jul. 1, 2008

Reexamination Certificate C2 5,749,111 issued May 4, 2010

(51) Int. Cl.
A47C 4/54 (2006.01)
A47C 27/14 (2006.01)
A47C 4/00 (2006.01)
A47C 27/08 (2006.01)
A43B 13/04 (2006.01)
B29C 44/58 (2006.01)
C08K 5/00 (2006.01)
A47C 27/15 (2006.01)
B29C 47/00 (2006.01)
A47C 7/02 (2006.01)
C08L 51/00 (2006.01)
B29C 44/50 (2006.01)
C08L 53/02 (2006.01)
B29C 47/12 (2006.01)
C08K 5/01 (2006.01)
B29L 31/60 (2006.01)
B29C 47/88 (2006.01)
B29K 105/04 (2006.01)

(52) U.S. Cl.
CPC . A43B 13/04 (2013.01); A47C 4/54 (2013.01); B29C 44/583 (2013.01); C08K 5/0016 (2013.01); A47C 27/15 (2013.01); B29C 47/0028 (2013.01); A47C 27/085 (2013.01); A47C 7/021 (2013.01); B29C 47/0004 (2013.01); C08L 51/006 (2013.01); B29C 44/50 (2013.01); C08L 53/025 (2013.01); B29C 47/12 (2013.01); C08K 5/01 (2013.01); A47C 27/144 (2013.01); C08L 53/02 (2013.01); Y10S 5/909 (2013.01); B29C 2793/009 (2013.01); B29L 2031/60 (2013.01); B29C 47/884 (2013.01); B29K 2105/04 (2013.01); Y10S 5/948 (2013.01); Y10S 5/953 (2013.01); Y10T 428/24322 (2015.01); Y10T 428/24331 (2015.01); C08L 2666/02 (2013.01)

(58) Field of Classification Search
None
See application file for complete search history.

(56) References Cited

To view the complete listing of prior art documents cited during the proceeding for Reexamination Control Number 90/013,364, please refer to the USPTO's public Patent Application Information Retrieval (PAIR) system under the Display References tab.

Primary Examiner — Cary Wehner

(57) ABSTRACT

A cushion that includes a cushioning element. The cushioning element has a number of substantially parallel elongate columns formed in a gelatinous cushioning media. The columns are configured so that when a force is applied to the cushioning element in a direction that is generally parallel to the longitudinal axes of the columns, the cushioning element will yield by a combination of compressability of the cushioning media and bucklability of the walls of the columns. In particular, the walls of columns which are located beneath a protruberance on an object being cushioned tend to buckle, permitting the cushioning element to conform to the shape of the cushioned object while evenly distributing a supporting force across the contact area of the cushioned object and avoiding pressure peaks. The preferred cushioning media is a gelatinous elastomer or gelatinous viscoelastomer. Various configurations of cushioning elements, including sidewall supports, are disclosed.

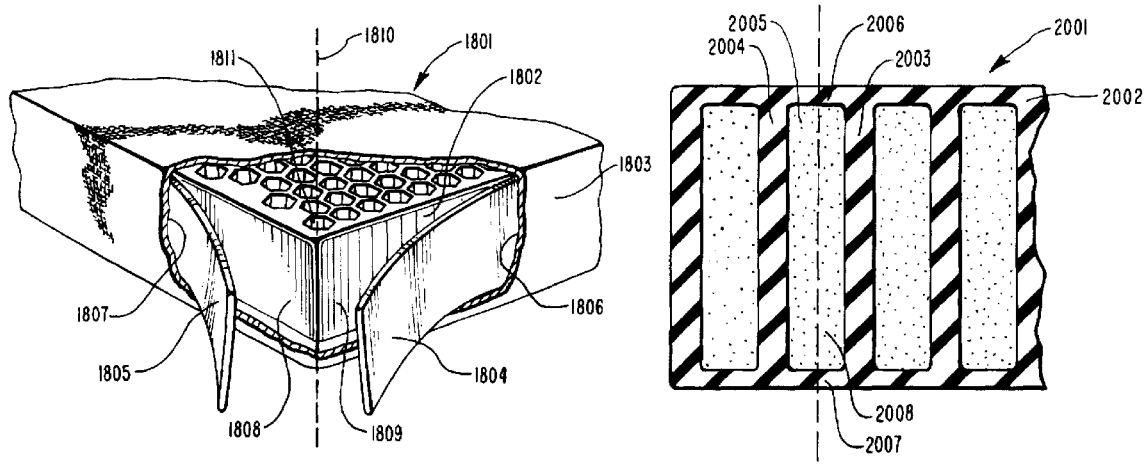

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claim 1 is confirmed.

Claims 25, 57 and 90 were previously cancelled.

Claims 2-24, 26-56, 58-89 and 91-123 were not reexamined.

* * * * *